US012496767B2

United States Patent
Cai et al.

(10) Patent No.: US 12,496,767 B2
(45) Date of Patent: Dec. 16, 2025

(54) DIGITAL ASSEMBLY OF SPHERICAL HYDROGEL VOXELS TO FORM 3D LATTICE STRUCTURES

(71) Applicant: University of Virginia Patent Foundation, Charlottesville, VA (US)

(72) Inventors: Liheng Cai, Charlottesville, VA (US); Jinchang Zhu, Charlottesville, VA (US)

(73) Assignee: University of Virginia, Charlottesville, VA (US)

( * ) Notice: Subject to any disclaimer, the term of this patent is extended or adjusted under 35 U.S.C. 154(b) by 247 days.

(21) Appl. No.: 18/010,993

(22) PCT Filed: Jun. 17, 2021

(86) PCT No.: PCT/US2021/037811
§ 371 (c)(1),
(2) Date: Dec. 16, 2022

(87) PCT Pub. No.: WO2021/257815
PCT Pub. Date: Dec. 23, 2021

(65) Prior Publication Data
US 2023/0271377 A1    Aug. 31, 2023

Related U.S. Application Data

(60) Provisional application No. 63/040,881, filed on Jun. 18, 2020.

(51) Int. Cl.
*B29C 64/106* (2017.01)
*B29C 64/209* (2017.01)
(Continued)

(52) U.S. Cl.
CPC .......... *B29C 64/106* (2017.08); *B29C 64/209* (2017.08); *B29C 64/227* (2017.08);
(Continued)

(58) Field of Classification Search
CPC ...... B29C 64/106; B29C 64/112; B29C 64/40
See application file for complete search history.

(56) References Cited

U.S. PATENT DOCUMENTS 9,168,328 B2 * 10/2015 Sun .................... A61L 27/56
10,150,258 B2 * 12/2018 Feinberg .............. B33Y 70/00
(Continued)

FOREIGN PATENT DOCUMENTS

WO    2019199971 A1    10/2019
WO    2021003270 A1    1/2021

OTHER PUBLICATIONS

S. V. Murphy et al.; "3D bioprinting of tissues and organs"; Nature Biotechnology, vol. 32, No. 8; Aug. 2014; pp. 773-785.
(Continued)

*Primary Examiner* — Atul P. Khare
(74) *Attorney, Agent, or Firm* — Dinsmore & Shohl LLP

(57) ABSTRACT

Systems and methods for 3D bioprinting of hydrogel voxels enable microfluidics-assisted digital assembly of spherical particles (DASP). The systems include a 3D motion system, a microfluidic printhead coupled to the 3D motion system, an extrusion device fluidly coupled to the microfluidic printhead, and a sacrificial support matrix. The sacrificial support matrix is designed to support the hydrogel voxels during printing and cross-link the hydrogel voxels. The system includes bio-inks comprising hydrogel compositions having independently controllable viscoelasticity and mesh size. The bio-inks are extruded by the extrusion device and microfluidic printhead to produce the hydrogel voxels. Exploiting the microfluidic printhead enables printing individual spherical hydrogel voxels with diameters from 150 micrometers (μm) to 1200 μm. Positioning and interconnection of the hydrogel voxels can be precisely controlled. The
(Continued)

systems and methods produce free-standing 3D structures and can be used for producing functional tissue mimics.

17 Claims, 24 Drawing Sheets

(51) Int. Cl.

| | | |
|---|---|---|
| B29C 64/227 | (2017.01) | |
| B29C 64/393 | (2017.01) | |
| B29C 64/40 | (2017.01) | |
| B81C 1/00 | (2006.01) | |
| B29L 31/00 | (2006.01) | |
| B33Y 10/00 | (2015.01) | |
| B33Y 30/00 | (2015.01) | |
| B33Y 50/02 | (2015.01) | |
| B33Y 70/00 | (2020.01) | |

(52) U.S. Cl.
CPC .......... *B29C 64/393* (2017.08); *B29C 64/40* (2017.08); *B81C 1/00095* (2013.01); *B29L 2031/756* (2013.01); *B33Y 10/00* (2014.12); *B33Y 30/00* (2014.12); *B33Y 50/02* (2014.12); *B33Y 70/00* (2014.12); *B81C 2203/03* (2013.01)

(56) References Cited

U.S. PATENT DOCUMENTS

| | | | |
|---|---|---|---|
| 11,192,292 B2 * | 12/2021 | Fernandez-Nieves | ......................... B29C 64/153 |
| 11,931,969 B2 * | 3/2024 | Hudson | ................... B29C 64/40 |
| 2017/0199507 A1 | 7/2017 | Murphy et al. | |
| 2017/0307598 A1 * | 10/2017 | Skardal | ............... C08B 37/0057 |
| 2017/0361534 A1 | 12/2017 | Fernandez-Nieves et al. | |
| 2019/0275746 A1 | 9/2019 | Huang et al. | |
| 2019/0307923 A1 | 10/2019 | Gatenholm et al. | |

OTHER PUBLICATIONS

J. P. Vacanti et al.; Tissue engineering: the design and fabrication of living replacement devices for surgical reconstruction and transplantation; The Lancet, Molecular medicine, Jul. 1999, 354; pp. 32-34.
Ali Khademhosseini et al.; "Microscale Technologies for Tissue Engineering" Advances in Tissue Engineering; 2008, 103, pp. 349-369.
R. L. Truby et al.; "Printing soft matter in three dimensions"; Nature; Dec. 15, 2016; vol. 540, pp. 371-378.
I. T. Ozbolat et al.; "Current advances and future perspectives in extrusion-based bioprinting"; Biomaterials, 2016, 76, 321-343.
T. Bhattacharjee et al.; "Writing in the granular gel medium"; Science Advances, Sep. 25, 2015, pp. 1-6.
Thomas J. Hinton et al.; "Three-dimensional printing of complex biological structures by freeform reversible embedding of suspended hydrogels"; Science Advances, Oct. 23, 2015; pp. 1-10.
A. Lee et al.; "3D bioprinting of collagen to rebuild components of the human heart"; Science, Aug. 2, 2019; 365, pp. 482-487.
Yu Shrike Zhang et al.; "Advances in engineering hydrogels"; Science, 356, 500 May 5, 201.
Mark W. Tibbitt, et al.; "Hydrogels as Extracellular Matrix Mimics for 3D Cell Culture"; Biotechnology and Bioengineering; vol. 103, No. 4, Jul. 1, 2009, pp. 655-633.
Jason A. Burdick et al.; "Hyaluronic Acid Hydrogels for Biomedical Applications"; Adv. Mater., 2011, Mar. 25; 2023, (12).
Jeanie L. Drury et al.; "Hydrogels for tissue engineering: scaffold design variables and applications"; Biomaterials, 2003, 24, 4337-4351.
Kuen Yong Lee et al.; "Hydrogels for Tissue Engineering"; Chemical Reviews; vol. 101, No. 7, Jul. 2001; 1869-1879.

David B. Kolesky et al.; "3d Bioprinting of Vascularized, Heterogeneous Cell-Laden Tissue Constructs"; Advanced Materials; 2014, 26, 3124-3130.
Mark A. Skylar-Scott et al.; "Voxelated soft matter via multimaterial multinozzle 3D printing"; Nature, vol. 575; Nov. 14, 2019; 330-335.
Florence G. Downs et al.; "Multi-responsive hydrogel structures from patterned droplet networks"; Nature Chemistry, vol. 12, Apr. 2020; pp. 363-371.
Joseph T. Muth et al.; "Embedded 3D Printing of Strain Sensors within Highly Stretchable Elastomers"; Advanced Materials, 2014, 26, 6307-6312.
Stefanie Utech, et. al.; "Microfluidic generation of monodisperse, structurally homogeneous alginate microgels for cell encapsulation and 3D cell culture"; , Adv. Healthc. Mater., Aug. 5, 2015, 4, (11) 1628-1633.
Abigail K. Grosskopf et al.; "Viscoplastic Matrix Materials for Embedded 3D Printing"; ACS Applied Materials & Interfaces; 2018, 10, 23353-23361.
Christopher B. Highley et al.; Direct 3D Printing of Shear-Thinning Hydrogels into Self-Healing Hydrogels; Advanced Materials, 2015, 27, 5075-5079.
Manuel Schaffner et al.; 3D printing of bacterial into functional complex materials; Science Advances, 2017, 3, Dec. 1, 2017; pp. 1-9.
Pragya Mittal et al.; "Codon usage influences fitness through RNA toxicity"; Proc. Natl. Acad. Sci. U. S. A., Aug. 21, 2018, vol. 115, No. 34, pp. 8639-8644.
Takanori Takebe et al.; "Organoids by design"; Science, 364, Jun. 7, 2019, pp. 956-959.
Zev J. Gartner et al.; "Programmed assembly of 3-dimensional microtissues with defined cellular connectivity"; Proc. Natl. Acad. Sci. U. S. A., Mar. 24, 2009, vol. 106, No. 12., pp. 4606-4610.
M. M. Stanton et al.; "Bioprinting of 3D hydrogels"; Lab Chip, Royal Society of Chemistry; 2015, 15, pp. 3111-3115.
Shia-Yen Teh et al.; "Droplet microfluidics"; Lab Chip, The Royal Society of Chemistry; 2008, 8, 198-220.
Mira T. Guo, et al.; "Droplet microfluidics for high-throughput biological assays"; Lab Chip, The Royal Society of Chemistry, 2012, 12, pp. 2146-2155.
Wen Li et al.'Microfludic fabrication of microparticles for biomedical applications' Chem. Soc. Rev., Royal Society of Chemistry, 2018, 47, pp. 5646-5683.
Hyun-Wook Kang et al.; "A 3D bioprinting system to produce human-scale tissue constructs with structural integrity" I Nature Biotechnology, vol. 34, No. 3, Mar. 2016, pp. 312-319.
Samuel Clark Ligon et al.; "Polymers for 3D Printing and Customized Additive Manufacturing"; Chemical Reviews, 117, 10212-10290 (2017).
Shifeng Nian et al.; Three-Dimensional Printable, Extremely Soft, Stretchable, and Reversible Elastomers from Molecular Architecture-Directed Assembly. Chemical Materials 2021, 33, pp. 2436-2445.
Ferry P.W. Melchels et al.; "A review on stereolithography and its applications in biomedical engineering"; Biomaterials 31, 6121-6130 (2010).
Brian Derby; "Inkjet Printing of Functional and Structural Materials: Fluid Property Requirements, Feature Stability, and Resolution"; Annu Rev. Mater. Res. 40, 395-414 (2010).
Mark A. Skylar-Scott et al.; "Biomanufacturing of organ-specific tissues with high cellular density and embedded vascular channels"; Science Advances, 5 Sep. 6, 2019 pp. 1-13.
Q. D. Nguyen et al.; Measuring the Flow Properties of Yield Stress Fluids. Annu. Rev. Fluid Mech. 24, 47-88 (1992).
Arif Z. Nelson et al.; "Embedded droplet printing in yield-stress fluids";Proc. Natl. Acad. Sci. vol. 117, No. 11; Mar. 17, 2020, pp. 5671-5679.
Andrew C. Daly, et al.; "3D bioprinting of high cell-density heterogeneous tissue models through spheroid fusion within self-healing hydrogels"; Nature Communications, 12, 1-13 (2021).
Jianyu Li et al.; "Designing hydrogels for controlled drug delivery"; . Nat. Rev. Mater. 1, Dec. 1-18, 2016.
Jos Malda et al.; "25th Anniversary Article: Engineering Hydrogels for Biofabrication"; Advanced Materials 25, 5011-5028 (2013).

(56) References Cited

OTHER PUBLICATIONS

Naomi Paxton et al.; "Proposal to assess printability of bioinks for extrusion-based bioprinting and evaluation of rheological properties governing bioprintability"; Biofabrication. 9 (2017).
Johnson H.Y. Chung et al.; "Bio-ink properties and printability for extrusion printing living cells"; Biomaterials Science, 1, 763-773 (2013); The Royal Society of Chemistry.
Jordan S. Miller, et al.; "Rapid casting of patterned vascular networks for perfusable engineered three-dimensional tissues"; Nature Materials, vol. 11, Sep. 2012, 768-774.
David B. Kolesky et al.; "Three-dimensional bioprinting of thick vascularized tissues"; Proc. Natl. Acad. Sci. U. S. A. Volume 113, No. 12, 3179-3184, Mar. 22, 2016.
Bagrat Grigoryan et al.; "Multivascular networks and functional intravascular topologies within biocompatible hydrogels"; Science. 364, 458-464, May 3, 2019; pp. 1-7.
Franklin Lim et al.; Microencapsulated Islets as Bioartificial Endocrine Pancreas. Science, vol. 210, No. 21, pp. 908-910, Nov. 1980.
Ronit Satchi-Fainaro et al.; "Polymer Therapeutics for Cancer: Current Status and Future Challenges"; Advances in Polymer Science (2006), vol. 193, pp. 1-65.
Kuen Yong Lee et al.; "Alginate: Properties and biomedical applications"; Prog. Polym. Sci. 2012, Jan. 37, 106-126.
He Wen et al.; Characterization of Human Sclera Barrier Properties for Transscleral Delivery of Bevacizumab and Ranibizumab. J. Pharm. Sci. Mar. 2013; 102 (3), 892-903.
Gabriel Villar et al.; "A Tissue-Like Printed Material"; Science, vol. 340, pp. 48-Apr. 5, 53, 2013.
Gabriel Villar et al.; "Formation of droplet networks that function in aqueous environments". Nat. Nanotechnol. 6, 803-808 (2011).
Lingzhi Cai et al.; "An unbounded approach to microfluidics using the Rayleigh-Plateau instability of viscous threads directly drawn in a bath"; . Proc. Natl. Acad. Sci. U. S. A. Nov. 12, 2019, vol. 116, No. 46, pp. 22966-22971.
Hing Jii Mea et al.; "On-demand modulation of 3D-printed elastomers using programmable droplet inclusions"; Proc. Natl. Acad. Sci. U. S. A. 117, No. 26, pp. 14790-14797, Jun. 30, 2020.
Bugra Ayan et al.; "Aspiration-assisted bioprinting for precise positioning of biologics"; Science Advances, Mar. 6, 2020, 6, 1-17.
Xuewen Du et al.; "Supramolecular Hydrogelators and Hydrogels: From Soft Matter to Molecular Biomaterials"; Chemical Reviews, 115, 13165-13307 (2015).
Eric A. Appel et al.; "Supramolecular polymeric hydrogels"; Chem. Soc. Rev. 41, 6195-6214 (2012); The Royal Society of Chemistry.
Michael Rubinstein et al.; "Polymer Physics"; Oxford University Press, Oxford, UK, 2003.
International Search Report and Written Opinion issued Nov. 5, 2021 in related International Application No. PCT/US2021/037811 filed Jun. 17, 2021.

\* cited by examiner a
2×3×2

DIGITAL ASSEMBLY OF SPHERICAL HYDROGEL VOXELS TO FORM 3D LATTICE STRUCTURES

CROSS-REFERENCE TO RELATED APPLICATION

This application is a National Stage Entry under 35 U.S.C. § 371 of International Patent Application No. PCT/2021/037811, filed on Jun. 17, 2021, which claims the benefit of priority to U.S. Provisional Patent Application No. 63/040,881, filed Jun. 18, 2020, and entitled "Microfluidics-Assisted Digital Assembly of Spherical Hydrogel Voxels to Form 3D Lattice Structures," the entire contents of both of which are incorporated by reference in the present application.

STATEMENT OF GOVERNMENT INTEREST

This invention was made with government support under 1944625 awarded by the National Science Foundation. The government has certain rights in the invention.

TECHNICAL FIELD

The present application is directed to the field of forming functional tissue mimics, in particular, systems, methods and materials for three-dimensional (3D) bioprinting of functional tissue mimics.

BACKGROUND

Biological tissues are not an ensemble of random cells but a tightly controlled three-dimensional (3D) organization of various cell types within an extracellular matrix (ECM). 3D bioprinting [1] offers the potential to reverse engineer functional tissues [2,3] by positioning ECM mimicking hydrogels encapsulated with biochemicals and living cells of prescribed numbers and types. Among a myriad of bioprinting techniques [4], the only such method that is capable of printing highly viscoelastic hydrogels without impairing cell viability is extrusion-based bioprinting.

SUMMARY 3D bioprinting processes deposit cell-laden hydrogels layer-by-layer to create functional tissue mimics. However, nearly all existing bioprinting platforms and processes can print only one dimensional (1D) hydrogel filaments rather than 0D hydrogel voxels, which are the basic building blocks of 3D structures. The present application is directed to systems and methods for 3D bioprinting of hydrogel voxels that enable microfluidics-assisted digital assembly of spherical particles (DASP). The systems of the present disclosure include a three dimensional motion system, a microfluidic printhead coupled to the three dimensional motion system, an extrusion device fluidly coupled to the microfluidic printhead, and a sacrificial support matrix. Exploiting the glass capillary printhead may enable printing individual spherical hydrogel voxels with diameters from 150 micrometers (μm) to 1200 μm, or from 300 μm to 1200 μm. Moreover, the position and interconnection of the hydrogel voxels can be precisely controlled with the 3D motion system. The sacrificial support matrix may be designed to support the hydrogel voxels when initially printed and to facilitate cross-linking of the hydrogel voxels. The system includes bio-inks comprising hydrogel compositions that have independently controllable viscoelasticity and mesh size. Strategies and methods for developing the bio-inks and hydrogel compositions are also disclosed. The bio-inks comprising the hydrogel compositions are extruded by the extrusion device and microfluidic printhead to produce the hydrogel voxels.

The DASP systems and methods of the present disclosure can be used to print 1D lines, 2D arrays, and free-standing 3D lattices consisting of interconnected yet distinguishable spherical hydrogel voxels. The DASP systems and methods of the present disclosure can also be used to create mechanically robust, multi-scale porous 3D scaffolds composed of the hydrogel voxels. The DASP systems and methods of the present disclosure are cytocompatible. The DASP systems and methods of the present disclosure can facilitate engineering highly heterogeneous yet tightly organized tissue-mimicking biological constructs, which may be used in modeling tissue development and disease, drug screening, tissue engineering, regenerative medicine, and other fields of study and research.

The present disclosure provides systems and methods for microfluidics-assisted digital assembly of spherical hydrogel voxels to form 3D lattice structures. An aspect of an embodiment of the present disclosure provides, among other things, a microfluidics-assisted 3D bioprinting technique that enables digital assembly of 0D hydrogel voxels rather than conventional 1D filaments to form free-standing lattice structures, such as but not limited to the mechanically robust, multi-scale porous 3D scaffolds.

In a first aspect of the present disclosure, a method of assembling hydrogel voxels to form a structure includes depositing a plurality of hydrogel voxels within a sacrificial support matrix. The hydrogel voxels may be spherical in shape. The method may further include cross-linking the plurality of hydrogel voxels to form the structure comprising a one dimensional line, a two dimensional array, or a free-standing three dimensional lattice. Each of the spherical hydrogel voxels are interconnected and are distinguishable from each other when viewed through optical microscopy.

A second aspect of the present disclosure may include the first aspect, wherein the structure may be a free-standing three dimensional lattice.

A third aspect of the present disclosure may include either one of the first or second aspects, wherein depositing the plurality of hydrogel voxels may comprise positioning a microfluidic printhead within the sacrificial support matrix and mechanically extruding a hydrogel composition through the microfluidic printhead.

A fourth aspect of the present disclosure may include the third aspect, comprising mechanically extruding the hydrogel composition through the microfluidic printhead with an extrusion device.

A fifth aspect of the present disclosure may include either one of the third or fourth aspects, wherein the mechanical extruding is not conducted using a pneumatic injection system.

A sixth aspect of the present disclosure may include any one of the third through fifth aspects, comprising mechanically extruding the hydrogel composition at an injection speed of from 40 nanoliters per second to 680 nanoliters per second for each of the plurality of hydrogel voxels.

A seventh aspect of the present disclosure may include any one of the third through sixth aspects, wherein depositing the plurality of hydrogel voxels comprises positioning the microfluidic printhead at a first position in the sacrificial support matrix, extruding a first volume of the hydrogel composition at the first position, moving the microfluidic printhead past a second position by a distance of at least 3.5 mm, moving the microfluidic printhead back into position at the second position, and extruding a second volume of the hydrogel composition at the second position.

An eighth aspect of the present disclosure may include the seventh aspect, wherein moving the microfluidic printhead past the second position by a distance of at least 3.5 mm may detach the microfluidic printhead from the hydrogel voxel at the first position at a speed sufficient to reduce or prevent deformation of the hydrogen voxel.

A ninth aspect of the present disclosure may include any one of the first through eighth aspects, comprising depositing the plurality of hydrogel voxels at a center-to-center distance between the hydrogel voxels of from 0.8 to 1.7 times or from 0.8 to 1.3 times the average diameter of the plurality of hydrogel voxels.

A tenth aspect of the present disclosure may include any one of the first through ninth aspects, wherein cross-linking the plurality of hydrogel voxels may comprise contacting the plurality of hydrogel voxels with calcium ions pre-dissolved in the sacrificial support matrix.

An eleventh aspect of the present disclosure may include the tenth aspect, comprising contacting the plurality of hydrogel voxels with the calcium ions pre-dissolved in the sacrificial support matrix for a time duration of greater than or equal to 3 minutes.

A twelfth aspect of the present disclosure may include any one of the first through eleventh aspects, further comprising, after contacting the plurality of hydrogel voxels with the calcium ions pre-dissolved in the sacrificial support matrix, washing the plurality of hydrogel voxels with a calcium solution, where washing may further cross-link the plurality of hydrogel voxels and may dissociate the sacrificial support matrix to leave the free-standing structure.

A thirteenth aspect of the present disclosure may include twelfth aspect, wherein washing the plurality of hydrogel voxels may comprise immersing the sacrificial support matrix and the plurality of hydrogel voxels in a bath comprising a calcium solution at 37° C. for an immersion time of from 3 minutes to 6 minutes, wherein the calcium solution has a concentration of calcium ions of from 30 mM to 50 mM.

A fourteenth aspect of the present disclosure may include any one of the first through thirteenth aspects, comprising depositing the plurality of hydrogel voxels having an average diameter of from 300 to 1200 micrometers, wherein the average diameter is determined after swelling of the hydrogel voxels.

A fifteenth aspect of the present disclosure may include any one of the first through fourteenth aspects, wherein each of the points on the outer surface of each of the plurality of hydrogel voxels are within 11% of an average radius of the hydrogel voxels at the time the hydrogel voxels are deposited and before any swelling of the hydrogel voxels.

A sixteenth aspect of the present disclosure may include any one of the first through fifteenth aspects, wherein each of the hydrogel voxels may comprise a hydrogel composition comprising an aqueous solution of a hydrogel and at least one cell.

A seventeenth aspect of the present disclosure may include the sixteenth aspect, wherein the at least one cell may be selected from the group consisting of bacterial cells, animal tissue cells, and human tissue cells.

An eighteenth aspect of the present disclosure may include either one of the sixteenth or seventeenth aspects, wherein the hydrogel composition may comprise an alginate.

A nineteenth aspect of the present disclosure may include any one of the sixteenth through eighteenth aspects, wherein the hydrogel composition comprises an alginate and a poly (ethylene oxide) polymer.

A twentieth aspect of the present disclosure may include the nineteenth aspect, wherein the poly (ethylene oxide) polymer has an average molecular weight of from 50,000 g/mol to 1,000,000 g/mol.

A twenty-first aspect of the present disclosure may include any one of the first through twentieth aspects, wherein each of the plurality of hydrogel voxels may have a volume of from 16 nanoliters to 418 nanoliters.

A twenty-second aspect of the present disclosure may include any one of the first through twenty-first aspects, further comprising adjusting a movement speed of the microfluidic printhead, a distance between adjoining hydrogel voxels, a concentration of calcium ions in the sacrificial support matrix, or combinations of these to modify the spacing, cross-linking, or both of the plurality of hydrogel voxels.

A twenty-third aspect of the present disclosure is directed to a system for assembling hydrogel voxels to form a structure. The system comprises a three dimensional motion system, a microfluidic printhead coupled to the three dimensional motion system, an extrusion device fluidly coupled to the microfluidic printhead, and a sacrificial support matrix. The three dimensional motion system may be operable to position the microfluidic printhead in 3-dimensional space. The extrusion device may be operable to mechanically extrude a hydrogel composition from the microfluidic printhead. The microfluidic printhead may be operable to deposit a volume of the hydrogel composition into the sacrificial support matrix to form a hydrogel voxel.

A twenty-fourth aspect of the present disclosure may include the twenty-third aspect, wherein the sacrificial support matrix may be bio-compatible and may be operable to mechanically support a plurality of hydrogel voxels and provide calcium ions for cross-linking the plurality of hydrogel voxels.

A twenty-fifth aspect of the present disclosure may include either one of the twenty-third or twenty-fourth aspects, wherein the sacrificial support matrix may be a yield stress fluid and may be self-healing.

A twenty-sixth aspect of the present disclosure may include the twenty-fifth aspect, wherein the sacrificial support matrix may be a yield stress fluid that yields at a shear stress of greater than or equal to 10 pascals.

A twenty-seventh aspect of the present disclosure may include either one of the twenty-fifth or twenty-sixth aspects, wherein the sacrificial support matrix is self-healing such that after the sacrificial support matrix is subjected to a shear stress of at least 10 pascals, a storage modulus and a loss modulus of the sacrificial support matrix are restored to pre-shear-stress values in less than or equal to 1 second.

A twenty-eighth aspect of the present disclosure may include any one of the twenty-third through twenty-seventh aspects, wherein the sacrificial support matrix may comprise fragmented gelatin microparticles and calcium ions pre-dissolved in the gelatin microparticles.

A twenty-ninth aspect of the present disclosure may include the twenty-eighth aspect, wherein a concentration of calcium ions in the sacrificial support matrix may be sufficient to cause gelation of the hydrogel voxels in a gelation time of from 10 seconds to 300 seconds, or about 200 seconds.

A thirtieth aspect of the present disclosure may include either one of the twenty-eighth or twenty-ninth aspects, wherein the concentration of calcium ions in the sacrificial support matrix is from 3 mM to 48 mM, from 4 mM to 15 nM, or 6 mM.

A thirty-first aspect of the present disclosure may include any one of the twenty-third through thirtieth aspects, wherein the extrusion device may comprise a stepper motor operatively coupled to a linear screw actuator. The linear screw actuator may be operable to translate the rotary motion of the stepper motor into linear extrusion of the hydrogel composition.

A thirty-second aspect of the present disclosure may include any one of the twenty-third through thirty-first aspects, wherein the extrusion device may have a delay of less than or equal to 10 milliseconds between operation of the linear screw actuator by the stepper motor and injection of the hydrogel composition from the microfluidic printhead.

A thirty-third aspect of the present disclosure may include any one of the twenty-third through thirty-second aspects, wherein the extrusion device may be motorized and computer controlled.

A thirty-fourth aspect of the present disclosure may include any one of the twenty-third through thirty-third aspects, wherein the system does not include a pneumatic injection system.

A thirty-fifth aspect of the present disclosure may include any one of the twenty-third through thirty-fourth aspects, wherein the microfluidic printhead may comprise a nozzle and a body coupled to the nozzle, the body having an inner diameter greater than an inner diameter of the nozzle.

A thirty-sixth aspect of the present disclosure may include the thirty-fifth aspect, wherein the nozzle may be a tapered cylindrical glass capillary having an inner diameter of from 60 micrometers to 300 micrometers, or from 60 micrometers to 80 micrometers at a tip of the cylindrical glass capillary.

A thirty-seventh aspect of the present disclosure may include any one of the twenty-third through thirty-sixth aspects, wherein the microfluidic printhead may be glass.

A thirty-eighth aspect of the present disclosure may include any one of the twenty-third through thirty-seventh aspects, further comprising a hydrogel composition comprising an alginate hydrogel.

A thirty-ninth aspect of the present disclosure may include the thirty-eighth aspect, wherein the hydrogel composition may further comprise at least one cell selected from the group consisting of bacterial cells, animal tissue cells, human tissue cells, and combinations of these.

A fortieth aspect of the present disclosure may include either one of the thirty-eighth or thirty-ninth aspects, wherein the hydrogel composition may further comprise poly (ethylene oxide) polymer.

A forty-first aspect of the present disclosure may include any one of the thirty-eighth through fortieth aspects, wherein the hydrogel composition consists essentially of water, alginate, poly (ethylene oxide) polymer, and optionally biological cells.

A forty-second aspect of the present disclosure may include any one of the twenty-third through forty-first aspects, further comprising at least one processor, at least one computer readable medium, and computer readable and executable instructions stored on the at least one computer readable medium. The at least one processor may be communicatively coupled to at least one computer readable medium, the three-dimensional motion system, and the extrusion device. The computer readable and executable instructions, when executed by the at least one processor, may cause the system to automatically: position the microfluidic printhead at a first position in the sacrificial support matrix; extrude a first volume of the hydrogel composition at the first position; move the microfluidic printhead in the direction of a second position by at least 3.5 mm; move the microfluidic printhead back to the second position; and extrude a second volume of the hydrogel composition at the second position.

A forty-third aspect of the present disclosure may be directed to a bio-ink for printing spherical hydrogel voxels. The bio-ink may comprise a hydrogel composition comprising. The w/v % is defined as the weight of the constituent divided by the volume of the hydrogel composition multiplied by 100.

A forty-fourth aspect of the present disclosure may include forty-third aspect, wherein the hydrogel composition consists of or consists essentially of from 1 w/v % to 4 w/v % alginate polymer, from 3 w/v % to 8 w/v % poly (ethylene oxide) polymer, balance water, and optionally, at least one cell.

A forty-fifth aspect of the present disclosure may include either one of the forty-third or forty-fourth aspects, comprising at least one cell.

A forty-sixth aspect of the present disclosure may include the forty-fifth aspect, wherein the at least one cell is selected from the group consisting of bacterial cells, animal tissue cells, human tissue cells, and combinations of these.

A forty-seventh aspect of the present disclosure may include any one of the forty-third through forty-sixth aspects, wherein the poly (ethylene oxide) polymer may have an average molecular weight of from 50,000 g/mol to 1,000,000 g/mol.

A forty-eighth aspect of the present disclosure may include any one of the forty-third through forty-seventh aspects, wherein the bio-ink may have a viscosity of greater than or equal to 100 pascal seconds.

A forty-ninth aspect of the present disclosure may include any one of the forty-third through forty-eighth aspects, wherein the bio-ink may comprise a hydrogel composition having a loss factor of from 1.2 to 2.0.

A fiftieth aspect of the present disclosure may be directed to a hydrogel voxel formed from the bio-ink of any one of the forty-third through forty-ninth aspects, wherein the hydrogel voxel has a mesh size of from 6 nm to 12 nm.

BRIEF DESCRIPTION OF THE FIGURES

The following detailed description of specific aspects of the present disclosure can be best understood when read in conjunction with the following figures, in which like structure is indicated with like reference numerals and in which.

Reference will now be made in greater detail to various aspects of the present disclosure, some aspects of which are illustrated in the accompanying drawings.

DETAILED DESCRIPTION

Described herein are systems and methods for 3D bio-printing of cell-laden hydrogel voxels layer-by-layer to create functional tissue mimics. In particular, the described systems and methods include microfluidics-assisted 3D bioprinting techniques that enable the digital assembly of 0D spherical hydrogel particles (DASP).

Figure 1:
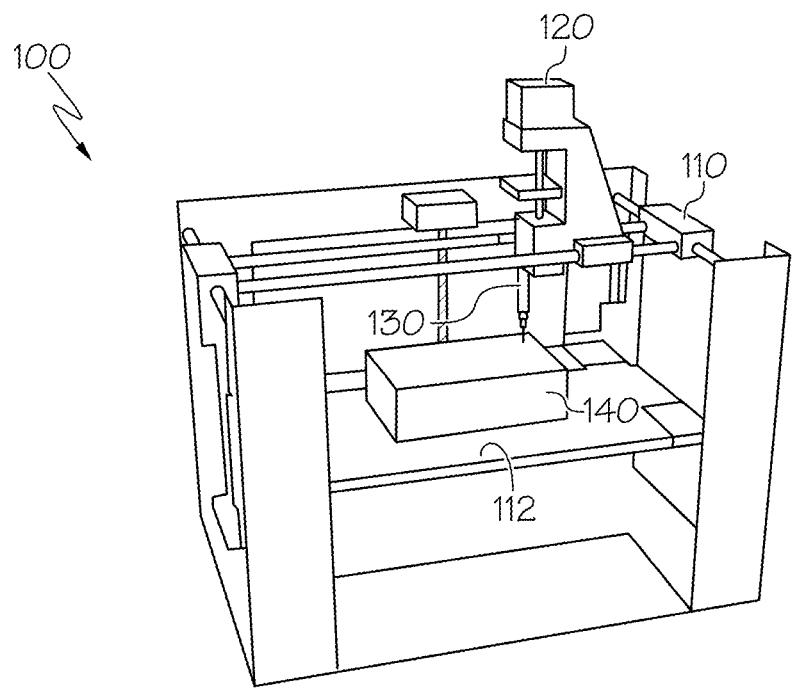
FIG. 1 schematically depicts a front perspective view of a system for 3D printing hydrogel voxels, according to one or more embodiments shown and described herein.

Referring to FIG. 1, schematically depicted is one embodiment of the described system 100 for 3D assembling of hydrogel voxels to form a structure, such as a 1D filament, 2D array, or free-standing 3D lattice structure. The system 100 may include a three dimensional motion system 110, a microfluidic printhead 130 coupled to the three dimensional motion system 110, and an extrusion device 120 fluidly coupled to the microfluidic printhead 130. The system 100 may further include a sacrificial support matrix 140. The three dimensional motion system 110 may be operable to position the microfluidic printhead 130 in 3-dimensional space, and the extrusion device 120 may be operable to mechanically extrude a hydrogel composition from the microfluidic printhead 130. The microfluidic printhead 130 may be operable to deposit a volume of the hydrogel composition into the sacrificial support matrix 140 to form a hydrogel voxel printed within the sacrificial support matrix 140.

The hydrogel composition is the bio-ink used for the printing with the system 100 to create the hydrogel voxels. The hydrogel compositions may have independently controllable viscoelasticity and mesh size. Strategies and methods for developing the bio-inks and hydrogel compositions are also disclosed. The bio-inks comprising the hydrogel compositions are extruded by the extrusion device and microfluidic printhead to produce the hydrogel voxels. The sacrificial support matrix 140 may be designed to support the hydrogel voxels when initially printed and to facilitate cross-linking of the hydrogel voxels.

The system 100 may be used in a method of assembling hydrogel voxels to form a structure, such as a 1D filament, 2D array, or a free-standing 3D lattice structure. The method may include depositing a plurality of hydrogel voxels within the sacrificial support matrix 140. The hydrogel voxels may be deposited within the sacrificial support matrix 140 using the system 100. The hydrogel voxels may be spherical. The method may further include cross-linking the plurality of hydrogel voxels to form the structure comprising an one dimensional line, a two dimensional array, or a free-standing three dimensional lattice. The hydrogel voxels may be cross-linked through contact of the hydrogel voxels with calcium ions pre-dissolved in the sacrificial support matrix 140.

The microfluidic printhead 130 of the system 100 in combination with the extrusion device 120 allows for printing individual spherical hydrogel voxels with diameters from 150 µm to 1200 µm. Moreover, the system 100 and methods may enable precise control of the position and interconnection of plurality of hydrogel voxels. The systems and methods of the present disclosure incorporating the DASP techniques can print 1D lines, 2D arrays, and free-standing 3D lattice structures consisting of interconnected yet distinguishable spherical hydrogel voxels. The DASP systems and methods disclosed herein are cytocompatible. The DASP systems and methods of the present disclosure may provide a new way to engineer highly heterogenous yet tightly organized tissue reconstructs, among other features. Various aspects of the DASP systems and methods will be described in further detail herein.

Although exemplary embodiments are described in detail herein, other embodiments are contemplated. Accordingly, this disclosure is not limited in scope to the details of construction and arrangement of components described herein or illustrated in the drawings. The disclosure thus includes other embodiments and systems or methods that may be practiced or carried out in various ways.

Any of the components or modules referred to herein with regard to any of the embodiments may be integrally or separately formed with one another. Redundant functions or structures of the components or modules may be implemented or utilized. The various components may be communicated locally and/or remotely with any user/operator/customer/client or machine/system/computer/processor. The various components may be in communication via wireless and/or hardwire or other available communication means, systems and hardware. Various components and modules may be substituted with other modules or components that provide similar functions.

The systems, devices, and related components described herein may be configured to any of the various shapes along the entire continual geometric spectrum of manipulation of x, y and z planes to provide and meet the environmental, anatomical, and structural demands and operational requirements. Locations and alignments of the various components may vary as desired or required. Various sizes, dimensions, contours, rigidity, shapes, flexibility and materials of any of the components or portions of components in the various embodiments may be varied and utilized as desired or required. While some dimensions are provided on the aforementioned figures, the device may constitute various sizes, dimensions, contours, rigidity, shapes, flexibility and materials as it pertains to the components or portions of components of the systems and devices, and therefore may be varied and utilized as desired or required.

As used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

In describing embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the nth reference in the list. All references cited and discussed in this specification are incorporated herein by reference in their entireties and to the same extent as if each reference was individually incorporated by reference.

Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4).

Biological tissues are not an ensemble of random cells but a tightly controlled three dimensional (3D) organization of various cell types in an extracellular matrix (ECM). 3D bioprinting additively assembles bio-inks to manufacture tissue-mimicking biological constructs that can find application in modeling tissue development and disease, drug screening, tissue engineering, and regenerative medicine [31, 32]. 3D bioprinting [1] offers the potential to reverse engineer functional tissues [2,3] by positioning voxelated bioinks comprising ECM-mimicking hydrogels encapsulated with biochemicals and living cells of prescribed numbers and types.

Among a myriad of bioprinting techniques [4], the only such method that is capable of printing highly viscoelastic hydrogels without impairing cell viability is extrusion-based bioprinting. Unlike typical inks, such as synthetic plastics and elastomers [33, 34], bio-inks contain not only biopolymers but also living cells, which are sensitive to harsh processing conditions required in various 3D printing processes. These harsh processing conditions can include, but are not limited to, exposure to ultraviolet (UV) light in stereolithography [35] and high mechanical shear in inkjet-based printing [36]. These harsh conditions can be avoided by extrusion bioprinting, which exploits either pneumatic or mechanical pressure to physically extrude highly viscoelastic bio-inks without chemical interventions [37]. The mild processing conditions of extrusion bioprinting have do not impair the viability of cells even at a very high cell density that is comparable to the cell density of organ tissues [38].

Nearly all existing extrusion-based 3D bioprinting platforms, however, can print only lines of hydrogels to produce one dimensional (1D) filaments. Although 1D filaments can be combined to create complex 3D tissue mimics, and this capability can be augmented with the aid of a sacrificial supporting matrix [6-8], hydrogel design [9-13], and printing multiple cell types [14], these 1D filaments are not 0D voxels, which are the basic building blocks of 3D structures [15]. Printing and assembling 1D filaments inevitably produces bulky, dense constructs with porosity determined solely by the mesh size of the hydrogel used for the bio-ink. The accessible range of hydrogel mesh size is very limited [47], however, because the hydrogel must be above a certain concentration in the bio-ink to achieve both the viscosity required for printing and the stiffness required for maintaining the integrity of the printed structures [48-50]. Introducing vascular networks [51-54] in the 3D printed structures can improve nutrient transport and waste exchange, which require continuous external perfusion, however. This may limit the application of 3D printed biological constructs in vivo, where external perfusion is not available, and the transport of biomolecules must rely on diffusion. Moreover, the vascular networks are delicate and can be easily damaged by mechanical manipulation during transplantation, a process often involved in clinical applications. Consequently, there is unmet need for a technique for manufacturing mechanically robust, multiscale porous scaffolds efficient for diffusion-based transport. Similarly, there remains a need for 3D printing methods capable of printing zero dimensional (0D) hydrogel voxels to more effectively deploy extrusion-based bioprinting in tissue engineering.

The systems and method described herein provide a 3D printing technique that enables microfluidics-assisted digital assembly of spherical particles (DASP) to produce self-supporting 3D lattice structures. These system and methods use an alginate-based hydrogel as the bioink to exploit the advantages and capabilities of DASP in on-demand positioning of individual spherical hydrogel voxels. Hydrogel compositions used as the bio-ink have independently controllable viscoelasticity and mesh size. Referring again to FIG. 1, the systems 100 include a three dimensional motion system 110, a microfluidic printhead 130 coupled to the three dimensional motion system 110, and an extrusion device 120 fluidly coupled to the microfluidic printhead 130. The system 100 further includes a sacrificial support matrix 140. The system 100 may be operable to deposit a plurality of hydrogel voxels at specific positions within the sacrificial support matrix 140.

The described systems 100 and methods combine mechanical extrusion using the extrusion device 120 with the microfluidic printhead 130 to print hydrogel voxels (e.g., spherical particles) with precisely controllable diameters in the range of 150 μm to 1200 μm, or from 300 μm to 1200 μm. By controlling the swelling, crosslinking kinetics, and neighboring distance of alginate hydrogel particles, the system can print 1D lines, 2D arrays, and/or free-standing 3D lattices consisting of interconnected yet distinguishable spherical hydrogel voxels. These systems 100 can also be converted from 0D voxel-based printing to the classical 1D filament-based printing. Finally, the proliferation of bacteria encapsulated in printed hydrogel particles reveals that DASP systems and methods of the present disclosure are cytocompatible. These systems 100 and methods provide an effective and versatile foundation for 3D printing highly heterogeneous yet organized tissue reconstructs.

Referring again to FIGS. 1 and 2, the systems 100 include the 3D motion system 110. The 3D motion system 110 may be coupled to the microfluidic printhead 130 and may be operable to position the microfluidic printhead 130 in 3-dimensional space. During the process of printing hydrogel voxels (e.g., particle), the 3D motion system may position a tip of the microfluidic printhead 130 in 3-dimensional space within the sacrificial support matrix 140. The 3D motion system 110 may be any commercially-available 3D motion system suitable for use in 3D printing applications. In embodiments, the 3D motion system 110 may be the 3D motion system from a Model Z-603S 3D desktop 3D printer manufactured and sold by JGAURORA. The 3D motion system may include a platform 112 for supporting the sacrificial support matrix 140 during depositing/printing of the hydrogel voxels.

Referring again to FIGS. 1-4, the systems 100 may include the extrusion device 120. The extrusion device 120 may be fluidly coupled to the microfluidic printhead 130. The extrusion device 120 may be physically coupled directly to the microfluidic printhead 130 or may be fluidly coupled to the microfluidic printhead 130 through a conduit. The extrusion device 120 may be physically coupled to the 3D motion system 110 so that the extrusion device 120 may be translated in conjunction with positioning of the microfluidic printhead 130. In various embodiments, the extrusion device 120 may be stationary and fluidly coupled to the microfluidic printhead 130 through a conduit that enables movement of the microfluidic printhead 130 relative to the extrusion device 120. The extrusion device 120 may be operable to mechanically extrude a hydrogel composition from the microfluidic printhead 130. In particular, the extrusion device 120 may be operable to deliver the hydrogel composition to the microfluidic printhead 130 using mechanical forces, where continued application of mechanical force to the hydrogel composition causes extrusion of the hydrogel composition from the tip of the microfluidic printhead 130.

The extrusion device 120 used for the systems 100 use a motorized syringe pump to mechanically extrude the hydrogel. This is different from a typical pneumatic injection systems that uses pressurized gas to extrude materials [4], which often exhibits a delayed response due to the compressibility of gas, and the delay becomes more pronounced when forcing a highly viscoelastic hydrogel composition through a nozzle of small diameter, such as the tip of the microfluidic printhead 130. Thus, the direct mechanical extrusion enables the deposition of a hydrogel voxel with a prescribed volume. Further, an injection speed of the extrusion device 120 may be coordinated with operation of the 3D motion system 110 to print the hydrogel voxels in 3D space on-demand.

Similar to a syringe pump, the extrusion device 120 may be built based on a linear screw (T8) actuator, which converts the rotary motion of a stepper motor (NEMA 17) into linear motion. The extrusion device 120 may be used to drive the hydrogel composition to and through the microfluidic printhead 130. The extrusion device 120 may also include an extrusion speed controller, which may be operatively coupled to the extrusion device 120. In various embodiments, the extrusion speed may be controlled by G-code. In other embodiments, the extrusion device 120 may comprise a stepper motor operatively coupled to a linear screw actuator. In still other embodiments, the extrusion device 120 is motorized and computer controlled. The linear screw actuator may be operable to translate the rotary motion of the stepper motor into linear extrusion of the hydrogel composition.

The extrusion device 120 may have a delay between operation of the linear screw actuator by the stepper motor and injection of the hydrogel composition from the microfluidic printhead 130 that is less than the delay of a pneumatic injection system caused by increasing the pressure of the gas in the pneumatic injection system. The extrusion device 120 may be configured to have a delay of less than or equal to 1 second or less than 10 milliseconds between operation of the linear screw actuator by the stepper motor and injection of the hydrogel composition from the microfluidic printhead 130. In various embodiments, the system 100 may be configured to omit a pneumatic injection system.

Figure 5:
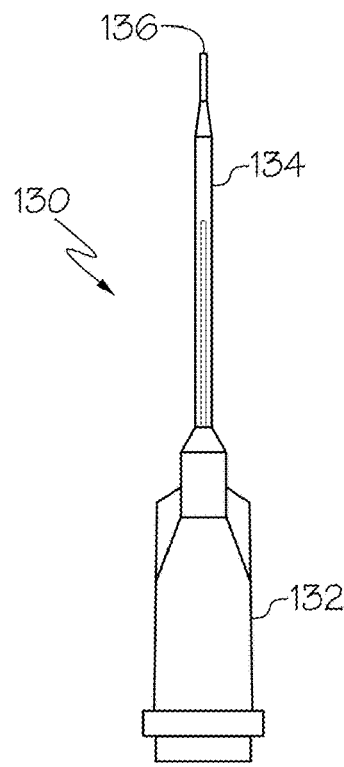
FIG. 5 schematically depicts a front perspective view of the microfluidic printhead of FIG. 3, according to one or more embodiments shown and described herein.
Figure 6:
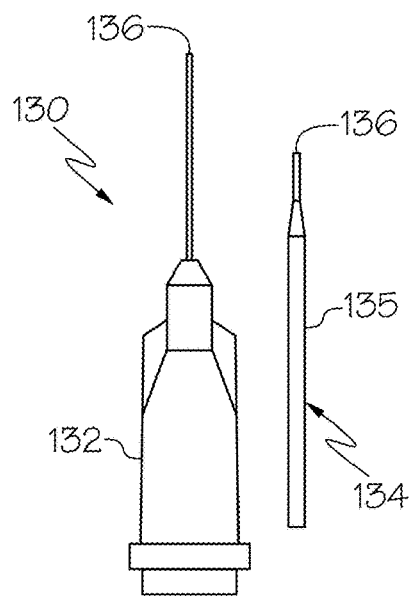
FIG. 6 schematically depicts a front perspective view of the microfluidic printhead of FIG. 4 in a disassembled state, according to one or more embodiments shown and described herein.
Figure 7:
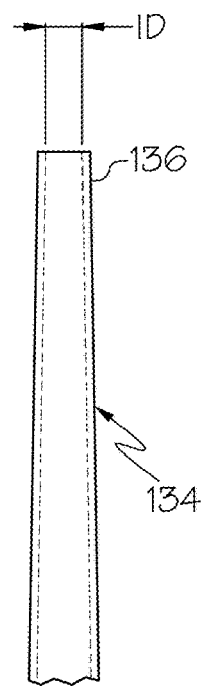
FIG. 7 schematically depicts a cross-sectional view of the tip of the microfluidic printhead of FIG. 4, according to one or more embodiments shown and described herein.

Referring now to FIGS. 5-7, the systems 100 include the microfluidic printhead 130, which may be coupled to the 3D motion system 110 and fluidly coupled to the extrusion device 120. The microfluidic printhead 130 may be operable to deposit a volume of the hydrogel composition into the sacrificial support matrix 140 to form a hydrogel voxel. Referring now to FIG. 5, the microfluidic printhead 130 may include a body 132 and a nozzle 134 coupled to the body 132. The body 132 of the microfluidic printhead 130 may have an inner diameter greater than an inner diameter of the nozzle 134. The body 132 may be a glass syringe.

To print hydrogel voxels (e.g., particles) of sub-millimeter size, the nozzle 134 may include a tapered cylindrical glass capillary 135 with a tip 136 having an inner diameter of from 60 μm to 80 μm. The main portion of the capillary 135, however, may have an outer diameter that is much larger compared to the outer diameter of the tip 136, such as the main portion of the capillary 135 having an outer diameter of 1 mm. In various embodiments, the nozzle 134 may be a tapered cylindrical glass capillary 135 having a tip 136 with an inner diameter of from 60 micrometers (μm) to 300 μm, from 60 μm to 250 μm, from 60 μm to 200 μm, from 60 μm to 100 μm, from 60 μm to 80 μm, from 80 μm to 300 μm, from 80 μm to 250 μm, from 80 μm to 200 μm, or from 80 μm to 100 μm. In embodiments, the nozzle 134 may have a tip 136 with an inner diameter of about 60 μm. Compared to the commonly used cylindrical metal syringe needle of a similar tip diameter, the microfluidic printhead 130 of the present disclosure may have a nozzle comprising a tapered glass capillary, which generally have greater flexural strength compared to metal syringe needles. This greater flexural strength of the tapered glass capillary may enable the tapered glass capillary to move through the sacrificial support matrix 140 without bending. In embodiments, the nozzle 134 of the microfluidic printhead 130 is glass. In embodiments, the nozzle 134 may include the tapered glass capillary sleeved over a metal dispensing needle with a luer lock connection, where the luer lock connection may provide a connection between the nozzle 134 and the body 132 (e.g., syringe). In embodiments, the microfluidic printhead 130 may comprise a metal dispensing needle having an inner diameter of from 60 μm to 300 μm.

The microfluidic printhead 130 may be prepared by preparing the nozzle 134 and then attaching the nozzle 134 to the body 132 (e.g., syringe). To fabricate the printing nozzle 134, a glass capillary may be tapered using a micropipette puller, such as but not limited to a P-1000 micropipette puller available from Sutter Instrument, Inc. The glass capillary may be pulled to form the tip 136 having an inner diameter less than 60 μm, such as 20 μm. The tip 136 may then be sanded to the final inner diameter of from 60 μm to 80 μm to form the nozzle 134. The glass capillary may then be sleeved to a dispensing needle having a connection for attachment to the body 132 to form the nozzle 134. The interstitial space between the dispensing needle and the glass capillary may be sealed using a sealant, such as but not limited to a 5-Minute epoxy sealant, to produce the nozzle 134. The nozzle 134 may then be coupled to the body 132 (e.g., syringe) to produce the microfluidic printhead 130. The microfluidic printhead 130 may then be mounted to the extrusion device 120 to write through the sacrificial support matrix 140. The previously described method for preparing the microfluidic printhead 130 is provided for purposes of illustration. However, it is understood that other methods may also be used to make the microfluidic printhead 130. In embodiments, the microfluidic printhead 130 may comprise a metal dispensing needle attached to the body 132, the metal dispensing needle having an inner diameter of from 60 μm to 300 μm.

Referring again to FIG. 1, the system 100 further includes the sacrificial support matrix 140, which may be disposed at a fixed position relative to the 3D motion system 110. The sacrificial support matrix 140 may be bio-compatible and may be operable to mechanically support a plurality of hydrogel voxels deposited therein. The sacrificial support matrix 140 may also provide calcium ions that may facilitate cross-linking the plurality of hydrogel voxels.

The sacrificial support matrix 140 is designed to have certain physical and chemical properties to enable printing of the hydrogel voxels through the DASP systems 100 and methods of the present disclosure. To serve as the supporting matrix for embedded printing, the sacrificial support matrix 140 can possess five features: (1) The sacrificial support matrix 140 must be aqueous and cytocompatible; (2) the sacrificial support matrix 140 must be a yield stress fluid [19] such that under stress it becomes fluid-like, allowing the movement of the printing nozzle; (3) the sacrificial support matrix 140 must be able to self-heal to recover its original mechanical properties within a short time to localize a deposited droplet [20]; (4) the sacrificial support matrix 140 should provide an environment in which individual hydrogel voxels can swell and partially coalesce with each other; and (5) the sacrificial support matrix 140 can be easily removed after printing and cross-linking of the hydrogel voxels.

The sacrificial support matrix 140 may also include calcium ions to facilitate cross-linking of the hydrogel voxels. The sacrificial support matrix 140 of the present disclosure may comprise gelatin microparticles and calcium ions pre-dissolved in the gelatin microparticles. The gelatin particles may be jammed together to form the sacrificial support matrix 140 comprising a matrix of the jammed gelatin microparticles. The sacrificial support matrix 140 comprising the jammed gelatin microparticles has been found to be a yield stress fluid and to have self-healing properties. The sacrificial support matrix 140 comprising the hammed gelatin microparticles has also been found to be aqueous, cytocompatible, and easily removable after printing.

Figure 8:
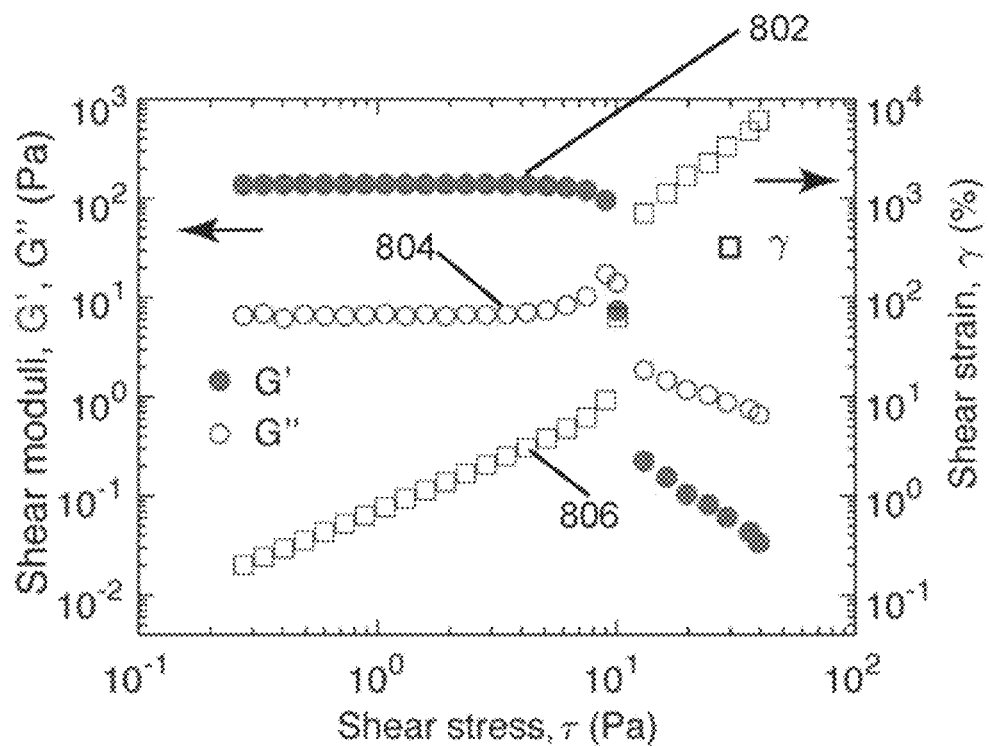
FIG. 8 graphically depicts a storage modulus (left y-axis), loss modulus (left y-axis), and shear strain (right y-axis) as a function of shear stress (x-axis) for a sacrificial support matrix, according to one or more embodiments shown and described herein.
Figure 9:
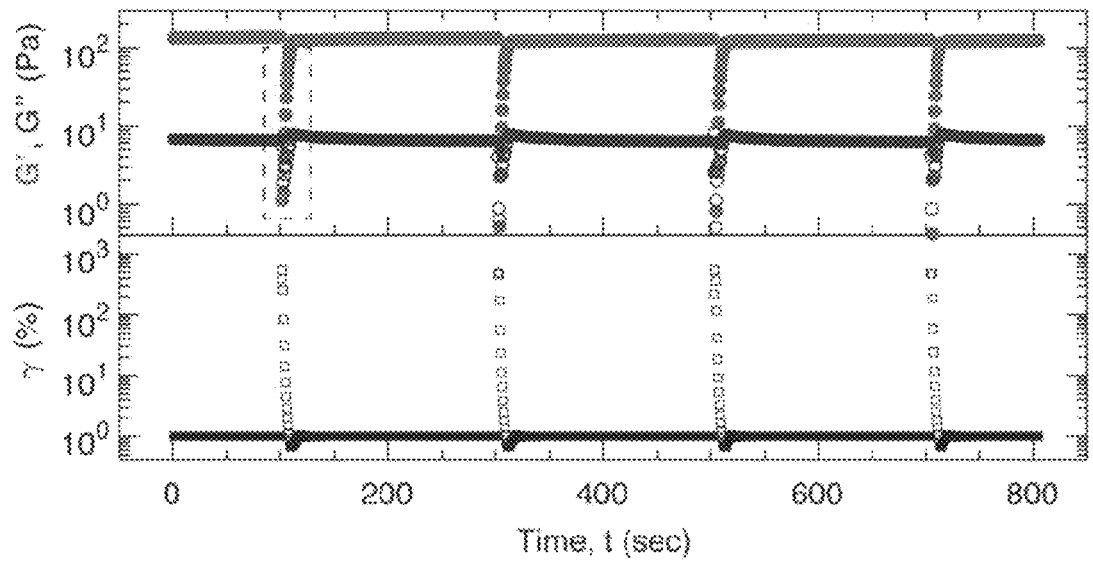
FIG. 9 graphically depicts a storage modulus (y-axis), loss modulus (y-axis), and shear strain (y-axis) as a function of time (x-axis) for a sacrificial support matrix subjected to periodic instant increases in shear strain of 1000%, according to one or more embodiments shown and described herein.
Figure 10:
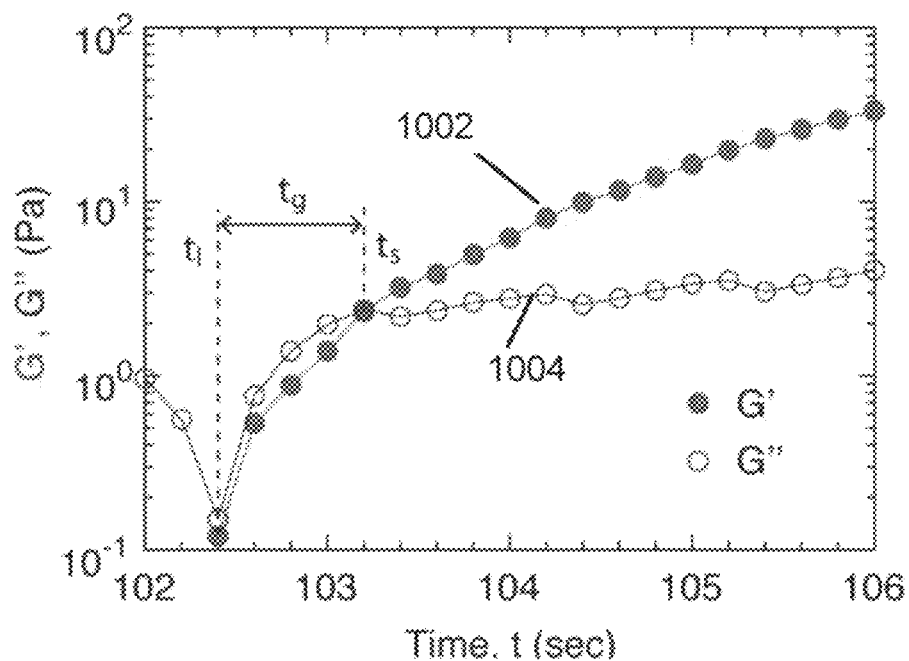
FIG. 10 graphically depicts a storage modulus and loss modulus (y-axis) as a function of shear stress (x-axis) for a sacrificial support matrix, according to one or more embodiments shown and described herein.

The sacrificial support matrix 140 may be a yield stress fluid that becomes fluid-like at shear stresses greater than 10 pascals. Referring to FIGS. 8-10, the dynamic mechanical properties of the sacrificial support matrix 140 comprising the jammed gelatin microparticles are graphically depicted. A stress-controlled rheometer set at an oscillatory frequency of 1 hz at 20° C. was used to quantify the dynamic mechanical properties of the sacrificial support matrix 140. Referring now to FIG. 8, the shear moduli (storage modulus G'(series 802 in FIG. 8) in pascals and loss modulus G" in pascals (Pa) (series 804 in FIG. 8)) and the shear strain γ in percent (series 806 in FIG. 8) are graphically depicted as a function of shear stress (τ) in pascals. In the absence of shear stress (i.e., τ≈zero), the storage modulus G' (802) is much greater than the loss modulus G" (804), which corresponds to a small loss factor tan δ≡G"/G'≈0.05.

When exposed to shear stress, the sacrificial support matrix 140 comprising the jammed gelatin microparticles is shown in FIG. 8 to yield above a shear stress τ of 10 Pa, at which the both the storage modulus G'(802) and the loss modulus G"(804) decrease dramatically and that G" becomes larger than G'. As shown in FIG. 8, the storage modulus G' decreases from 130 PA to around 1 Pa. Moreover, at the crossover shear stress τ of 10 Pa, the shear strain (series 806 in FIG. 8) exhibits a sudden increase from 10% to 1000%. The decrease in the moduli G' and G" and the sudden decrease in shear strain γ at shear stress τ of greater than 10 Pa indicates that the sacrificial support matrix 140 comprising the jammed gelatin microparticles becomes fluid-like at shear stress greater than 10 Pa.

Referring now to FIG. 9, the self-healing properties of the sacrificial support matrix 140 comprising the jammed gelatin microparticles is demonstrated. To test whether the sacrificial support matrix 140 comprising the jammed gelatin microparticles can self-heal, an instant shear strain of 1000% is applied periodically for a period of 1 second to break the matrix and the behavior of both G' and G" are monitored in real time for a period of 200 seconds after each application of the instant shear strain of 1000%. Every 200 seconds, the instant shear strain of 1000% is applied. As shown in FIG. 9, the sacrificial support matrix 140 comprising the jammed gelatin microparticles completely recovers to its original mechanical properties (original values of G' and G"), and this damage-recovery process is repeatable.

Referring now to FIG. 10, illustrating the gelation kinetics of the sacrificial support matrix 140 comprising the jammed gelatin microparticles, which is represented by the shear moduli, in particular the storage modulus G' (series 1002 in FIG. 10) and the loss modulus G" (series 1004 in FIG. 10) as a function of time. After a destructive shear at time $t_l$ that fluidized the sacrificial support matrix 140, the fluidized sacrificial support matrix 140 becomes solid-like again within less than 1 sec at time $t_s$, as shown by gelation kinetics in FIG. 10. In FIG. 10, time $t_l$ is the time at which the applied shear strain fluidizes the sacrificial support matrix, and time $t_s$ is the time at which the G' becomes larger than G", which indicates the return of the sacrificial support matrix 140 to a solid state. The gelation time of the sacrificial support matrix 140 is thus the difference between $t_s$ and $t_l$. The data in FIGS. 9 and 10 indicate that the sacrificial support matrix 140 can self-heal in a short time (e.g., less than one second) even after subjected to shear strain multiple times; this feature permits the sacrificial support matrix of the present disclosure to be an ideal supporting matrix for embedded 3D bioprinting of hydrogel voxels 102.

In various embodiments, the sacrificial support matrix 140 yields at a shear stress of greater than or equal to 10 pascals. In embodiments, wherein after the sacrificial support matrix is subjected to a shear stress of at least 10 pascals, a storage modulus and a loss modulus of the sacrificial support matrix are restored to pre-shear-stress values in less than or equal to 1 second. The sacrificial support matrix 140 may also be biocompatible.

The sacrificial support matrix 140 may include pre-dissolved calcium ions. The calcium ions may be used to aid in cross-linking the hydrogel voxels deposited within the sacrificial support matrix 140. As used herein, the term "cross-linking" refers to the formation of ionic or covalent bonds linking two molecules of a compound, such as an alginate or other polymeric material, in the hydrogel composition. The components of the hydrogel, such as alginates in the hydrogel for example, may undergo cross-linking in the presence of the calcium to form a gel. The gelation time refers to the time that the hydrogel composition begins to solidify, which refers to the time when the storage modulus G' of the hydrogel exceeds the loss modulus G".

The gelation time of the hydrogel, in particular alginate hydrogels, of the hydrogel voxels is directly proportional to the concentration of calcium ions in the sacrificial support matrix 140. The concentration of calcium ions in the sacrificial support matrix 140 may be adjusted to cause gelation of the hydrogel voxels 102 in a gelation time of from 10 seconds to 300 seconds, or about 200 seconds. This may allow many hydrogel voxels 102 to be deposited within the sacrificial support matrix 140 before gelation occurs. In embodiments, the concentration of calcium ions in the sacrificial support matrix 140 may be from 3 mM (millimolar) to 48 mM, from 4 mM to 15 mM, or about 6 mM.

Figure 11:
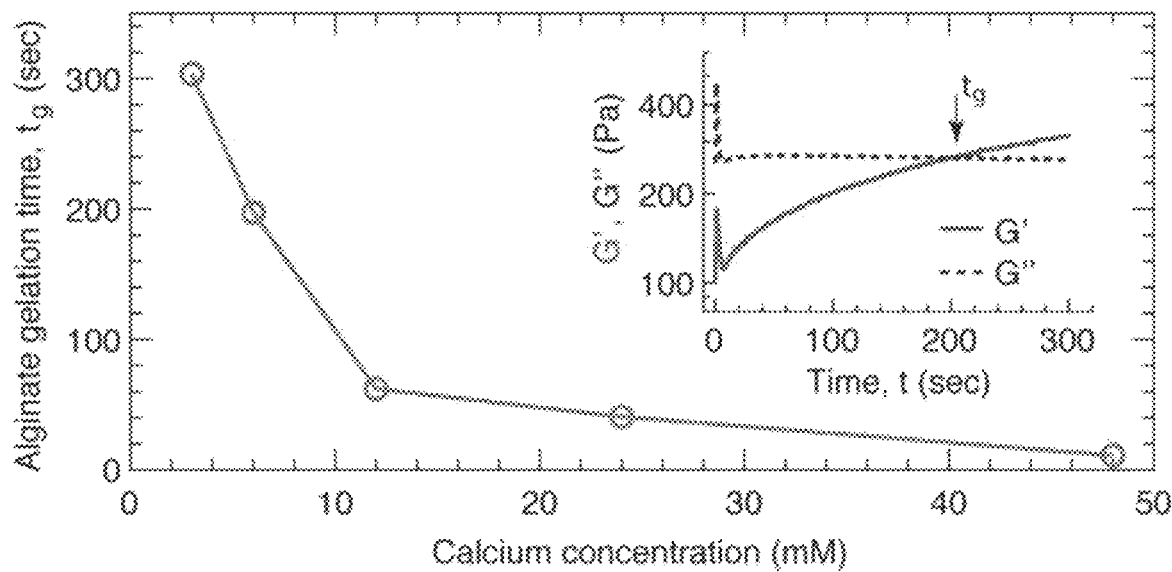
FIG. 11 graphically depicts a gelation time (y-axis) of an alginate hydrogel as a function of calcium ion concentration (x-axis) for a sacrificial support matrix, according to one or more embodiments shown and described herein.
Figure 12A:
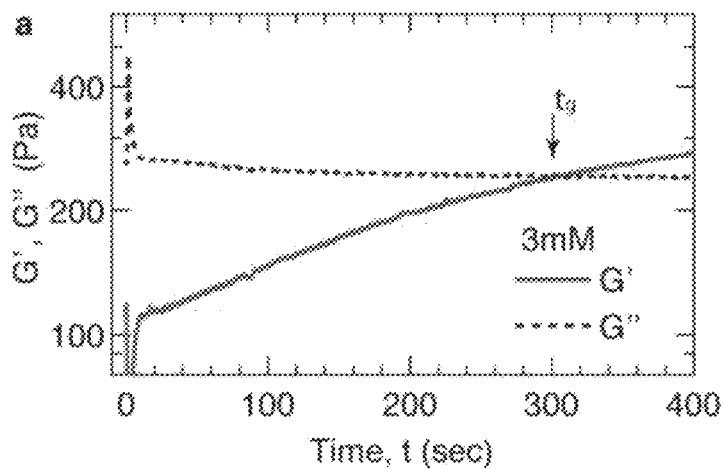
FIG. 12A graphically depicts a storage modulus G' and loss modulus G" of an alginate hydrogel (y-axis) as a function of time (x-axis) for concentrations of calcium ions in the sacrificial support matrix of 3 mM, according to one or more embodiments shown and described herein.
Figure 12B:
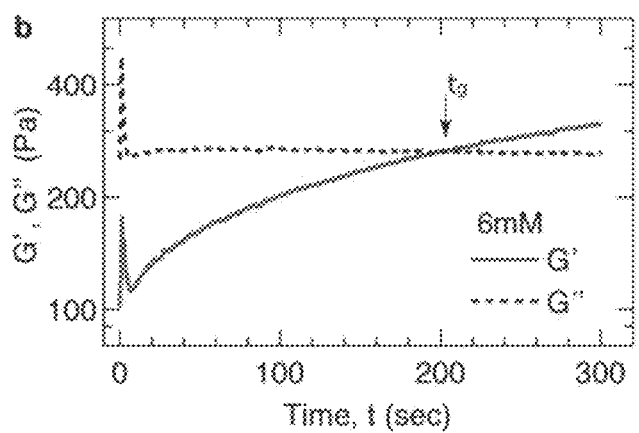
FIG. 12B graphically depicts a storage modulus G' and loss modulus G" of an alginate hydrogel (y-axis) as a function of time (x-axis) for concentrations of calcium ions in the sacrificial support matrix of 6 mM, according to one or more embodiments shown and described herein.
Figure 12C:
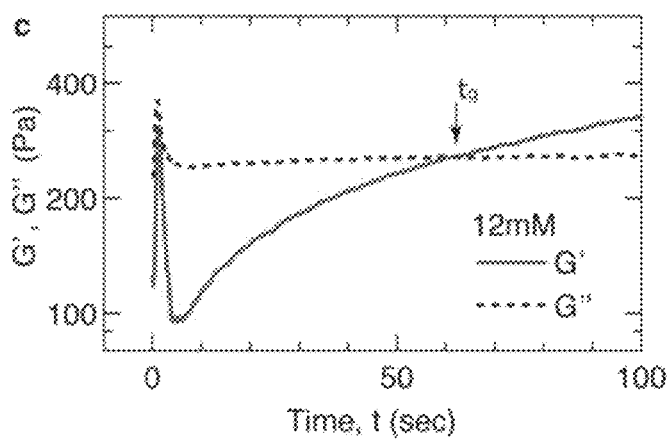
FIG. 12C graphically depicts a storage modulus G' and loss modulus G" of an alginate hydrogel (y-axis) as a function of time (x-axis) for concentrations of calcium ions in the sacrificial support matrix of 12 mM, according to one or more embodiments shown and described herein.
Figure 12D:
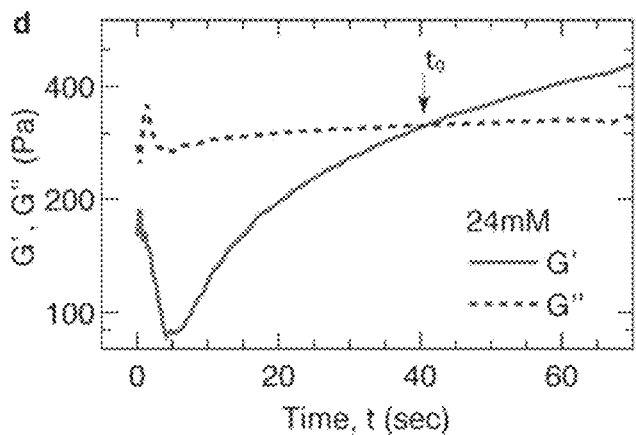
FIG. 12D graphically depicts a storage modulus G' and loss modulus G" of an alginate hydrogel (y-axis) as a function of time (x-axis) for concentrations of calcium ions in the sacrificial support matrix of 24 mM, according to one or more embodiments shown and described herein.
Figure 12E:
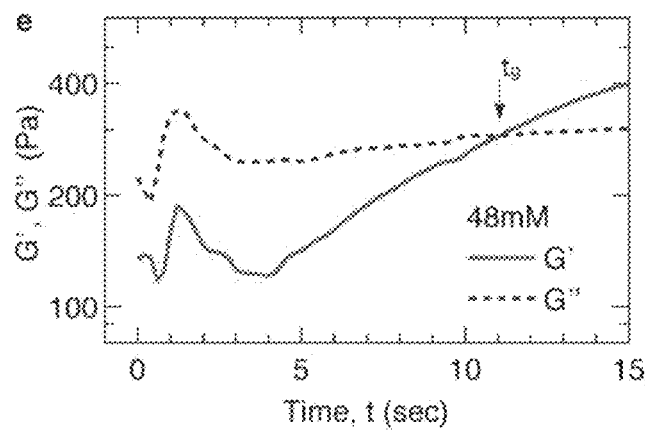
FIG. 12E graphically depicts a storage modulus G' and loss modulus G" of an alginate hydrogel (y-axis) as a function of time (x-axis) for concentrations of calcium ions in the sacrificial support matrix of 48 mM, according to one or more embodiments shown and described herein.
Figure 12F:
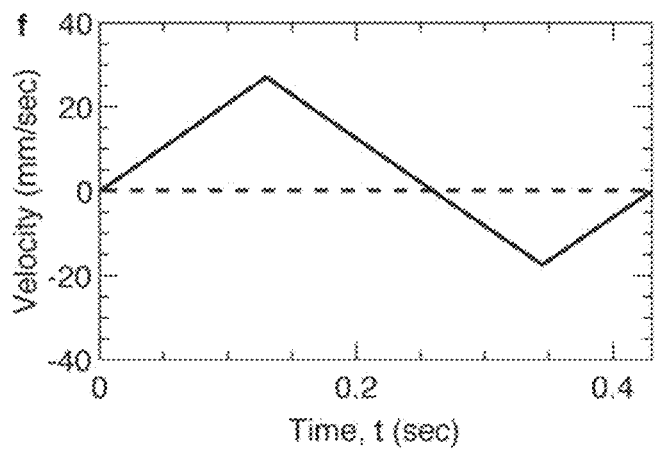
FIG. 12F graphically depicts a velocity profile of movement of a microfluidic printhead through a sacrificial support matrix, according to one or more embodiments shown and described herein.

Referring now to FIG. 11, the gelation time of a hydrogel comprising alginate as a function of the concentration of calcium ions in the sacrificial support matrix 140 is graphically depicted. As shown by FIG. 11, the gelation time $t_g$ of the hydrogel decreases by nearly 30 times from 300 seconds to 10 seconds as the calcium concentration increases from 3 mM to 48 mM. Referring now to FIGS. 12A-12E, the storage modulus G' and loss modulus G" of the hydrogel as a function of time for concentrations of calcium ions of 3 mM (12A), 6 mM (12B), 12 mM (12C), 24 mM (12D), and 48 mM (12E) are graphically depicted. In FIGS. 12A-12E, the hydrogel is exposed to the calcium ions at time equal to zero, and the gelation time tg refers to the time at which G' exceeds G". FIGS. 12A-12E also show that the gelation time $t_g$ of the hydrogel composition comprising alginate decreases by nearly 30 times from 300 seconds to 10 seconds as the calcium concentration increases from 3 mM to 48 mM. Referring now to FIG. 12F, the velocity profile of the microfluidic printhead 130 through the sacrificial support matrix 140 is graphically depicted for moving the microfluidic printhead 130 forward past the target location and then back to the target location that is a distance of 1 mm from the starting position. Comparing the gelation time tg with the printing speed (velocity profile of FIG. 12F), at a gelation time of 200 seconds associated with a concentration of calcium ions of 6 mM in the sacrificial support matrix 140 and a print time of 1 second per hydrogel voxel, the gelation time tg would allow for hundreds of hydrogel voxels to be deposited before cross-linking results in solidification of the hydrogel voxels.

The sacrificial support matrix may be prepared by preparing a gelatin hydrogel and then breaking the gelatin hydrogel into microparticles. In particular, gelatin may be dissolved in a calcium solution (6 mM calcium chloride, 30 mM sodium chloride) with a concentration of 4.5% w/v at an alleviated temperature 50° C. The solution may then be cooled at 4° C. for 12 hours to solidify the solution to form the gelatin hydrogel. The gelatin hydrogel of 150 mL may then be mixed with 50 mL calcium solution and fragmented into microparticles using a blender operated at 4000 rpm for 100 sec. The calcium solutions may be prepared using deionized (DI) water or lysogenic broth (LB) media as the solvent. The mixture of gelatin microparticles may then be degassed using vacuum for 2 min, mixed with another 50 mL calcium solution, and degassed for another 2 min. The above process may result in the sacrificial support matrix consisting of jammed gelatin microparticles with calcium ions pre-dissolved therein.

As previously discussed, the DASP systems 100 and methods of the present disclosure utilize a bio-ink comprising a hydrogel composition for producing the hydrogel voxels. The hydrogel composition may further include one or more cells. The bio-inks (e.g., hydrogel compositions) of the present disclosure are designed through consideration of two criteria: (1) 3D printability; and (2) mesh size of the cross-linked hydrogel voxels. To identify the physical parameters that determine the 3D printability of bio-inks, the whole process for printing a hydrogel voxel may be considered. The process for printing hydrogel voxels can involves three steps: (i) depositing a hydrogel voxel in the sacrificial support matrix 140, where the hydrogel voxel includes an alginate and has a prescribed volume; (ii) detaching the microfluidic printhead 130 from the hydrogel voxel; and (iii) waiting for the hydrogel voxel to be at least partially cross-linked.

As used herein, the term "partial cross-linking" or "partially cross-linked" refers to reaction of a portion of the reactive sites of molecules of a polymer, such as alginate, to form cross-linking bonds between molecules of the polymer that cause the hydrogel to increase in viscosity, e.g., solidify. This may be indicated by changes in the storage modulus G' and loss modulus G" of the hydrogel composition. Full cross-linking refers to a degree of cross-linking between molecules of a polymer that is sufficient for the reaction rate of the cross-linking reaction to decrease to an insignificant rate. At full cross-linking, some reactive sites on the polymer molecules remain unreacted, but the degree of cross-linking between the molecules is sufficient to prevent reactive sites on adjacent molecules from coming close enough to undergo reaction to form a cross-linking bond. Partial cross-linking may also be considered in terms of the solidification of the hydrogel voxels produced therefrom. Partial cross-linking may refer to a degree of cross-linking sufficient to cause the hydrogel to solidify to the point that the storage modulus G' exceeds the loss modulus G". Full cross-linking refers to a degree of cross-linking at which the storage modulus G' and loss modulus G" become constant again after the cross-linking process.

Figure 13:
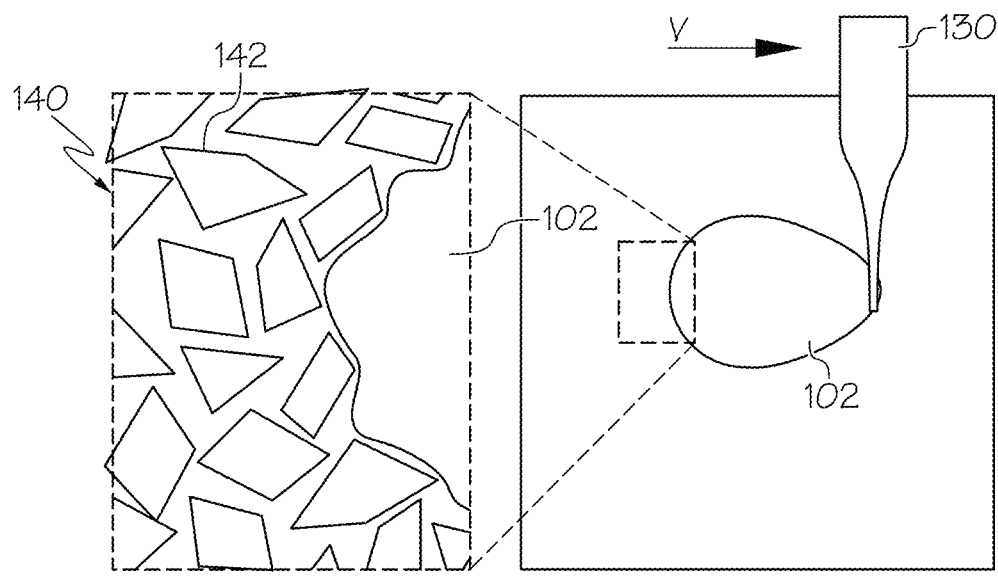
FIG. 13 schematically depicts printing of a hydrogel voxel in the sacrificial support matrix comprising gelatin microparticles, according to one or more embodiments shown and described herein.

In some conventional printing systems an oil-based yield-stress fluid may be used as a support matrix [45]. In this case, aqueous hydrogel droplets deposited in this oil-based yield-stress fluid spontaneously adopt a spherical shape to minimize the interfacial free energy between the two immiscible fluids. However, in the DASP systems and methods of the present disclosure, both the hydrogel composition of the bio-ink and the sacrificial support matrix 140 are aqueous and, therefore, have negligible interfacial tension. Moreover, although being optically semi-transparent, the sacrificial support matrix 140 is non-homogeneous at microscopic scale, because it consists of fragmented gelatin microparticles that can have a wide distribution in size and shape. Referring now to FIG. 13, a surface of a hydrogel voxel 102 in contact with the sacrificial support matrix 140 comprising the gelatin microparticles 142 is schematically depicted. As shown in FIG. 13, the aqueous hydrogel composition of the hydrogel voxel 102 may be flowable during and initially after printing and may flow to conform to the irregular shape caused by the inhomogeneity in particle shapes and sizes of the gelatin microparticles. The hydrogel may also flow into spaces between the gelatin microparticles.

Figure 14:
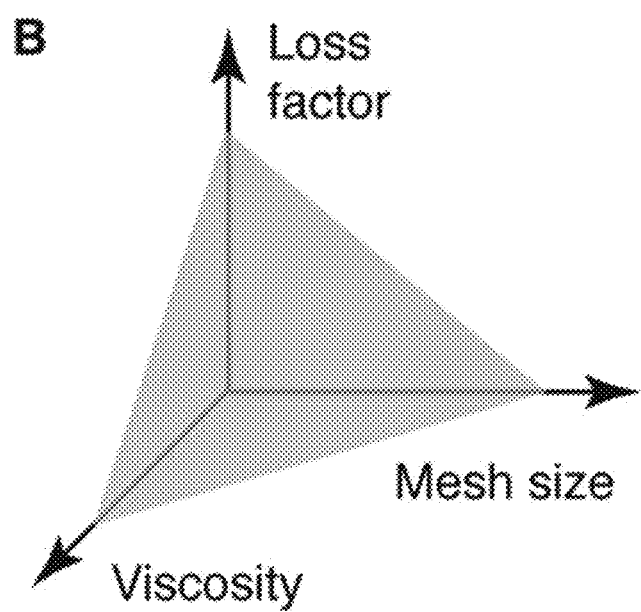
FIG. 14 graphically depicts relationships between viscosity, mesh size, and loss factor for hydrogel compositions used as bio-inks, according to one or more embodiments shown and described herein.

To maintain good fidelity of the hydrogel voxels 102 during and immediately after printing, the hydrogel composition of the bio-ink may have a relatively high viscosity such that the hydrogel composition of a printed hydrogel voxel 102 does not flow through the porous sacrificial support matrix 140 in a short time before cross-linking can occur. In addition, alginate-based hydrogels are not simple Newtonian fluids, but rather are complex viscoelastic fluids. This poses a challenge for printing hydrogel voxels because the dragging force associated with detaching the microfluidic printhead 130 from the hydrogel voxel 102 may mechanically deform the hydrogel voxel 102. The dragging effect is schematically depicted in FIG. 13, in which the velocity V of the microfluidic printhead 130 is indicated by the arrow and the drag forces can cause the hydrogel voxel 102 to deform. Such a dragging effect may be more pronounced for a more elastic hydrogel voxel. As a result, to be suitable for particle printing, the hydrogel composition of the bio-ink may have relatively a high viscosity with a low elasticity. Low elasticity can be indicated by a high loss factor. The relationship between viscosity and loss factor (i.e., elasticity) for the hydrogel compositions of the present disclosure is shown graphically in FIG. 14. Good fidelity of a hydrogel voxel 102 refers to the hydrogel voxel having a generally spherical shape with a minimum of deformation caused by flow of the hydrogel composition into the sacrificial support matrix or dragging forces during separation of the microfluidic printhead from the hydrogel voxel.

Other than viscoelasticity, the hydrogel compositions used as the bio-ink should have a mesh size after cross-linking that is tunable to satisfy mass transport requirements of various applications. As used herein, the term "mesh size" refers to an average distance between molecules of the polymers making up the hydrogel composition after cross-linking and is related to the average size of the spaces or pores between polymer molecules through which bio-materials can diffuse into and out of the hydrogel voxels. The mesh size of the hydrogel composition after cross-linking may determine the size of molecules that can diffuse into or out of the hydrogel voxels and/or the rate at which molecules can diffuse into and out of the hydrogel voxels. For instance, a greater mesh size of the hydrogel composition may improve the efficiency of nutrient transport into the hydrogel voxels by providing greater diffusion rates of nutrients into the hydrogel voxels. In some applications, however, hydrogel compositions with a relatively small mesh size may be needed to reduce or prevent diffusion of certain species into the hydrogel voxels, such as but not limited to applications involving protecting encapsulated cells from immune attack [55]. Unfortunately, the mesh size and the viscosity of hydrogels are intrinsically coupled. Both mesh size and viscosity of the hydrogel composition increase with the concentration of alginate polymers in the hydrogel composition.

Figure 15:
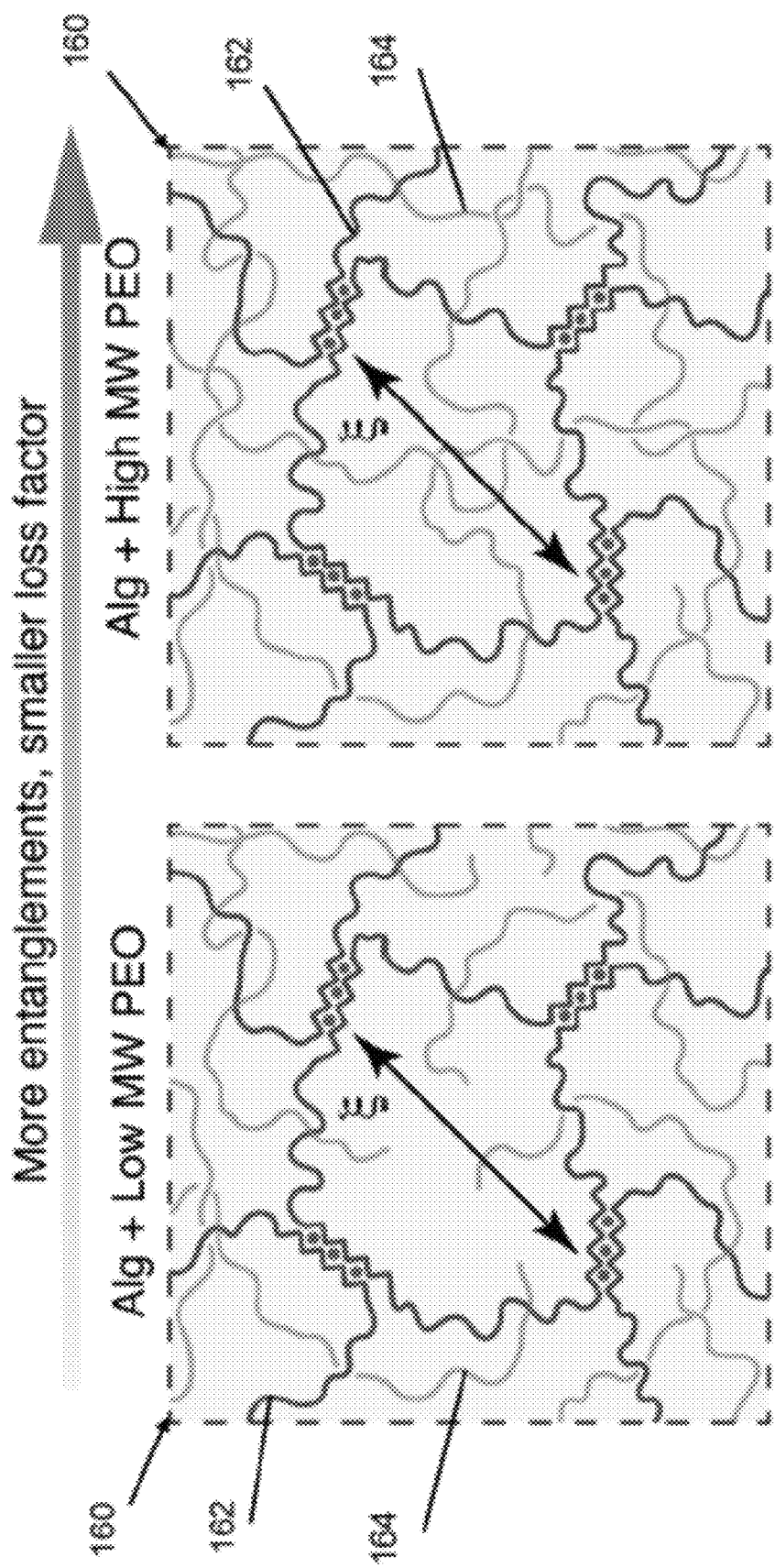
FIG. 15 schematically depicts hydrogel compositions comprising alginate polymer and poly (ethylene oxide) polymer after cross-linking of the alginate polymer and having differing degrees of entanglements of the poly (ethylene oxide) polymers, according to one or more embodiments shown and described herein.

To solve this challenge, the DASP systems and methods of the present disclosure can utilize a hybrid bio-ink comprising a hydrogel composition that includes a mixture of an alginate polymer and a second long chain linear polymer, such as poly (ethylene oxide) (PEO), which is a polymer widely used for biomedical applications. The hydrogel composition may also include one or a plurality of cells. The alginate polymer can form a cross-linked network that may determine the mesh size of the hydrogel composition following cross-linking. The long linear PEO polymers do not crosslink. Instead, the long linear PEO polymers form physical entanglements, which may influence the viscoelastic behavior of the hydrogel composition. Thus, incorporating both an alginate polymer and PEO polymer into the hydrogel composition may enable independent control over the mesh size and viscoelasticity of the hydrogel composition. Referring now to FIG. 15, hydrogel compositions 160 comprising the cross-linked alginate polymers 162 and the long chain PEO polymers 164 with a lesser concentration (left side) and a greater concentration (right side) of the PEO polymers 164 is schematically depicted. The hydrogel compositions 160 both have the same alginate concentration and, therefore, have the same mesh size, as indicated by the double arrows labeled X in FIG. 15. However, the hydrogel composition 160 on the right side with the greater concentration of PEO polymers may have the same mesh size, but with different viscoelastic behavior compared to the hydrogel composition 160 having the lesser concentration of PEO polymers (left side). The hydrogel composition 160 on the left may have a smaller loss factor compared to the hydrogel composition 160 on the right side. This may be due to the greater degree of entanglement of the PEO polymers of the hydrogel composition 160 on the right hand side provided by the greater concentration of the PEO polymer 164. The long chains of the PEO polymer 164 may form entanglements with each other that increase the viscoelasticity and decrease the fluid loss of the hydrogel composition.

The hydrogel compositions may include an alginate polymer, a PEO polymer, or both in an aqueous solution. In embodiments, the hydrogel composition comprises alginate polymer and PEO polymer. The alginate may be any commercially available alginate. The alginate may be derived from alginic acid sodium salts obtained from brown algae. The hydrogel composition may comprise a concentration of alginate sufficient to produce a mesh size suitable for the particular application of the hydrogel voxels. In embodiments, the hydrogel composition may include greater than or equal to 1 w/v %, or greater than or equal to 1.5 w/v % alginate, where the w/v % is defined as the weight of the component (e.g., alginate polymer) divided by the volume of the hydrogel composition and the quotient multiplied by 100. The hydrogel compositions may include less than or equal to 5 w/v % or less than or equal to 4 w/v % alginate. The hydrogel compositions may include from 1 w/v % to 5 w/v %, from 1 w/v % to 4 w/v %, from 1.5 w/v % to 5 w/v %, or from 1.5 w/v % to 4 w/v % alginate.

These hydrogel compositions may include PEO. The PEO may have an average molecular weight of greater than or equal to 50 kiloDaltons (kDa, 50,000 grams per mole (g/mol)), greater than or equal to 100 kDa (100,000 g/mol), or even greater than or equal to 300 kDa (300,000 g/mol). For PEO having average molecular weight less than 50,000 g/mol, the linear PEO polymers may not have sufficient length to effect the desired viscoelastic properties of the hydrogel composition. The PEO may have an average molecular weight of less than or equal to 1,000 kDa (1,000,000 g/mol), less than or equal to 500 kDa (500,000 g/mol), or even less than or equal to 300 kDa (300,000 g/mol). When the molecular weight of the PEO is greater than 1,000 kDa, the length of the PEO polymer molecules may be sufficient so that the entanglements of the PEO molecules act more like cross-linking to increase the elasticity and decrease the loss factor of the hydrogel composition, which may lead to increased likelihood of deforming the hydrogel voxels during printing. In embodiments, the PEO may have an average molecular weight of from 50,000 g/mol to 1,000.00 g/mol, from 50,000 g/mol to 500,000 g/mol, from 50,000 g/mol to 300,000 g/mol, from 100,000 g/mol to 1,000,000 g/mol, from 100,000 g/mol to 500,000 g/mol, from 100,000 g/mol to 300,000 g/mol, from 300,000 g/mol to 1,000,000 g/mol, from 300,000 g/mol to 500,000 g/mol, or from 500,000 g/mol to 1,000,000 g/mol.

These hydrogel compositions may have a concentration of PEO polymer sufficient to modify the viscoelastic properties and loss factor of the hydrogel compositions. In embodiments, the hydrogel compositions include greater than or equal to 3 w/v %; or greater than or equal to 4 w/v % PEO polymer, where the w/v % is defined as the weight of the component (e.g., PEO polymer) divided by the volume of the hydrogel composition and multiplied by 100. The hydrogel compositions may include less than or equal to 8 w/v %, or less than or equal to 7 w/v % PEO polymer. The hydrogel compositions may include from 3 w/v % to 8 w/v %, from 3 w/v % to 7 w/v %, from 4 w/v % to 8 w/v %, or from 4 w/v % to 7 w/v % PEO polymer. In embodiments, the hydrogel composition may not include the PEO polymer.

The hydrogel voxels may include one or more cells of bacterial cells, animal tissue cells, human tissue cells, and combinations thereof. In various embodiments, the cells are bacterial cells. In embodiments, the bacterial cells are *E. coli* cells. In other embodiments, the hydrogel composition does not include cells.

In embodiments, the hydrogel composition consists of or consists essentially of water, an alginate polymer, a PEO polymer, and optionally, one or more cells. In embodiments, the hydrogel composition consists of or consists essentially of from 1 w/v % to 4 w/v % alginate, from 3 w/v % to 8 w/v % PEO polymer, water, and optionally one or more cells. In embodiments, the hydrogel composition may consist of or consist essentially of water, alginate polymer, and optionally one or more cells.

In embodiments, the hydrogel compositions are prepared by dissolving alginic acid sodium salt in deionized (DI) water at a concentration of from 1 w % per volume to 4 wt. % per volume. When PEO polymer is present, the PEO polymer may be added to the DI water at a concentration of from 3 wt. % to 8 wt. % PEO polymer per volume of hydrogel composition. The mixture may then be sonicated for 2 hours at 60° C. to make a homogeneous solution. The homogeneous solution may then be cooled at 4° C. for a period of time sufficient to produce the hydrogel composition. In embodiments, the DI water is replaced by lysogenic broth (LB) media.

In embodiments, the plurality of hydrogel voxels include a hydrogel composition comprising an extracellular matrix and at least one cell. The extracellular matrix may comprise the hydrogel, such as the alginate hydrogel, with or without the PEO polymer. The hydrogel voxels may comprise at least one cell selected from the group consisting of bacterial cells, animal tissue cells, human tissue cells, and combinations of these. The cells may be bacterial cells; and the bacterial cells may be *E. coli*. Each of the plurality of hydrogel voxels may have a volume of from 16 nanoliters to 418 nanoliters. The hydrogel voxels may undergo cross-linking when contacted with calcium ions from the sacrificial support matrix 140.

In embodiments, the hydrogel compositions used as the bio-ink have a viscosity sufficient to prevent the hydrogel composition from flowing into the pores in the sacrificial support matrix 140 during and immediately after printing before any cross-linking can occur. The hydrogel compositions may have a viscosity of greater than or equal 100 pascal seconds (Pa·s), where the viscosity is determined using a stress-controlled rheometer (Anton Paar, MCR 302) with 25 mm plate-plate geometry at 20° C. according to the test method disclosed herein. The viscosity of the hydrogel composition is the value of the viscosity at the lowest shear rate $0.01\ s^{-1}$. The hydrogel compositions may have a viscosity of from 100 Pas to 150 Pas.

The hydrogel compositions used as the bio-ink may have a loss factor sufficient to prevent the hydrogel voxels from deforming due to drag caused by separation of the microfluidic printhead from the hydrogel voxel during printing. In embodiments, the hydrogel composition may have a loss factor of greater than or equal to 1.2 or greater than or equal to 1.5. The hydrogel composition may have a loss factor of less than or equal to 2.0 or less than or equal to 1.8. The hydrogel compositions may have a loss factor of from 1.2 to 2.0, from 1.2 to 1.8, from 1.5 to 2.0, or from 1.5 to 1.8. The loss factor may be determined according to the methods disclosed herein.

Referring now to FIGS. 1 and 13, operation of the DASP system 100 for assembling hydrogel voxels to form structures, such as 1D filaments, 2D arrays, or free-standing 3D lattice structures will now be described. The sacrificial support matrix 140 may first be prepared according to the methods described herein. The sacrificial support matrix 140 may be placed on the platform 112 of the 3D motion system 110. The hydrogel composition may be prepared according to the methods described herein and introduced to the extrusion device 120 and microfluidic printhead 130. The 3D motion system 110 may be operated to position the tip 136 of the microfluidic printhead 130 as a first location within the sacrificial support matrix 140. Once in the position, the extrusion device 120 may be operated to dispense a fixed volume of the hydrogel composition from the microfluidic printhead 130 to form a hydrogel voxel 102 (FIG. 16) disposed at the first location within the sacrificial support matrix 140. The hydrogel voxel 102 may be supported by the sacrificial support matrix 140 with the viscosity of the hydrogel voxel 102 reducing or prevent the flow of the hydrogel composition into the sacrificial support matrix 140.

After dispensing a hydrogel voxel 102 from the microfluidic printhead 130, the extrusion device 120 is halted and the 3D motion system 110 is operated again to re-position the tip 136 of the microfluidic printhead 130 at a second position within the sacrificial support matrix 140. To print a plurality of hydrogel voxels 102, a 'forward-then-backward' method may be used to drive the microfluidic printhead 130 in the sacrificial support matrix 140. In particular, operating the 3D motion system 110 to position the tip 136 of the microfluidic printhead 130 at the second location may include moving the microfluidic printhead 130 in the direction of the second location and past the second location by at least 3 mm, or at least 3.5 mm and then moving the microfluidic printhead 130 back to the second position. Moving the tip 136 of the microfluidic printhead 130 past the second location by a distance and then moving the tip 136 back to the second location may enable the tip 136 of the microfluidic printhead 130 to be moved away from the first hydrogel voxel 102 at a speed sufficient to separate the tip 136 from the hydrogel voxel without deforming the hydrogel voxel 102. Such an excess forward movement may allow the tip 136 of the nozzle 134 of the microfluidic printhead 130 to be detached from the printed droplet of the hydrogel voxel 102 at a fast speed, which may reduce or prevent skewing of the hydrogel voxel 102 due to the viscous drag between the tip 136 of the nozzle 134 and the hydrogel composition.

With the microfluidic printhead 130 positioned at the second location, the extrusion device 120 may be operated to deposit a second volume of the hydrogel composition to form a hydrogel voxel 102 at the second location within the sacrificial support matrix 140. The repositioning using the 3D motion system 110 and operation of the extrusion device 120 to deposit a hydrogel voxel 102 may be repeated a plurality of times to deposit a plurality of hydrogel voxels 102 within the sacrificial support matrix 140 to form a structure. The sacrificial support matrix 140 may provide support for the hydrogel voxels 102 during depositing and cross-linking of the hydrogel voxels 102.

Figure 17:
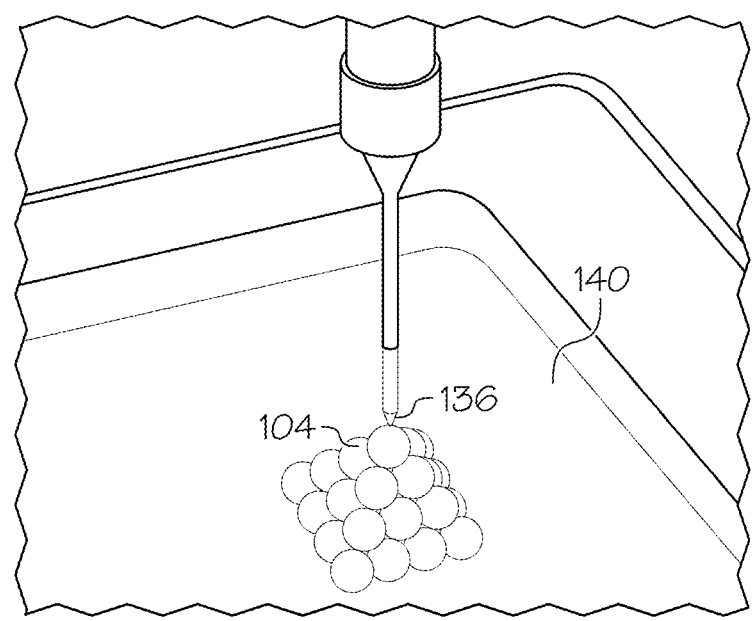
FIG. 17 schematically depicts cross-linking and interconnection of the hydrogel voxels of FIG. 13 within the sacrificial support matrix, according to one or more embodiment shown and described herein.

Referring now to FIG. 17, the hydrogel voxels 102 may be maintained within the sacrificial support matrix 140 for a period of time, during which contact of the hydrogel voxels 102 with the calcium ions in the sacrificial support matrix 140 may cause the hydrogel voxels 102 to undergo crosslinking. As previously discussed, "cross-linking" refers to the formation of ionic or covalent bonds linking two molecules of a compound, such as an alginate or other polymeric material. During cross-linking of the hydrogel voxels 102, the presence of the calcium ions in the sacrificial support matrix 140 may facilitate cross-linking between alginate molecules proximate the outer surface of one hydrogel voxel and alginate molecules proximate the outer surface of another adjacent hydrogel voxel. The cross-linking between alginate molecules of the two hydrogel voxels may cause the two hydrogel voxels to become attached or bonded to each other through a cross-linked alginate polymer network. Additionally, alginate molecules within each of the hydrogel voxels 102, in particular alginate molecules proximate the outer surfaces of each hydrogel voxel 102, may cross-link with each other to form a cross-linked alginate polymer matrix, which may cause the hydrogel voxel to solidify and become stiffer. This solidification may reduce or prevent flow of the hydrogel composition out of the hydrogel voxel 102 and into the sacrificial support matrix 140 and may allow the hydrogel voxels 102 to develop the stiffness to become self-supporting. Although discussed in terms of alginate molecules, it is understood that the hydrogel compositions used as the bio-ink may include other constituents, such as polymers or other species, which may have reactive sites capable of enabling ionic or covalent bonding between molecules to constitute cross-linking.

The alginate molecules of the hydrogel voxel 102 may include a plurality of reactive sites capable of reacting to form the ionic or covalent bonds between alginate molecules that cross-link the alginate molecules. The components of the hydrogel, such as alginates in the hydrogel for example, may undergo cross-linking in the presence of the calcium to form a gel. The gelation time refers to the time that the hydrogel composition begins to solidify, which refers to the time when the storage modulus G' of the hydrogel exceeds the loss modulus G". As previously discussed, partial cross-linking of the alginates in the hydrogel composition may refer to a degree of cross-linking between the alginate molecules that is sufficient for the storage modulus and the loss modulus to change as a function of time. When the degree of cross-linking reaches full cross-linking, the storage modulus and loss modulus of the hydrogel voxels attain constant values again.

Once the plurality of hydrogel voxels 102 are at least partially cross-linked, such as cross-linked to the point where the storage modulus of the hydrogel composition exceeds the loss modulus of the hydrogel composition, the sacrificial support matrix 140 may be removed and the hydrogel voxels 102 washed with a solution comprising calcium ions to complete cross-linking of the hydrogel voxels 102. The result may be a 3D lattice structure such as the lattice structure 104 shown in FIG. 18.

The DASP system 100 may be communicatively coupled to a machine operable to control operation of the DASP system 100. The machine may include at least one processor, at least one computer readable medium, and computer readable and executable instructions stored on the at least one computer readable medium. The at least one processor may be communicatively coupled to the computer readable medium, the three-dimensional motion system, the extrusion device, or combinations of these. The machine communicatively coupled to the DASP system 100 is described in further detail herein.

The machine readable and executable instructions may be read and executed by the processor to cause the system 100 to perform any of the method steps described herein. In embodiments, the computer readable and executable instructions, when executed by the at least one processor, may cause the system 100 to automatically position the microfluidic printhead 130 at a first position in the sacrificial support matrix 140, extrude a first volume of the hydrogel composition at the first position to form a first hydrogel voxel 102, move the microfluidic printhead 130 in the direction of a second position by at least 3.0 mm or at least 3.5 mm, move the microfluidic printhead 130 back to the second position, and extrude a second volume of the hydrogel composition at the second position to produce a second hydrogel voxel 102. Other aspects of the methods disclosed herein or method steps thereof may be conducted through execution of machine readable and executable instructions by the processor of the machine.

Figure 16:
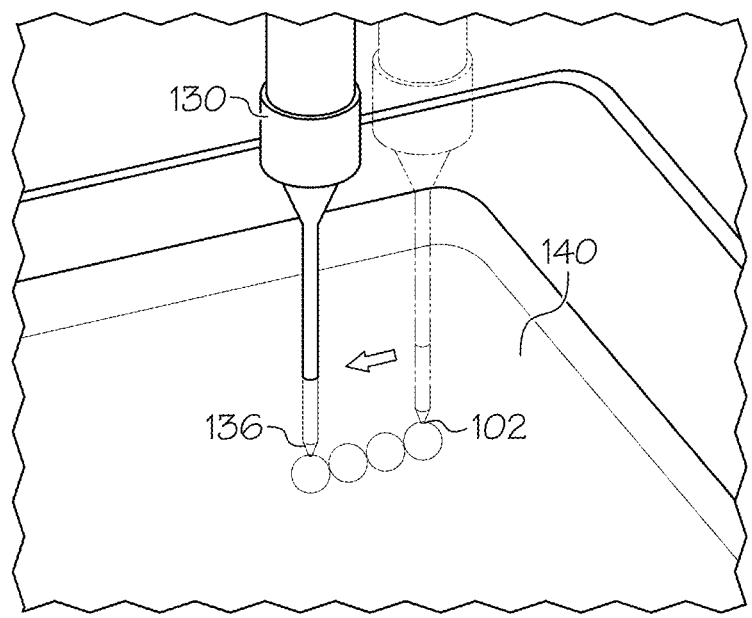
FIG. 16 schematically depicts deposition of a plurality of hydrogel voxels within a sacrificial support matrix, according to one or more embodiment shown and described herein.
Figure 18:
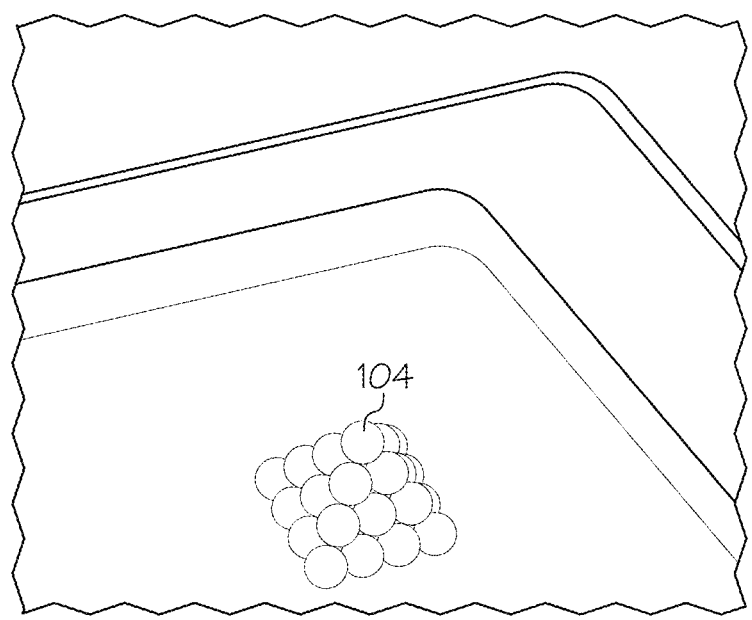
FIG. 18 schematically depicts a 3D lattice structure formed from the hydrogel voxels of FIG. 17 following removal of the sacrificial support matrix and washing, according to one or more embodiment shown and described herein.

Methods of assembling hydrogel voxels to form a structure, such as a 1D filament, 2D array, and/or a 3D lattice structure, using the DASP system 100 disclosed herein will now be described. Referring to FIGS. 16-18, the methods of assembling the hydrogel voxels 102 to form a structure may include depositing the plurality of hydrogel voxels 102 within the sacrificial support matrix 140 and at least partially cross-linking the plurality of hydrogel voxels 102 to form the structure comprising a 1D line or filament, a 2D array, or a free-standing 3D lattice. The hydrogel voxels 102 may be generally spherical in shape. The hydrogel voxels 102 may be interconnected but distinguishable from one another.

Referring to FIGS. 1 and 13, depositing the plurality of hydrogel voxels 102 within the sacrificial hydrogel matrix 140 may include positioning the microfluidic printhead 130 within the sacrificial support matrix 140 and mechanically extruding the hydrogel composition through the microfluidic printhead 130. The methods may further include preparing the hydrogel composition, the sacrificial support matrix 140, or both according to the methods disclosed herein. The hydrogel composition and the sacrificial support matrix 140 may have any of the compositions or properties previously described herein for these materials.

Referring to FIG. 1, the microfluidic printhead 130 may be positioned within the sacrificial support matrix 140 using the 3D motion system 110. The microfluidic printhead 130 and the 3D motion system 110 may have any of the features previously discussed herein for the microfluidic printhead 130 and the 3D motion system, respectively. The microfluidic printhead 130 may be positioned so that the tip 136 of the nozzle 134 of the microfluidic printhead 130 is positioned at a location in the sacrificial support matrix 140 at which deposition of the hydrogel voxel 102 is desired.

After positioning the tip 136 of the microfluidic printhead 130 within the sacrificial support matrix 140, the method may include mechanically extruding the hydrogel composition through the microfluidic printhead 130 with the extrusion device 120. The extrusion device 120 may have any of the features previously described herein for the extrusion device 120. In embodiments, mechanical extruding of the hydrogel composition is not conducted using a pneumatic injection system. The methods may include mechanically extruding the hydrogel composition at an injection speed of from 40 nanoliters per second to 680 nanoliters per second for each of the plurality of hydrogel voxels 102.

Referring again to FIG. 16, after depositing one hydrogel voxel 102, the method may include repositioning the microfluidic printhead 130 to deposit another hydrogel voxel. As previously discussed, a forward and backward method may be used to detach the tip 136 of the nozzle 134 from the hydrogel voxel 102 and reposition the microfluidic printhead 130 at the next position in the sacrificial support matrix 140. In particular, the methods may include moving the nozzle 134 towards and past the next location by at least 3 mm or at least 3.5 mm, and then moving the nozzle 134 back to the targeted location. As previously discussed, such an excess forward movement may allow the tip 136 of the nozzle 134 to be detached from the printed hydrogel voxel 102 at a fast speed, which may reduce or prevent skewing of the hydrogel voxel due to the viscous drag between the tip 136 and the hydrogel composition. In the methods disclosed herein, depositing the plurality of hydrogel voxels 102 may include positioning the microfluidic printhead 130 at a first position in the sacrificial support matrix 140, extruding a first volume of the hydrogel composition at the first position, moving the microfluidic printhead 130 past a second position by a distance of at least 3.5 mm, moving the microfluidic printhead 130 back into position at the second position, and extruding a second volume of the hydrogel composition at the second position. Moving the microfluidic printhead 130 past the second position by a distance of at least 3.5 mm may detach the microfluidic printhead 130 from the hydrogel voxel 102 at the first position at a speed sufficient to reduce or prevent deformation of the hydrogen voxel 102.

The hydrogel voxels 102 may be generally spherical in shape. In embodiments, each of the points on the outer surface of each of the plurality of hydrogel voxels 102 is within 11% of an average radius of the hydrogel voxels at the time the hydrogel voxels are deposited and before any swelling of the hydrogel voxels.

The methods may include depositing the plurality of hydrogel voxels 102 having an average diameter of from 150 μm to 1200 μm after swelling. The average diameter of the hydrogel voxels 102 may depend on the volume of hydrogel composition extruded for each hydrogel voxel 102. In embodiments, the methods may include extruding from 16 nanoliters (nL) to 418 nL from the microfluidic printhead 130 for each hydrogel voxel 102. In other words, each hydrogel voxel 102 may include from 16 nL to 418 nL of the hydrogel composition.

The injection volume may also influence the morphology of the hydrogel voxels 102. The surfaces of the hydrogel voxels have been found to become less smooth for larger hydrogel voxels (e.g., greater volume), as shown by optical microscopy images of hydrogel voxels 102 of various diameters in FIG. 19. This is likely a result of hydrogel swelling, a phenomenon common to a polymer solution in the presence of solvents. Upon swelling, the hydrogel voxels 102 may experience anisotropic deformation from the jammed, polydisperse gelatin microparticles in the sacrificial support matrix 140. The variation in deformation of the hydrogel voxels 102 may become more pronounced for hydrogel particles that swell by a larger extent (e.g., hydrogel voxels having a greater volume and diameter). Indeed, the measured particle diameters of the hydrogel voxels 102 are greater than the predicted value of the diameter, and the absolute increase in the diameter is greater for larger hydrogel voxels. Yet, the swelling ratio, defined as the measured particle diameter over the theoretical value of the particle diameter calculated from the volume dispensed, has been found to be nearly constant at 1.2 for all particle sizes. Thus, during cross-linking of the hydrogel voxels 102, the particle diameters of the hydrogel voxels 102 may increase by as much as 11%.

The swelling of the hydrogel voxels 102 may be taken into account when depositing hydrogel particles to create structures in which two neighboring hydrogel voxels 102 are only partially coalesced to form a network of interconnected yet distinguishable hydrogel voxels 102. The connectivity between hydrogel voxels 102 is determined by the particle diameter d and the center-to-center distance l between two neighboring particles. A ratio of the center-to-center distance l to the average diameter d of the hydrogel voxels 102 (e.g., l/d) may be from 0.8 to 1.7, or from 0.8 to 1.3, or about 1. These methods include deposition of the plurality of hydrogel voxels 102 at a center-to-center distance between the hydrogel voxels 102 that is from 0.8 to 1.7 times, or from 0.8 to 1.3 times, the average diameter of the hydrogel voxels 102.

The 0D voxel-based printing embodied by the DASP systems 100 and methods disclosed herein can be converted to classical 1D filament-based printing by decreasing the center-to-center distance l between neighboring hydrogel voxels 102. The methods disclosed herein may include reducing the center-to-center distance l between the hydrogel voxels 102 to produce a 1D hydrogel filament. By reducing the center-to-center distance l to produce a 1D filament, the quality of the cylindrical hydrogel 1D filament can be improved to exhibit a smaller filament diameter and a smoother surface compared to conventional methods. Moreover, because of the small diameter of the tip 136 of the microfluidic printhead 130, the filament diameter of the hydrogel filament can be decreased to 150 μm, which is comparable to the resolution of existing extrusion-based techniques. Furthermore, the methods of the present disclosure may include dynamically controlling the diameter d of the hydrogel voxels 102 during printing, thereby enabling printing heterogeneous structures. In embodiment, the methods disclosed herein may include deposing hydrogel voxels having different average diameters, such as but not limited to alternating small diameters and large diameters. Conventional methods of printing 1D filaments are not capable of varying the shape of the filament in this manner.

Referring again to FIG. 17, the methods disclosed herein include cross-linking the hydrogel voxels 102 while they are supported by the sacrificial support matrix 140. The hydrogel voxels 102 may be cross-linked to the point where the storage modulus of the hydrogen composition exceeds the loss modulus. This may allow the hydrogel voxels 102 to maintain the structure, such as a 3D lattice structure, following removal of the sacrificial support matrix 140. Cross-linking the plurality of hydrogel voxels 102 may include contacting the plurality of hydrogel voxels 102 with the calcium ions pre-dissolved in the sacrificial support matrix 140. Cross-linking the plurality of hydrogel voxels 102 may further comprise maintaining the plurality of hydrogel voxels 102 in the sacrificial support matrix 140 for a time duration of greater than or equal to 180 seconds or greater than or equal to 200 seconds. The methods may include maintaining the plurality of hydrogel voxels 102 in the sacrificial support matrix 140 for a time duration of from 180 seconds to 500 seconds, or from 200 seconds to 500 seconds. In embodiments, the plurality of hydrogel voxels 102 may be maintained in the sacrificial support matrix 140 for longer than 500 seconds.

The success of printing spherical hydrogel voxels 102 to produce voxel-based structures, such as 3D lattice structures in particular, depends on the individual alginate hydrogel voxels 102 becoming interconnected with each other. This interconnection may depend on a balance between the rate of gelation and cross-linking of the hydrogel voxels 102 and the printing speed. The cross-linking may cause the hydrogel voxels 102 to at least partially solidify into a gel, which aids in interconnecting the hydrogel voxels 102 and preventing the hydrogel from flowing out of the hydrogel voxel 102 through formation of a cross-linked alginate polymer network. The rate of cross-linking or gelation of the hydrogel voxels 102 should be slow enough to allow for printing of multiple hydrogel voxels 102 before gelation of the hydrogel voxels 102. As previously discussed, the rate of cross-linking of the hydrogel voxels 102 is proportional to the concentration of the calcium ions pre-dissolved in the sacrificial support matrix 140. As previously discussed, the concentration of calcium ions in the sacrificial support matrix 140 may be sufficient to cause gelation of the hydrogel voxels 102 in a gelation time of from 10 seconds to 300 seconds, or about 200 seconds. This may allow many hydrogel voxels 102 to be deposited within the sacrificial support matrix 140 before gelation occurs. In embodiments, the concentration of calcium ions in the sacrificial support matrix 140 may be from 3 mM (millimolar) to 48 mM, from 4 mM to 15 mM, or about 6 mM.

Once the depositing/printing of the hydrogel voxels 102 is completed, the printed arrangement/structure of hydrogel voxels 102 may be kept in the sacrificial support matrix 140 for a period of time sufficient for the cross-linking of the alginate polymers to cause the storage modulus G' of the hydrogel composition to exceed the loss modulus G" so that the hydrogel voxels 102 are able to support themselves once the sacrificial support matrix 140 is removed. The structure of hydrogel voxels 102 may be kept in the sacrificial support matrix 140 for at least 3 minutes. The movement speed of the microfluidic printhead 130 by the 3D motion system 110, the neighboring center-to-center distance l between hydrogel voxels 102, and the concentration of calcium ions are adjusted to ensure each hydrogel voxel 102 is distinguishable yet interconnected with other hydrogel voxels 102.

Referring now to FIG. 18, after maintaining the hydrogel voxels 102 in the sacrificial support matrix 140 for at least 3 minutes, the sacrificial support matrix 140 may be removed and the hydrogel voxels 102 further cross-linked through washing the printed structure with a calcium solution. The methods disclosed herein may include, after at least partially cross-linking the plurality of hydrogel voxels 102, washing the plurality of hydrogel voxels 102 with a calcium solution. The washing with the calcium solution may further cross-link the plurality of hydrogel voxels 102 and may dissociate and/or dissolve the sacrificial support matrix 140 to leave the free-standing structure 104 comprising the interconnected yet distinguishable hydrogel voxels 102. Washing the plurality of hydrogel voxels 102 may include immersing the sacrificial support matrix 140 and the plurality of hydrogel voxels 102 in a bath comprising a calcium solution at 37° C. for an immersion time of from 3 minutes to 6 minutes, or about 5 minutes. The calcium solution may have a concentration of calcium ions of from 5 mM to 50 mM, such as from 5 mM to 30 mM, or from 30 mM to 50 mM. The concentration of calcium ions in the calcium solution may be sufficient to ensure full cross-linking of the hydrogel voxels without impairing the viability of encapsulated living objects such as bacteria or other cells, such as mammalian tissue cells, encapsulated within the hydrogel voxels 102. Moreover, the elevated temperature of the calcium solution may facilitate the dissociation of gelatin microparticles in the sacrificial support matrix, leaving a free-standing 3D lattice structure consisting of the interconnected but distinguishable hydrogel voxels 102 (FIG. 18).

Consequently, the DASP methods disclosed herein may enable digital assembly of spherical hydrogel voxels 102 to form 3D lattice structures 104. In embodiments, the structure may be a free-standing three dimensional lattice. In embodiments, the structure may be a 2D array or a 1D line or filament. Each of the spherical hydrogel voxels 102 may be interconnected and may be distinguishable from each other when viewed through optical microscopy within one hour of cross-linking the hydrogel voxels 102 and/or washing the hydrogel voxels 102. In embodiments, the methods disclosed herein may include adjusting the movement speed of the microfluidic printhead 130, the center-to-center distance l between adjoining hydrogel voxels 102, a concentration of calcium ions in the sacrificial support matrix 140, or combinations of these to modify the spacing, cross-linking, or both of the plurality of hydrogel voxels 102.

After cross-linking, the hydrogel voxels 102 may have a tunable mesh size of the cross-linked polymer network. Tuning the mesh size of the cross-linked polymer network by modifying the concentration of alginate polymer in the hydrogel composition may allow for changing the diffusion rate of various biomolecules into and/or out of the hydrogel voxels 102. In embodiments, the hydrogel voxels 102 may have a mesh size sufficient to allow biomolecules, such as nutrient solutions and such, to be delivered to cells within the hydrogel voxels 102 or wastes removed from the hydrogel voxels through diffusion of these materials through the cross-linked alginate polymer network. In embodiments, the hydrogel voxels 102 may have a mesh size that is small enough to reduce or prevent one or more specific biomolecules or bioagents from diffusing into the hydrogel voxels 102. The hydrogel voxels 102 may have a mesh size of from 6 nanometers (nm) to 12 nm, or from 9 nm to 12 nm.

The structures, such as 3D lattice structures, produced from the DASP systems methods may be porous structures comprising a porous network comprising the interstitial spaces between the hydrogel voxels 102. The interstitial spaces between the hydrogel voxels 102 may provide fluid pathways to allow flow of fluids (liquids and/or gases) through the structure comprising the hydrogel voxels 102. This porosity may enable nutrient solutions to be more evenly and efficiently delivered to cell contained within the hydrogel voxels 102. In embodiments, the pores formed by the interstitial spaces between the hydrogel voxels 102 may have a size of around 200 µm measured diagonally across the cross-section of the pore. The pores formed by the interstitial spaces between hydrogel voxels 102 may be larger or smaller depending on the average size of the hydrogel voxels and the center-to-center distance between hydrogel voxels when printing. Larger pores or channels through the printed structures can also be formed through design of the printed structure. In other words, the DASP systems and methods can be used to print complex structures having open channels extending through portions of the 3-D lattice structure. The efficiency of exchange of materials, such as but not limited to nutrient solutions or water materials, to or from the hydrogel voxels 102 may depend on the porosity of the structure formed from the hydrogel voxels 102 as well as the mesh size of the individual hydrogel voxels 102.

Figure 20:
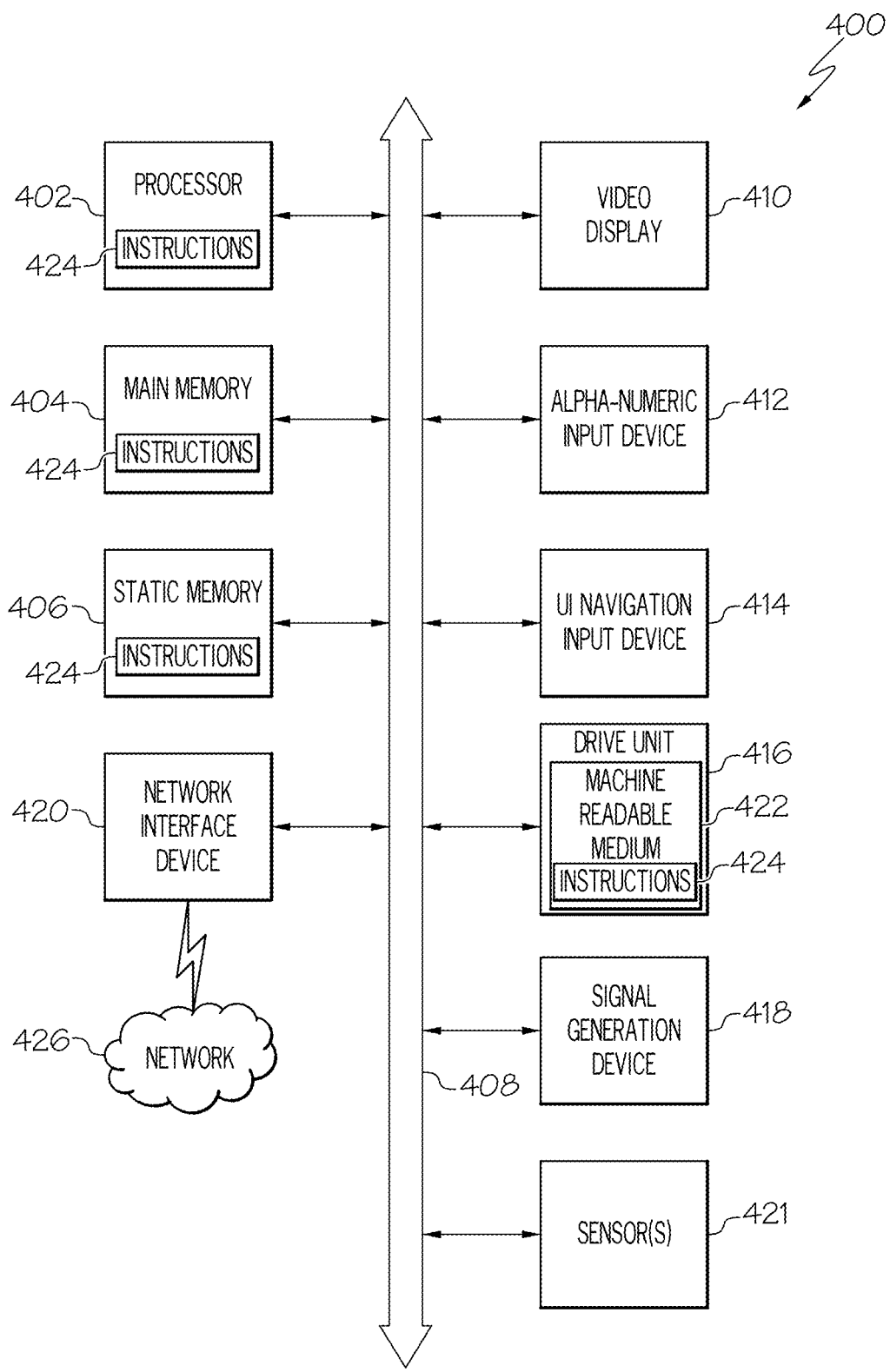
FIG. 20 schematically depicts a machine for operating the system of FIG. 1, according to one or more embodiments shown and described herein.

Referring now to FIG. 20, a block diagram illustrating an example of a machine upon which one or more aspects of embodiments of the present disclosure can be implemented. An aspect of an embodiment of the present disclosure may include, but is not limited thereto, a system, method, and computer readable medium that provides at least one or more of the following: a) printing 1D lines, 2D arrays, and free-standing 3D lattices consisting of interconnected yet distinguishable spherical hydrogel voxels; b) microfluidics-assisted 3D bioprinting technique that enables digital assembly of 0D hydrogel voxels rather than conventional 1D filaments to form free-standing 3D lattices; c) that DASP permits the digital assembly of spherical hydrogel particles to form 3D free-standing lattice structures; d) for the capability DASP in printing free-standing 3D lattice structures in which individual particles are interconnected while being distinguishable from each other, which illustrates a block diagram of an example machine 400 upon which one or more embodiments (e.g., discussed methodologies) can be implemented (e.g., run).

Examples of machine 400 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

As used herein, the term "circuit" refers to a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one point in time and to constitute a different circuit at a different point in time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In embodiments, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In embodiments, the circuits referred to herein can comprise processor-implemented circuits.

Similarly, the methods described herein can be at least partially processor-implemented. For example, at least some of the operations of a method can be performed by one or more processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 400) and software architectures that can be deployed in example embodiments.

In an example, the machine 400 can operate as a stand-alone device or the machine 400 can be connected (e.g., networked) to other machines.

In a networked deployment, the machine 400 can operate in the capacity of either a server or a client machine in server-client network environments. In an example, machine 400 can act as a peer machine in peer-to-peer (or other distributed) network environments. The machine 400 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 400. Further, while only a single machine 400 is illustrated, the term "machine" shall also be taken to include any collection of machines that individually or jointly execute a set (or multiple sets) of instructions to perform any one or more of the methodologies discussed herein.

Example machine (e.g., computer system) 400 can include a processor 402 (e.g., a central processing unit (CPU), a graphics processing unit (GPU) or both), a main memory 404 and a static memory 406, some or all of which can communicate with each other via a bus 408. The machine 400 can further include a display unit 410, an alphanumeric input device 412 (e.g., a keyboard), and a user interface (UI) navigation device 411 (e.g., a mouse). In an example, the display unit 810, input device 417 and UI navigation device 414 can be a touch screen display. The machine 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

The storage device 416 can include a machine readable medium 422 on which is stored one or more sets of data structures or instructions 424 (e.g., software) embodying or utilized by any one or more of the methodologies or functions described herein. The instructions 424 can also reside, completely or at least partially, within the main memory 404, within static memory 406, or within the processor 402 during execution thereof by the machine 400. In an example, one or any combination of the processor 402, the main memory 404, the static memory 406, or the storage device 416 can constitute machine readable media.

While the machine readable medium 422 is illustrated as a single medium, the term "machine readable medium" can include a single medium or multiple media (e.g., a centralized or distributed database, and/or associated caches and servers) that configured to store the one or more instructions 424. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magnetooptical disks; and CD-ROM and DVD-ROM disks.

The instructions 424 can further be transmitted or received over a communications network 426 using a transmission medium via the network interface device 420 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

TEST METHODS

Rheological Characterization

All rheological measurements are performed using a stress-controlled rheometer (Anton Paar, MCR 302) with 25 mm plate-plate geometry at 20° C. To characterize the stress yield behavior of the sacrificial support matrix, a stress sweep from 0.1 Pa to 1000 Pa is conducted at an oscillatory frequency of 1 Hz. To characterize the self-healing behavior, the viscoelastic properties of the sacrificial support matrix are monitored while the sacrificial support matrix is subjected to a periodic destructive high shear strain. For each cycle, the shear strain is increased to 1000% within 1 sec, and then an oscillatory shear strain of 1% is applied at a frequency of 1 Hz for 200 sec, during which both storage modulus G' and loss modulus G" are measured.

To determine the gelation time of the hydrogel composition (bio-ink), the storage modulus G' and the loss modulus G" are monitored in real-time at an oscillatory shear frequency of 1 Hz and a shear strain of 1%. The gap size is set to 1 mm, which is comparable to the dimension of a printed hydrogel voxel. Once the reading is stable, an excess amount of calcium contained gelatin matrix is applied to fully cover the peripheral of the geometry. Simultaneously, G' and G" exhibit a sharp increase associated with the instantaneous physical contact between the matrix and the geometry. The effects of this physical contact on measured moduli are corrected by referencing the measurements with the sacrificial support matrix containing no calcium ions.

The dependence of viscosity of the hydrogel compositions on shear rate $\gamma$ is measured in the range of shear rate from 0.01 per second to 1000 per second (1/sec). For the hydrogel compositions suitable for use as bio-inks in the DASP system and methods herein, the viscosity is nearly constant at shear rates less than 1 per second, but the viscosity decreases rapidly at $\dot{\gamma} > 1$ s$^{-1}$ and becomes nearly two orders of magnitude smaller at high shear rates (>100 s$^{-1}$). These results suggest that hydrogel compositions suitable for use as bio-inks in the DASP systems and methods are shear-thinning fluids (see FIG. 29). Therefore, the value of the viscosity at the lowest shear rate 0.01 s$^{-1}$ is taken as the viscosity of a hydrogel composition/bio-ink herein.

To characterize the loss factor of a hydrogel composition/bio-ink, the dependencies of storage modulus G' and loss modulus G" of the hydrogel composition on strain in the range of 1% to 10000% at an oscillatory frequency of 1 Hz are determined. As expected for shear-thinning fluids, both G' and G" are nearly constant at shear strain lower than 50% but decrease dramatically above a shear strain of about 200% (see FIG. 30). The values of G' and G" at low strains are taken to determine the loss factor. The loss factor is determined from the equation tan $\delta$=G"/G'.

Characterization of Bio-Ink Mesh Size

Two independent methods can be used to characterize the mesh size of the hydrogel composition/bio-ink. For the first method, the shear modulus G' of the cross-linked hydrogel. Using the relation that the network shear modulus is $k_B T$ per volume occupied by a network strand, the mesh size is then calculated by the equation $\xi (k_B T/G')^{1/3}$, where $k_B$ is the Boltzmann constant, T is the absolute temperature, and G' is the storage modulus [57].

For the second method, protein mimics, in particular a fluorescently labeled dextran (Texas Red, 70 kDa), are encapsulated within a hydrogel voxel and the release profile of dextran molecules from the hydrogel voxel is quantified. Specifically, the fluorescently labeled dextran is dissolved in a hydrogel composition at a concentration of 2 mg/mL. A hydrogel voxel comprising the hydrogel composition and fluorescently labeled dextran is deposited into a cross-linking solution (DI water with 50 mM Ca$^{2+}$) to solidify the hydrogel voxel. The cross-linked hydrogel voxels are then immediately transferred to a washing medium comprising DMEM (without glucose, glutamine, phenol red, and sodium pyruvate—see materials in the Examples) and incubated for 30 minutes to fully equilibrate the cross-linked hydrogel voxels with the medium. The solutions for cross-linking and washing the bio-ink droplets contain the same 2 mg/mL dextran as that in the bio-ink droplet. This prevents the leak of encapsulated dextran molecules from the hydrogel voxels during cross-linking and washing. The washing medium is then replaced by a fresh DMEM medium that contains no dextran, during which the fluorescence of the particle is monitored using confocal laser scanning fluorescence microscopy (Leica SP8). The half-decay time of the fluorescence intensity of the fluorescently labeled dextran is proportional to the rate of diffusion of the dextran through the mesh and is used to assess the mesh size of the hydrogel particle.

Compression Testing

Because the bio-inks are soft, the force required to deform the material is small. To this end, a rheometer (Anton Paar MCR 302) with a normal force resolution of 0.5 mN is utilized to perform compression tests on the hydrogel voxels and 3D lattice structures prepared therefrom. The sample, in the form of either a bulk material or a printed 3D lattice, is placed onto the bottom geometry of the rheometer. The upper geometry of the rheometer is lowered to contact with the sample, at which the normal force is slightly above zero. During the compression measurements, the moving profile of the upper plate is pre-setup to exert cyclic and subsequent large compression at a fixed strain rate 0.005/sec. The normal force, gap size, and time and recorded and the stress and strain are calculated based on the pre-measured dimensions of the samples.

Cytocompatibility Test

To test the cytocompatibility of the DASP systems and methods, bacteria-laden hydrogel voxels are printed and the proliferation of bacteria is monitored. The gelatin sacrificial support matrix and the hydrogel composition (alginate bio-ink) using the methods described herein except for replacing DI water by lysogeny broth (LB) media. All the materials are sterilized using autoclave before use.

*E. coli*, BL21(DE3) pET-stFRET, a strain transfected to express fluorescence protein, is used as a model bacterium in the experiments described in the Examples. The bacteria is cultured in LB media at 37° C. using a shaking incubator (Thermo Scientific MAXQ 4450). When the $OD_{600}$ of the suspension reaches 0.6, IPTG with a final concentration of 1 mM is introduced to induce fluorescence, and the mixture is incubated for 2 hours. The bacteria suspension is mixed with alginate solution at 1:20 volume ratio, and this mixture is used as the hydrogel composition (bioink) to print a 2D lattice following the same protocol described herein. The bacteria-laden hydrogel lattice is transferred to a capped petri dish and immersed in LB media supplemented with 1 mM IPTG.

A confocal microscope (Leica SP8) equipped with a cell culture incubator is used to monitor the proliferation of the bacteria in the hydrogel particles. Using a 10× dry objective with a numerical aperture of 0.3, time-lapse bright field and fluorescence images at acquired at an interval of 20 sec, simultaneously, using multi-track mode. Argon lasers (488 nm and 514 nm) are used as the excitation source for the fluorescence protein; the fluorescence emission with peak wavelength of 527 nm is collected by the PMT detector through a bandpass filter between 524 and 580 nm. In addition, the contrast provided by the hydrogel and the bacteria allows visualization of the bacteria in bright field. All the imaging is performed at 37° C.

EXAMPLES

The following examples illustrate one or more features of the present disclosure. It should be understood that these examples are not intended to limit the scope of the disclosure or the appended claims in any manner.

Materials and Methods

Materials: Gelatin from porcine skin (gel strength 300, Type A) and alginic acid sodium salt from brown algae (medium viscosity) were purchased from Sigma-Aldrich (USA). E. coli, BL21(DE3) pET-stFRET, was a gift from Dr. Fanjie Meng at the National Institute of Health. Lysogeny broth (LB) (Miller) was purchased from Fisher Scientific (USA). Isopropyl β-D-1-thiogalactopyranoside (IPTG) was purchased from Zymo Research (USA). Poly(ethylene oxide) (PEO) with MW of 5000, 1000, 300, 100 kDa (Cat. No. 189472, 182001, 372781, 181986), and polyethylene glycol (PEG) with MW of 35 kDa (Cat. No. 81310) were purchased from Sigma-Aldrich (USA). Color-labeling reagent including EDC (Cat. No. E7750), Sulfo-NHS (Cat. No. 56485) and fluoresceinamine (Cat. No. 201626) were purchased from Sigma-Aldrich (USA). Fluorescently labeled dextran (Texas Red™, MW=70,000 Da, ex 595/em 615, Cat. No. D1830) was purchased from Fisher Scientific (USA). Dulbecco's Modified Eagle Medium (DMEM, without glucose, glutamine, phenol red, sodium pyruvate Cat. No. A14430-01) and Dulbecco's phosphate buffered saline (DPBS, without calcium, Cat. No. MT21031CM) were purchased from Gibco, Fisher Scientific (USA). Connaught Medical Research Laboratories 1066 Medium (CMRL 1066, Cat. No. 99-663-CV) was purchased from Corning (USA).

Figure 2:
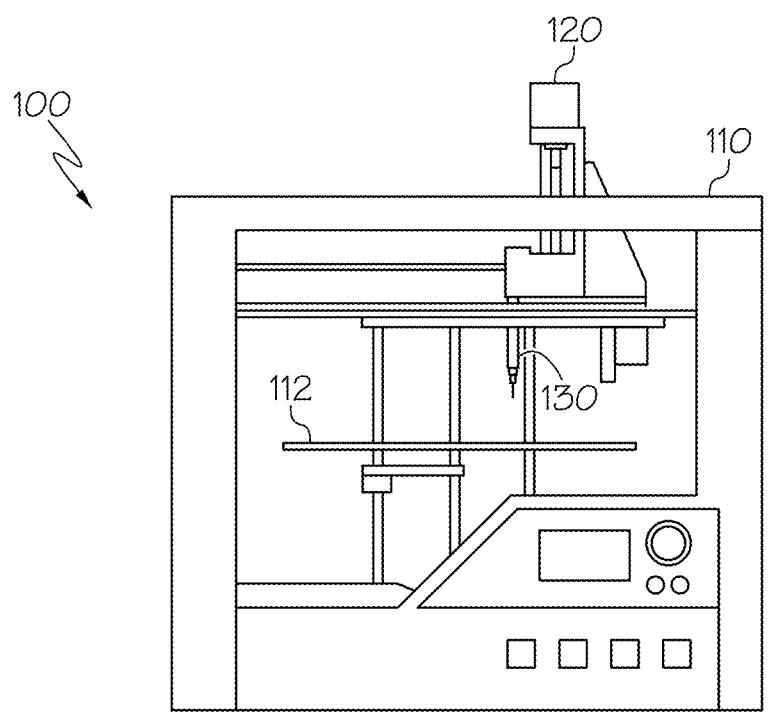
FIG. 2 schematically depicts a front view of the system of FIG. 1 for 3D printing hydrogel voxels, according to one or more embodiments shown and described herein.
Figure 3:
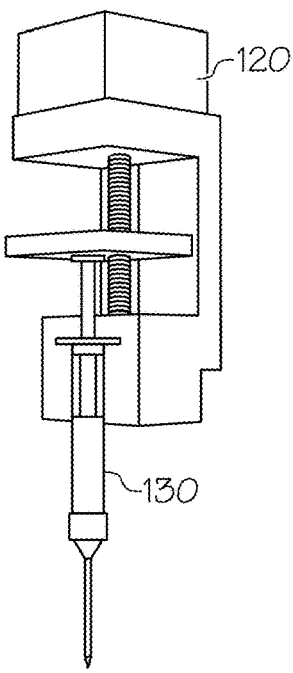
FIG. 3 schematically depicts a front perspective view of an extrusion device and microfluidic printhead of the system of FIG. 1, according to one or more embodiments shown and described herein.
Figure 4:
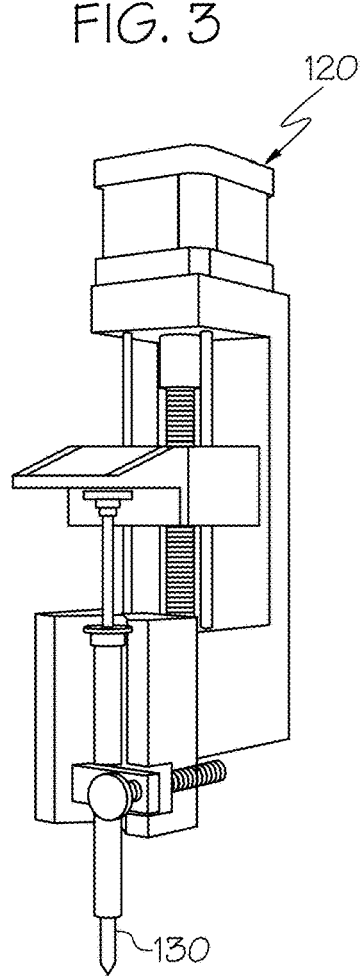
FIG. 4 schematically depicts another front perspective view of the extrusion device of FIG. 3, according to one or more embodiments shown and described herein.

3D motion system: Referring to FIGS. 2 and 4, the 3D motion system was constructed by replacing the hotmelt extruder of a desktop 3D printer (JGURORA z-603s) with a custom-made extrusion module (FIG. 4). Similar to a syringe pump, the extrusion module is built based on a linear screw (T8) actuator which converts the rotary motion of a stepper motor (NEMA 17) into linear motion. One embodiment uses the extrusion module to drive the microfluidic printhead, which included a glass syringe (1 mL, Shanghai Bolige Industrial & Trade Co., Ltd) with a speed controlled by G-code (FIG. 4) and the nozzle coupled to the glass syringe.

Microfluidic nozzle. Referring to FIGS. 5-7, to fabricate the printing nozzle, a micropipette puller (P-1000, Sutter Instrument, Inc.) was used to taper a cylindrical glass capillary (World Precision Instruments, Inc.) of inner and outer diameters 0.58 mm and 1.00 mm, respectively, to a diameter of 20 μm. The tip of the cylindrical glass capillary was then carefully sanded to the final diameter of 60 μm (FIG. 7). The tapered glass capillary was then sleeved to a dispensing needle (26G, McMaster-Carr), and the interstitial space between the two was sealed using 5-Minute Epoxy (Devcon) (FIG. 5). This microfluidic printing nozzle was then mounted to the glass syringe to produce the microfluidic printhead. The microfluidic printhead was mounted to the extrusion module to write through the sacrificial support matrix.

Printing spherical hydrogel voxels. To print a hydrogel particle, a 'forward-then backward' mode to drive the microfluidic printhead in the sacrificial support matrix was used. Specifically, the microfluidic printhead was positioned at a desired location, a prescribed amount of hydrogel composition was extruded, the microfluidic printhead was moved towards the next position by 3.5 mm, and then the microfluidic printhead was moved back to the targeted position. Such an excess forward movement allows the microfluidic printhead to be detached from the printed hydrogel voxel at a fast speed to reduce or prevent skewing the hydrogel voxel due to the viscous drag between the microfluidic printhead and the hydrogel composition. Once the printing is completed, the printed structure is kept in the supporting matrix for 3 min. Afterwards, the printed structure and the supporting matrix are immersed in a bath of 50 mM calcium solution at 37° C. for 5 min. This dissociates the gelatin microparticles of the sacrificial support matrix and completely cross-links the alginate polymer in the hydrogel voxels.

Example 1: Preparation of Sacrificial Support Matrix

To prepare the sacrificial support matrix, a gelatin hydrogel was prepared and then broken into microparticles. Gelatin was dissolved in a calcium solution (6 mM calcium chloride, 30 mM sodium chloride) with a concentration of 4.5% w/v at an alleviated temperature 50° C., and then the solution was cooled at 4° C. for 12 hours to solidify the solution to form a hydrogel. The hydrogel of 150 mL was mixed with 50 mL calcium solution and fragmented into microparticles using a blender operated at 4000 rpm for 100 sec. The mixture was degassed using house vacuum for 2 min, then mixed with 50 mL calcium solution and degassed for another 2 min. This resulted in the sacrificial support matrix consisting of jammed gelatin microparticles.

A stress-controlled rheometer set at an oscillatory frequency of 1 hz at 20° C. was used to quantify the dynamic mechanical properties of the sacrificial support matrix of Example 1, according to the methods described herein. Referring again to FIG. 8, the storage modulus G' (series 802 in FIG. 8) in pascals, the loss modulus G" in pascals (Pa) (series 804 in FIG. 8), and the shear strain γ in percent (series 806 in FIG. 8) are graphically depicted as a function of shear stress (τ) in pascals for the sacrificial support matrix of Example 1. The sacrificial support matrix of Example 1 comprising the jammed gelatin microparticles is shown in FIG. 8 to yield above a shear stress τ of 10 Pa, at which the both the storage modulus G' (802) and the loss modulus G" (804) decrease dramatically and that G" becomes larger than G'. Moreover, at the crossover shear stress τ of 10 Pa, the shear strain (series 806 in FIG. 8) exhibits a sudden increase from 10% to 1000%. The decrease in the moduli G' and G" and the sudden decrease in shear strain γ at shear stress τ of greater than 10 Pa indicates that the sacrificial support matrix of Example 1 comprising the jammed gelatin microparticles becomes fluid-like at shear stress greater than 10 Pa.

Referring now to FIG. 9, the self-healing properties of the sacrificial support matrix of Example 1 was demonstrated. To test whether the sacrificial support matrix of Example 1 comprising the jammed gelatin microparticles can self-heal, an instant shear strain of 1000% was applied periodically for a period of 1 second to break the matrix and the behavior of both G' and G" were monitored in real time for a period of 200 seconds after each application of the instant shear strain of 1000%. Every 200 seconds, the instant shear strain of 1000% was applied. As shown in FIG. 9, the sacrificial support matrix 140 comprising the jammed gelatin microparticles completely recovered to its original mechanical properties, and this damage-recovery process is repeatable. Thus, the microfluidic printhead can be moved through the sacrificial support matrix multiple times without degrading the properties of the sacrificial support matrix.

Referring now to FIG. 10, the gelation kinetics of the sacrificial support matrix of Example 1 comprising the jammed gelatin microparticles is graphically represented by the storage modulus G' (series 1002 in FIG. 10) and the loss modulus G" (series 1004 in FIG. 10) as a function of time. After a destructive shear at time $t_f$ that fluidized the sacrificial support matrix, the fluidized sacrificial support matrix of Example 1 became solid-like again within less than 1 sec at time $t_s$, as shown by gelation kinetics in FIG. 10. In FIG. 10, time $t_f$ is the time at which the applied shear strain fluidizes the sacrificial support matrix, and time $t_s$ is the time at which the G' becomes larger than G", which indicates return of the sacrificial support matrix of Example 1 to a solid state. The gelation time of the sacrificial support matrix is thus the difference between $t_s$ and $t_f$. These results indicate that the sacrificial support matrix of Example 1 can self-heal in a short time (e.g., less than one second) even after subjected to shear strain multiple times; this feature permits the sacrificial support matrix of Example 1 to be an ideal supporting matrix for embedded 3D bio-printing of hydrogel voxels.

Example 2: Preparation of the Hydrogel Composition for the Bio-Ink for Examples 3-8

In Example 2, a hydrogel composition of the present disclosure was prepared to serve as the bio-ink for printing hydrogel voxels. The hydrogel composition of Example 2 was an alginate hydrogel. To prepare the hydrogel composition of Example 2, alginic acid sodium salt was dissolved in DI water at 4% w/v, and the mixture was sonicated for 2 hours at 60° C. to make a homogenous solution. The solution was stored in a 4° C. refrigerator before use.

Example 3: Cross-Linking Kinetics

The success of printing spherical voxel-based 3D structures relies on the individual alginate hydrogel voxels becoming interconnected with each other. This involves balancing between gelation/solidification rate of the hydrogel voxels and printing speed. The time it takes for a hydrogel voxel to gel or solidify should be long enough to print multiple hydrogel voxels. In Example 3, the crosslinking kinetics at various concentrations of calcium ions are quantified to investigate the conditions for appropriate gelation rate of the hydrogel voxels. In Example 3, the viscoelasticity of the hydrogel composition of Example 2 exposed to calcium contained in the sacrificial support matrix of Example 1 was monitored in real-time. From this data, the gelation time of the alginate hydrogel can be determined. In Example 3, the concentration of calcium ions in the sacrificial support matrix was increased from 3 milliMolar (mM) to 6 mM, 12 mM, 24 mM, and 48 mM. The storage modulus and loss modulus as a function of time for each concentration of calcium ions in the sacrificial support matrix in Example 3 are graphically depicted in FIGS. 12A-12E. In FIGS. 12A-12E, the gelation time $t_g$ is the time at which the storage modulus becomes larger than the loss modulus. FIG. 11 graphically depicts the gelation time $t_g$ (y-axis) as a function of the concentration of calcium ions (x-axis) for the experiments of Example 3.

Referring to FIGS. 11 and 12A-12E, it was found that the gelation time $t_g$ decreased by nearly 30 times from 300 seconds to 10 seconds as the calcium concentration increased from 3 mM to 48 mM. Referring to FIG. 12F, a velocity profile of movement of a microfluidic printhead through a sacrificial support matrix is graphically depicted. Comparing the gelatin time $t_g$ from FIG. 11 with the printing speed/velocity depicted in FIG. 12F, it was determined that the optimum gelation time was 200 sec, which is associated with a sacrificial support matrix comprises 6 mM calcium ions. Since it takes around 1 second to print one droplet, this gelation time allows printing hundreds of hydrogel voxels before the hydrogel voxels partially solidify.

Example 4: Resolution of the DASP System and Methods

Figure 21:
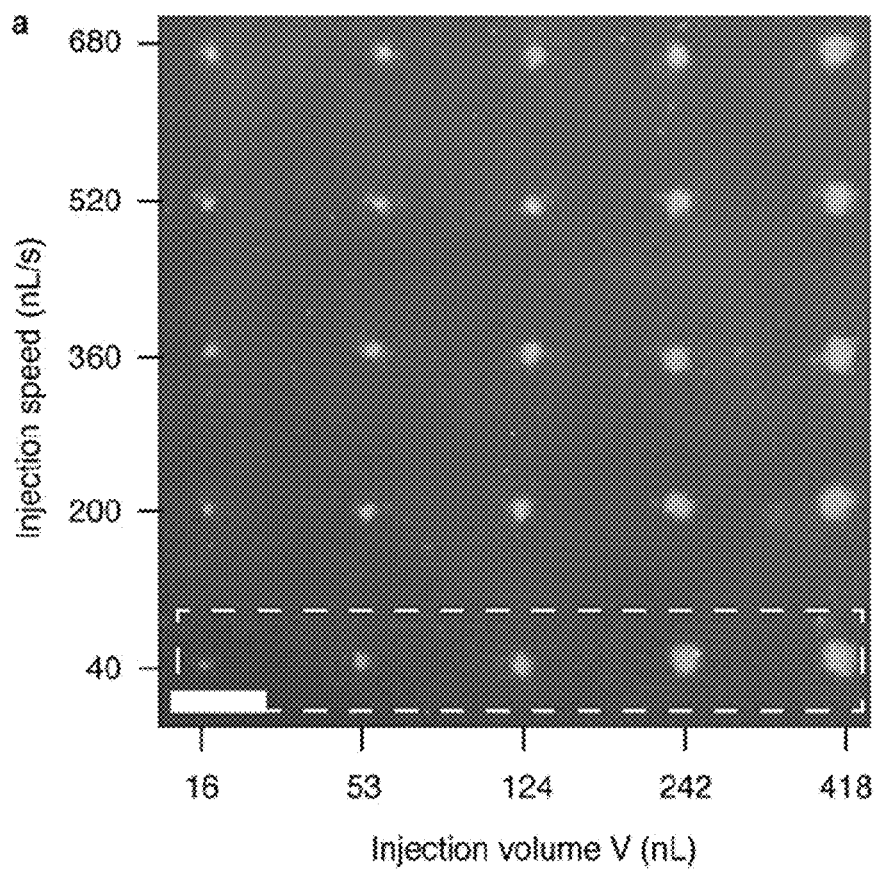
FIG. 21 graphically depicts optical photographs of hydrogel voxels at different injection speeds (y-axis) and injection volume (x-axis), according to one or more embodiments shown and described herein.

In Example 4, the resolution of the DASP systems and methods of the present disclosure is evaluated. To determine the resolution of DASP systems and methods, individual spherical hydrogel voxels were printed at various combinations of injection speed and volume. Following depositing the hydrogel voxels, the morphology and size the hydrogel voxels/particles were characterized using optical microscopy. The injection speed of the extrusion device was set to 40 nanoliters per second (nL/sec). At the fixed injection speed, the injection volume for each of the hydrogel voxels was decreased 27 times from 418 nanoliters (nL) to 16 nL, which corresponded to a 3-fold decrease in droplet diameter of the hydrogel voxels. As expected, the size of hydrogel voxels increased with the injection volume. The experiments were repeated at fixed injection speeds of 200 nL/s, 360 nL/s, 520 nL/s, and 680 nL/s. The same trend of the hydrogel voxels depending on the injection volume was observed at each of the fixed injection speeds ranging from 40 nL/sec to 680 nL/sec. Referring to FIG. 21, optical microscopy images of the hydrogel voxels deposited for each combination of injection speed and injection volume are graphically depicted. As shown in FIG. 21, the size of the hydrogel voxels increased with increasing injection volume and this trend was observed regardless of the injection speed.

Figure 22:
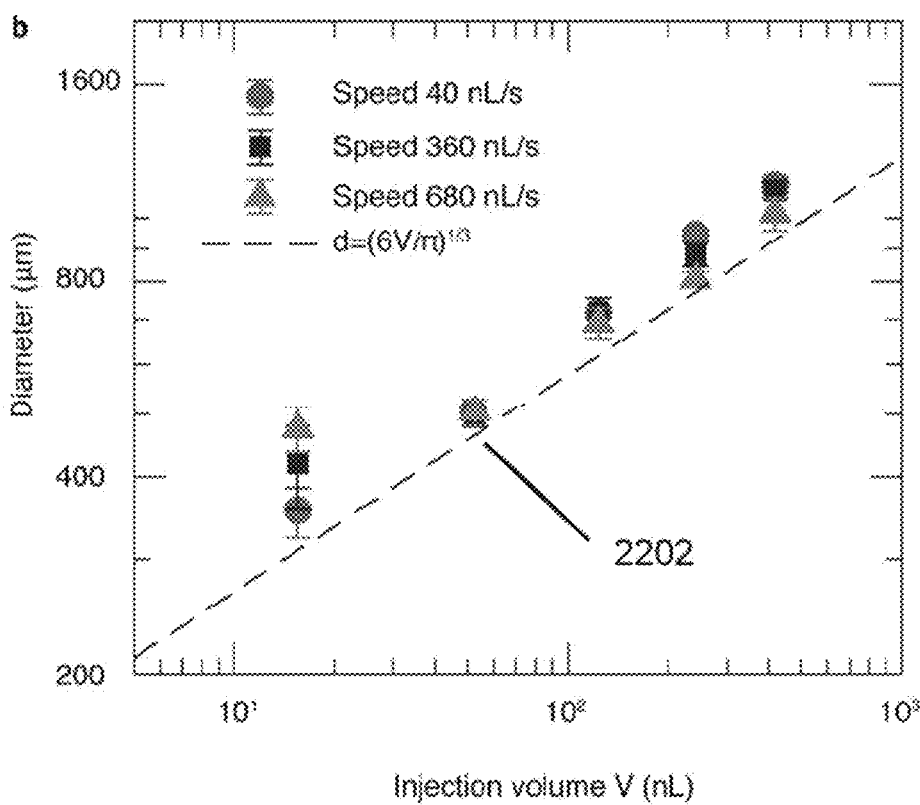
FIG. 22 graphically depicts diameter (y-axis) as a function of injection volume (x-axis) for hydrogen voxels printed using the DASP methods and system, according to one or more embodiments shown and described herein.

To explore further the dependence of particle size on injection volume, V, the particle diameter for each of the hydrogel voxels was measured from the optical microscopy images. The results are shown graphically in FIG. 22 with the particle diameter don the y-axis and the logarithm of the injection volume on the x-axis. As shown in FIG. 22, it was found that the average particle diameter d of the hydrogel voxels was proportional to the injection volume to the ⅓ power ($V^{1/3}$). These results indicate that for the DASP systems and methods disclosed herein, the size of spherical hydrogel voxels is determined by the injection volume V but not so much by the injection speed, and that the resolution of a spherical voxel can be about 300 µm.

Figure 19:
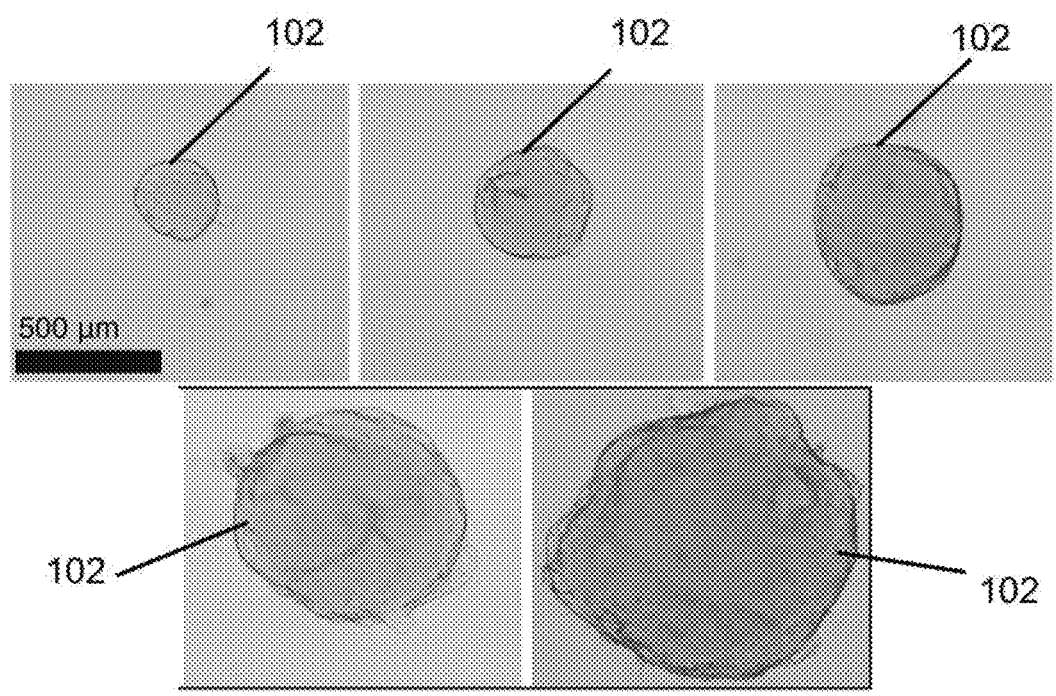
FIG. 19 graphically depicts optical microscopy images of hydrogel voxels of progressively increasing size/volume, according to one or more embodiments shown and described herein.

The injection volume may also influence the morphology of the hydrogel voxels. In particular, it was found that the surface of a particle becomes less smooth for larger hydrogel voxels. Referring again to FIG. 19, microscopy images of hydrogel voxels of various diameters d are shown. The images in FIG. 19 show that the surface of the hydrogel voxels becomes less smooth with increasing diameter d. This decreasing smoothness with increasing size can be due to hydrogel swelling, a phenomenon common to a polymer solutions in the presence of solvents. Upon swelling, the hydrogel voxel can experience anisotropic deformation from the jammed, polydisperse gelatin microparticles in the sacrificial support matrix, and the variation in deformation can become more pronounced for a hydrogel voxel that swells by a larger extent. Indeed, the measured particle diameters d of the hydrogel voxels were found to be greater than the predicted value for the particle diameter calculated from the injection volume. The increase in the particle diameter of the hydrogel voxels due to swelling compared to the predicted volume was greater for larger hydrogel voxels. However, the swelling ratio, which is defined as the measured particle diameter over the theoretical value (predicted value), is nearly constant and equal to about 1.2 for all particle sizes of the hydrogel voxels. This is indicated by the dashed line 2202 in FIG. 22. This suggests that during cross-linking and gelation/solidification of the hydrogel voxels, the particle diameter d of the hydrogel voxels can increase by nearly 11%.

Figure 23A:
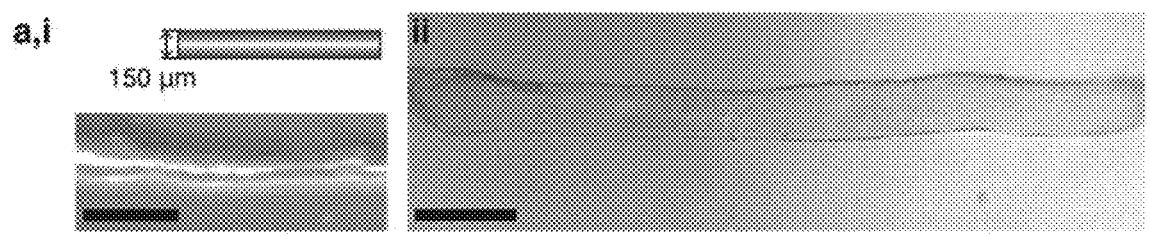
FIG. 23A graphically depicts an optical photograph of a 1D filament of Example 5 prepared by printing a series of hydrogel voxels, according to one or more embodiments shown and described herein.

Example 5: Effects of Center-to-Center Distance Between Hydrogel Voxels on Resolution of the DASP System and Methods In Example 5, the effects of center-to-center distance between each of the hydrogel voxels is investigated. The swelling of hydrogel voxels may be exploited to create structures in which two neighboring hydrogel voxels are partially coalesced to form interconnected yet distinguishable features. The connectivity between hydrogel particles was found to depend on the particle diameter d and the center-to-center distance l between two neighboring hydrogel voxels. To evaluate the impact of particle diameter d and center-to-center distance l on the connectivity between hydrogel voxels, 1D features were printed by fixing the particle diameter at 300 µm while decreasing the center-to-center distance from 500 µm, to 400 µm, and then to 250 µm. At l=500 µm, which was equal to 1.7 times the particle diameter d of the hydrogel voxel, the hydrogel voxels formed a necklace structure with two neighboring hydrogel voxels connected by a thin line of hydrogel, where the thin line of hydrogel had a diameter 110 µm, as shown in FIG. 23A. This line may be caused by detaching the microfluidic printhead from the viscoelastic hydrogel droplet and is undesirable. However, this can be mitigated by decreasing the center-to-center distance l between hydrogel voxels to 400 µm, which is about 1.3 times of the particle diameter of the hydrogel voxels.

Figure 23B:
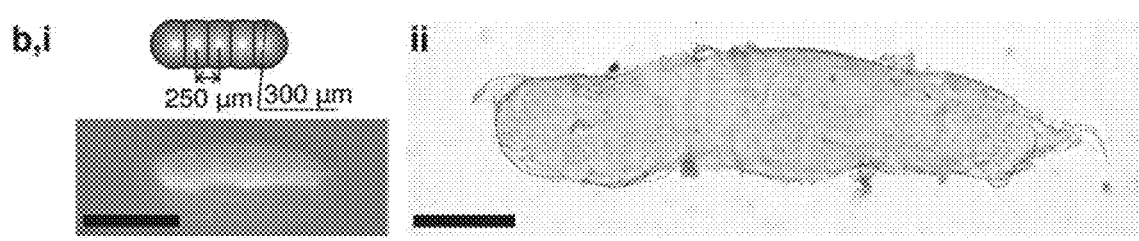
FIG. 23B graphically depicts an optical photograph of another 1D filament of Example 5 prepared by printing a series of hydrogel voxels, according to one or more embodiments shown and described herein.
Figure 23C:
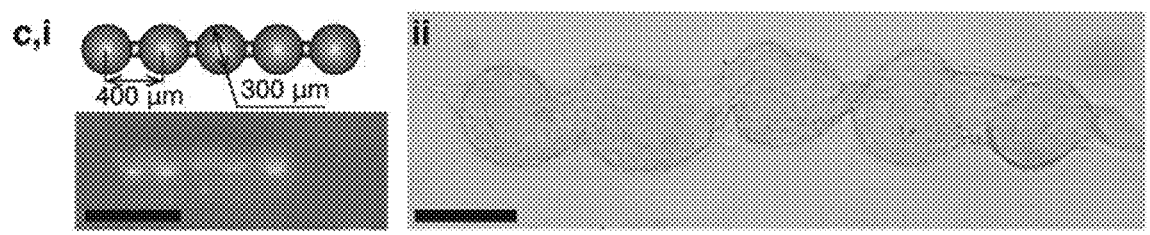
FIG. 23C graphically depicts an optical photograph of still another 1D filament of Example 5 prepared by printing a series of hydrogel voxels, according to one or more embodiments shown and described herein.
Figure 23D:
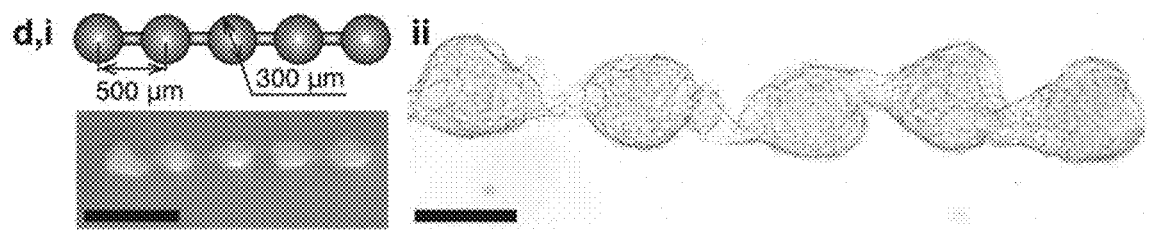
FIG. 23D graphically depicts an optical photograph of a 1D filament of Example 6 prepared by printing a series of hydrogel voxels, according to one or more embodiments shown and described herein.
Figure 23E:
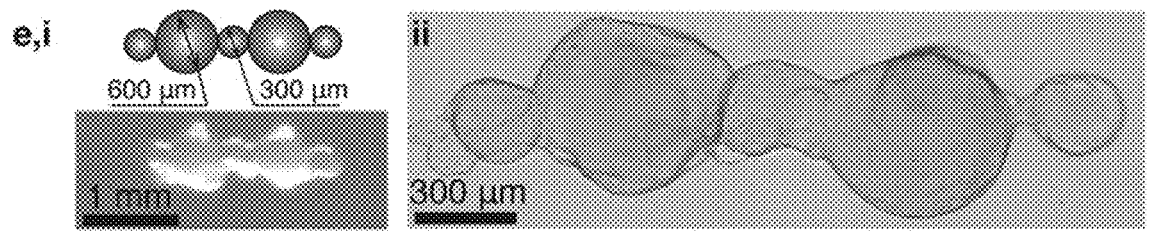
FIG. 23E graphically depicts an optical photograph of a 1D filament of Example 6 prepared by printing a series of hydrogel voxels, according to one or more embodiments shown and described herein.
Figure 23F:
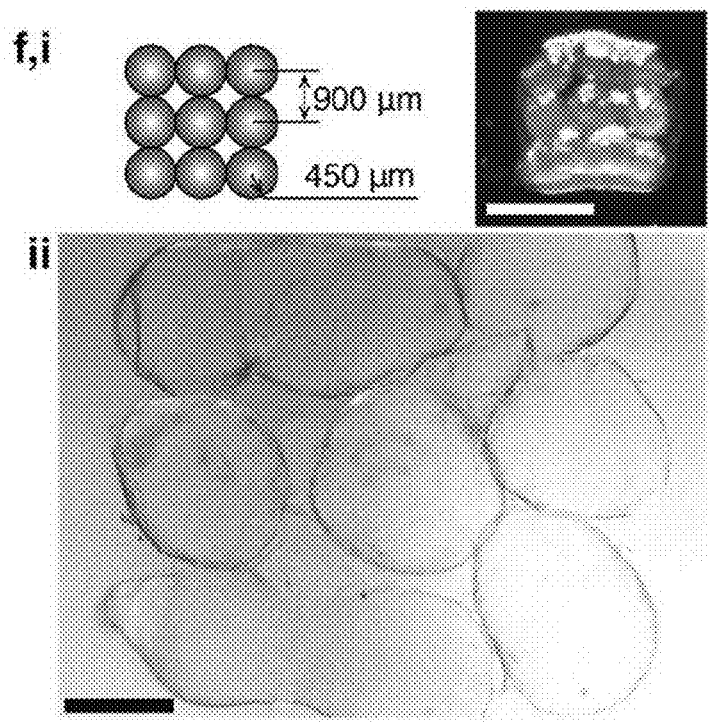
FIG. 23F graphically depicts an optical photograph of a 2D array of Example 5 prepared by printing an array of hydrogel voxels, according to one or more embodiments shown and described herein.
Figure 23G:
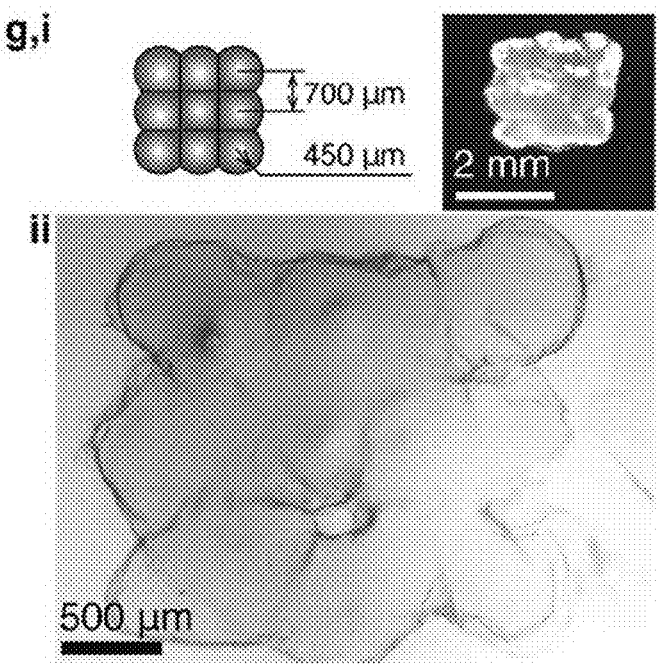
FIG. 23G graphically depicts an optical photograph of another 2D array of Example 5 prepared by printing an array of hydrogel voxels, according to one or more embodiments shown and described herein.

Referring to FIG. 23B, when the center-to-center distance l is decreased to 400 µm, which is 1.3 times the particle diameter d of the hydrogel voxels, the hydrogel voxels were touching one another while still being distinguishable from each other. Referring now to FIG. 23C, furthering decreasing the distance l to 250 µm, which is 0.8 times the particle diameter d of the hydrogel voxels, resulted in complete coalescence of the hydrogel voxels to form a thick cylindrical filament. This was further confirmed by printing a 3×3 2D array of hydrogel voxels as shown in FIG. 23F. In the 3×3 2D array shown in FIG. 23F, the particle diameter d was 900 µm, the distance l was 700 µm, and the ratio of l/d was approximately equal to 0.8. This resulted in almost complete coalescence of the hydrogel voxels. As shown in FIGS. 23C and 23F, complete coalescence of the hydrogel voxels refers to coalescence of the hydrogel voxels to the point where the individual hydrogel voxels become indistinct from one another. Referring to FIG. 23G, a 3×3 2D array of hydrogel voxels was printed with a ratio of l/d of approximately equal to 1 (d≈l≈900 µm). Because the hydrogen voxels swell by about 11% of the particle diameter d of the hydrogel voxels, the ratio of l/d≈1 resulted in a 2D array of interconnected yet distinguishable hydrogel voxels. Taken together, these studies suggest that a ratio of l/d of approximately equal to 1 may be sufficient to produce a 1D filament, 2D array, or even a 3D structure comprising individual hydrogel voxels that are interconnected but still distinguishable from one another.

Example 6: 1D Filament-Based Printing

In Example 6, the methods of the present disclosure are used to produce 1D filaments from the 0D hydrogel voxels to demonstrate that the methods disclosed herein can be adapted to perform conventional 1D filament-based printing as well. In Example 6, the distance between neighboring hydrogel voxels was decreased, which allowed for printing of higher quality cylindrical hydrogel filaments having a smaller diameter and smoother surface compared to conventional 1D filament printing methods. By decreasing the distance between neighboring hydrogel voxels, the quality of the cylindrical hydrogel filament can be improved to exhibit a smaller diameter and a smoother surface. Referring now to FIG. 23D, a filament comprising a diameter of 150 µm was printed. The small tip diameter of the microfluidic printhead enabled the diameter of the hydrogel filament to be decreased to 150 µm, which is comparable to the resolution of existing extrusion-based techniques.

Additionally, a filament was printed by alternating printing of small diameter hydrogel voxels and large diameter hydrogen voxels to demonstrate the ability to dynamically control the diameter of hydrogen voxels during printing to enable printing of heterogeneous structures. The small diameter hydrogel voxels had a particle diameter d of 300 µm, and the larger diameter hydrogel voxels had a particle diameter d of 600 µm. Referring now to FIG. 23E, a 1D filament comprising alternating small diameter hydrogel voxels and large diameter hydrogel voxels is shown. As shown in FIG. 23E, dynamically controlling the particle diameter of the hydrogen voxels during printing can allow for printing filaments having a heterogeneous shape. The capability to dynamically control the particle diameter during printing to produce heterogeneous shapes is not enable by the classical 1D-filament based printing.

Example 7: Free Standing 3-Dimensional Lattice Structure

Figure 24A:
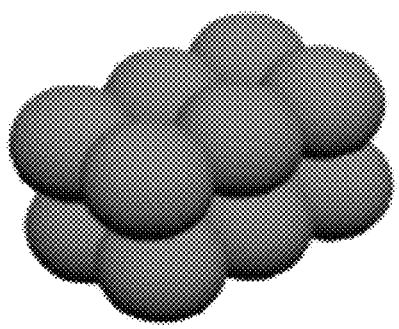
FIG. 24A schematically depicts a design of a 2×3×2 lattice structure of Example 7, according to one or more embodiments shown and described herein.
Figure 24B:
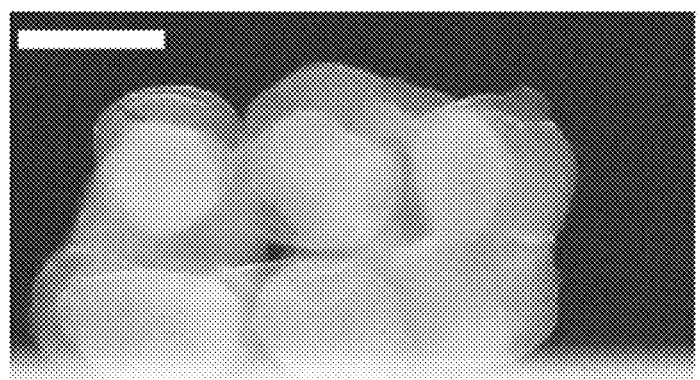
FIG. 24B shows an optical image of a printed 3D 2×3×2 lattice of hydrogel voxels of Example 7, according to one or more embodiment shown and described herein.
Figure 24C:
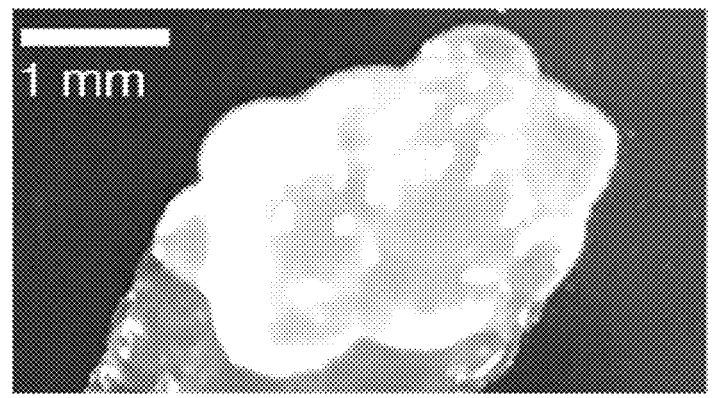
FIG. 24C shows an optical image of the printed 3D 2×3×2 lattice of hydrogel voxels of FIG. 24B on a glass substrate in air, according to one or more embodiments shown and described herein.

In Example 7, the capability of the DASP methods and systems for printing free standing 3D lattice structures is demonstrated. For Example 7, a 2×3×2 lattice and a pyramid lattice were printed according to the methods disclosed herein. The particle diameter d of the hydrogel voxels was 900 µm, and the distance l between hydrogel voxels was 900 µm for a ratio l/d of about 1. Referring to FIG. 24A, the design of the 2×3×2 lattice is schematically depicted. Referring to FIG. 24B, an optical image of the printed 2×3×2 lattice if Example 7 in DI water is shown. FIG. 24C shows an optical image of the free-standing 2×3×2 lattice structure on a glass substrate in air. FIGS. 24B and 24C show the printed structure recapitulates the design shown in FIG. 24A and that the hydrogel voxels are distinguishable yet interconnected. FIG. 24C shows that the 2×3×2 lattice is a free-standing 3D structure in air, meaning that the 2×3×2 lattice structure of Example 7 can stand by itself in air without any external mechanical support. It was also found that the 2×3×2 structure could be flipped, rotated, and translated without breaking apart.

Figure 25A:
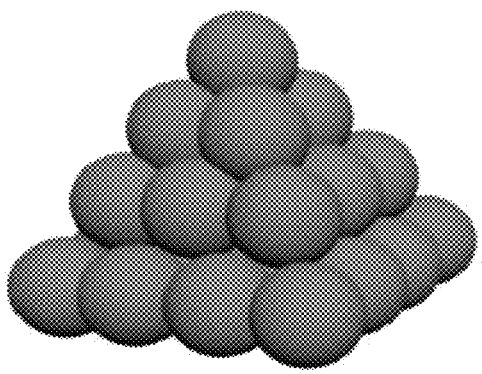
FIG. 25A schematically depicts a design of a 3D pyramid lattice structure of Example 7, according to one or more embodiments shown and described herein.
Figure 25B:
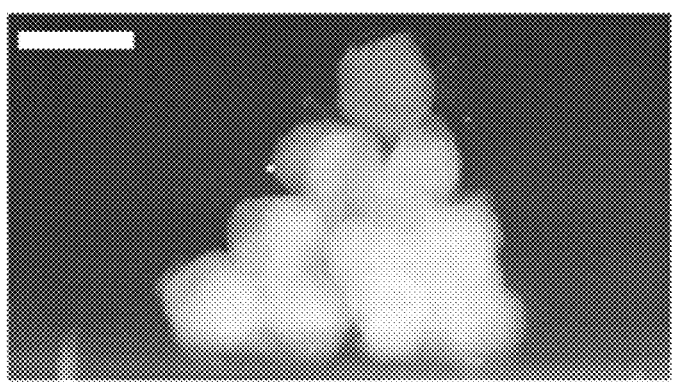
FIG. 25B shows an optical image of a printed 3D pyramid lattice of hydrogel voxels of Example 7, according to one or more embodiment shown and described herein.
Figure 25C:
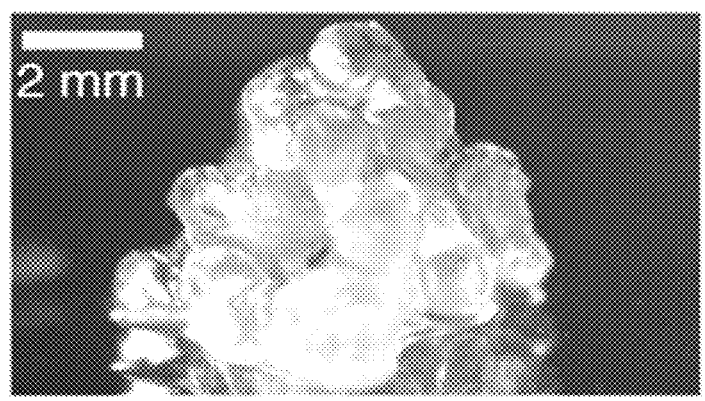
FIG. 25C shows an optical image of the printed 3D pyramid lattice of hydrogel voxels of FIG. 25B on a glass substrate in air, according to one or more embodiments shown and described herein.

Referring to FIG. 25A, the design of the pyramid lattice is schematically depicted. Referring to FIG. 25B, an optical image of the printed pyramid lattice of Example 7 in DI water is shown. FIG. 25C shows an optical image of the free-standing pyramid lattice structure of Example 7 on a glass substrate in air. FIGS. 25B and 25C show the printed pyramid structure recapitulates the pyramid design shown in FIG. 25A and that the hydrogel voxels are distinguishable yet interconnected. FIG. 25C shows that the 3D pyramid lattice of Example 7 is a free-standing 3D structure in air, meaning that the 3D pyramid lattice structure of Example 7 can stand by itself in air without any external mechanical support. The 3D pyramid structure was also found to be able to be flipped, rotated and translated without breaking apart. The 3D pyramid lattice of Example 7 demonstrated that the DASP methods and systems of the present disclosure can be used to print more complex 3D structures of close-packed spherical hydrogel voxels with high fidelity and mechanical robustness. These results of Example 7 demonstrated that the DASP methods and systems can permit the digital assembly of spherical hydrogel voxels to form 3D free-standing lattice structures.

Example 8: Cytocompatibility

Figure 26:
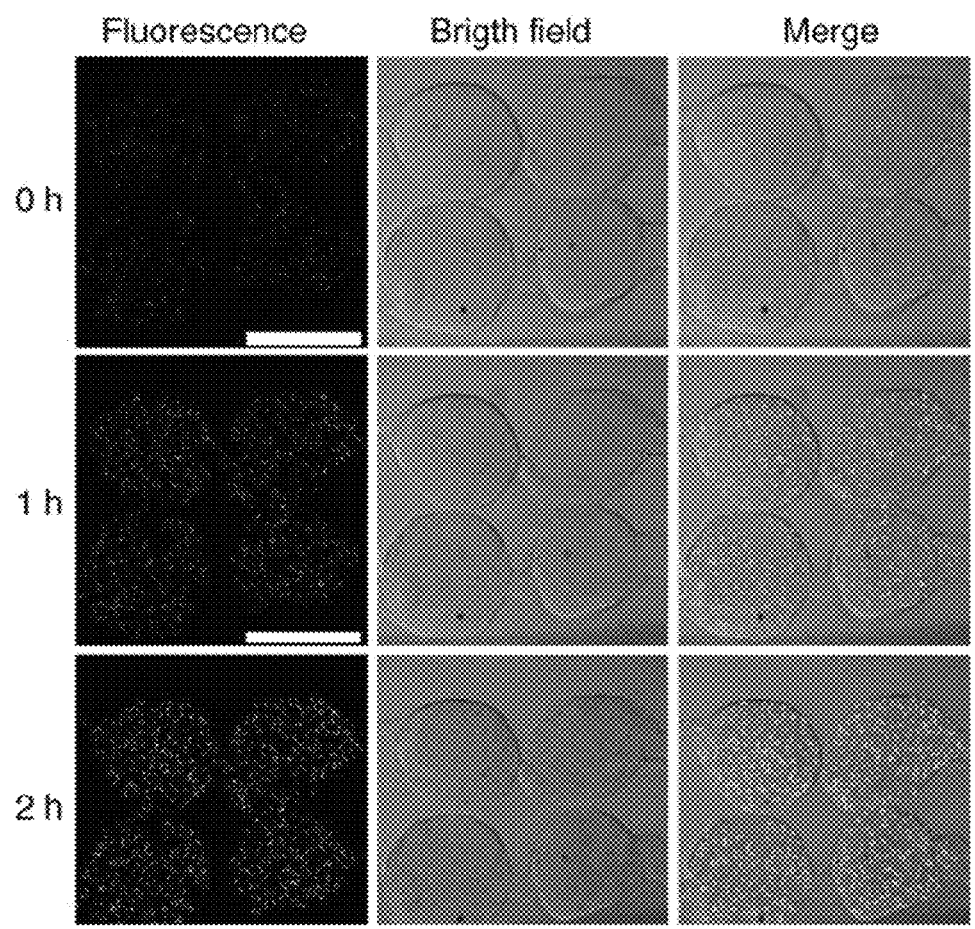
FIG. 26 shows optical images of printed hydrogel voxels containing bacterial cells at different time periods after printing of the hydrogel voxels, according to one or more embodiment shown and described herein.
Figure 27:
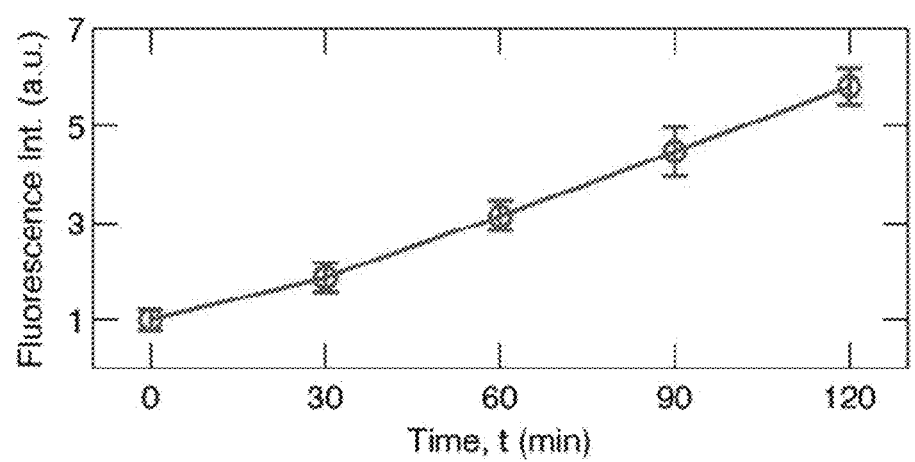
FIG. 27 graphically depicts fluorescence intensity (y-axis) as a function of time (x-axis) for hydrogel voxels containing bacterial cells, according to one or more embodiments shown and described herein.

In Example 8, the cytocompatibility of the DASP methods and systems of the present disclosure for printing structures including living biological objects is demonstrated. In Example 8, a 2×2 lattice of hydrogel voxels is printed. Each of the hydrogel voxels included fluorescent *Escherichia coli* (*E. coli*) bacteria cells. After printing the 2×2 lattice of hydrogel voxels comprising the fluorescent *E. coli* cells, removing the support matrix, and washing with calcium ion solution to finish cross-linking the hydrogel voxels, the proliferation of the *E. coli* bacteria cells was monitored using time-lapse fluorescence confocal microscopy. Referring to FIG. 26, images of the printed hydrogel voxels immediately after printing and at 1 hour and 2 hours are shown. The images in FIG. 26 include fluorescent images, bright field images, and combined images. As shown by the images in FIG. 26, the fluorescence of the hydrogel particles increases with time. The number of bacteria cells in each hydrogel voxel is proportional to the fluorescence intensity. The fluorescence intensity as a function of time for the printed hydrogel voxels of Example 8 are shown in FIG. 27. As shown in FIG. 27, the fluorescence intensity of the printed hydrogel voxels increases by a factor of two within a timeframe of 30 minutes. This bacterial growth rate is consistent with the proliferation rate of bacteria in media suspensions. These results indicate that the DASP systems and methods of the present disclosure are cytocompatible.

Example 9: Bio-Inks Comprising Alginates Only

In Example 9, the dependence of the fidelity of the printed hydrogel voxels on the viscoelasticity of the hydrogel compositions used for the bio-ink is examined. The bio-inks of Example 9 are hydrogel compositions comprising water and alginate only. In Example 9, hydrogel voxels are printed from hydrogel compositions having varying concentrations of alginate.

The hydrogel compositions of Example 9 were prepared from fluorescently labeled alginate to allow direct visualization of the printed hydrogel voxels by optical microscopy. The fluorescently labeled alginate was prepared by dissolving alginate in DPBS at a concentration of 0.5% (w/v), equivalent to 230 mM carboxylic groups, and adding EDC and Sulfo-NHS with a final concentration of 23 mM for each. The solution was stored at room temperature for 2 h, and fluoresceinamine was added with a final concentration of 45 mM. The solution was stirred throughout the preparation and for an additional 48 hours. Afterward, the solution was transferred to dialysis bags (Spectra/Por, VWR International, molecular weight cut off, 6-8 kDa, Cat. No. 28170-138) and dialyzed against firstly 3.5 L DI water (refreshed every 6 hours, 4 shifts), secondly DI water with 1M NaCl (refreshed every 6 hours, 4 shifts), and finally DI water (refreshed every 6 hours, 4 shifts). This process completely removed the unreacted EDC, Sulfo-NHS, and fluoresceinamine. The dialyzed alginate solution was lyophilized to obtain a dried fluorescently labeled alginate. The dried fluorescently labeled alginate was stored in a 4° C. refrigerator for further usage. All operations for preparing the fluorescently labeled alginates were protected from the light during synthesis and preparation of the bio-inks. The hydrogel compositions of Example 9 were then prepared from the fluorescently labeled alginates according to the method provided above in Example 2.

First, a hydrogel composition was prepared with an alginate concentration of 1.5% (w/v) ($Alg_{1.5}$), where w/v % refers to the weight of the alginate divided by the volume of the hydrogel composition of the bio-ink multiplied by 100. The $Alg_{1.5}$ hydrogel composition was then used to print hydrogel voxels according to the methods disclosed herein. Using the DASP system and methods, hydrogel voxels were deposited within the sacrificial support matrix at a location 2 mm below an upper surface of the sacrificial support matrix. The distance of 2 mm was short enough to enable characterization of the morphology of the hydrogel voxels using a digital microscope camera (Hayear, 16 MP).

Figure 28:
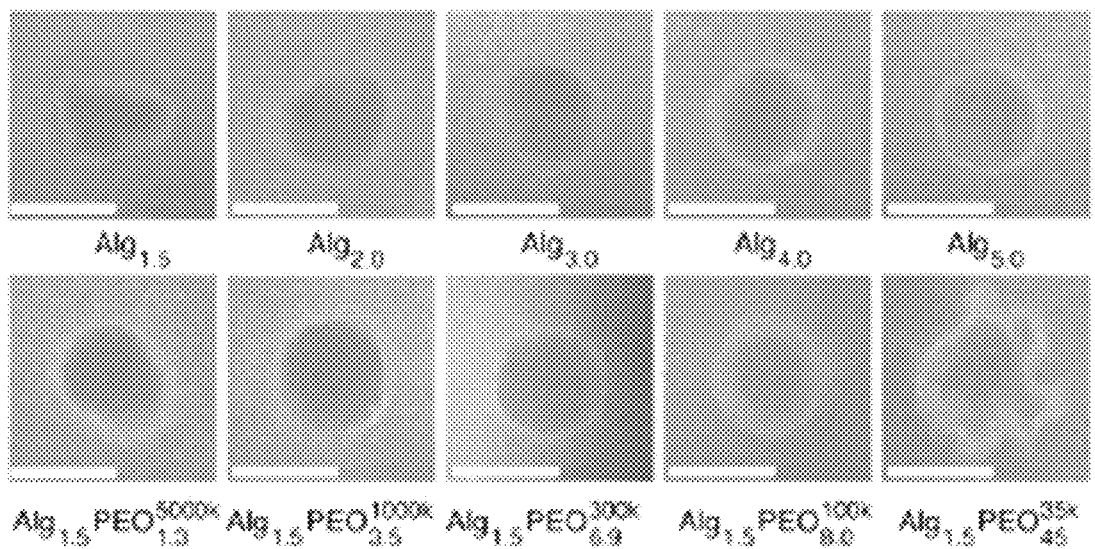
FIG. 28 shows optical microscopy images of hydrogel voxels printed from hydrogel compositions having varying concentrations of alginate, varying concentrations of PEO, and varying average molecular weight of the PEO, according to one or more embodiments shown and described herein.

The printed hydrogel voxels comprising the $Alg_{1.5}$ hydrogel composition exhibited an irregular shape, as shown by the optical image on the top left in FIG. 28.

Additional hydrogel compositions were prepared with alginate concentrations of 2.0 w/v %, 3.0 w/v %, 4 w/v %, and 5 w/v %, which are referred to herein by the abbreviations $Alg_{2.0}$, $Alg_{3.0}$, $Alg_{4.0}$, and $Alg_{5.0}$, respectively. Referring again to FIG. 28, increasing alginate concentration in the bio-ink improved the printing fidelity of the hydrogel voxels. However, the hydrogel voxels only became spherical when the alginate concentration was greater than or equal to 4.0 w/v % in the hydrogel composition, as shown in FIG. 28. These results indicate that a minimum concentration required for printing a hydrogel voxel with good fidelity is 4.0% (w/v) ($Alg_{4.0}$) for bio-inks comprising a hydrogel composition with only alginate and water.

Figure 29:
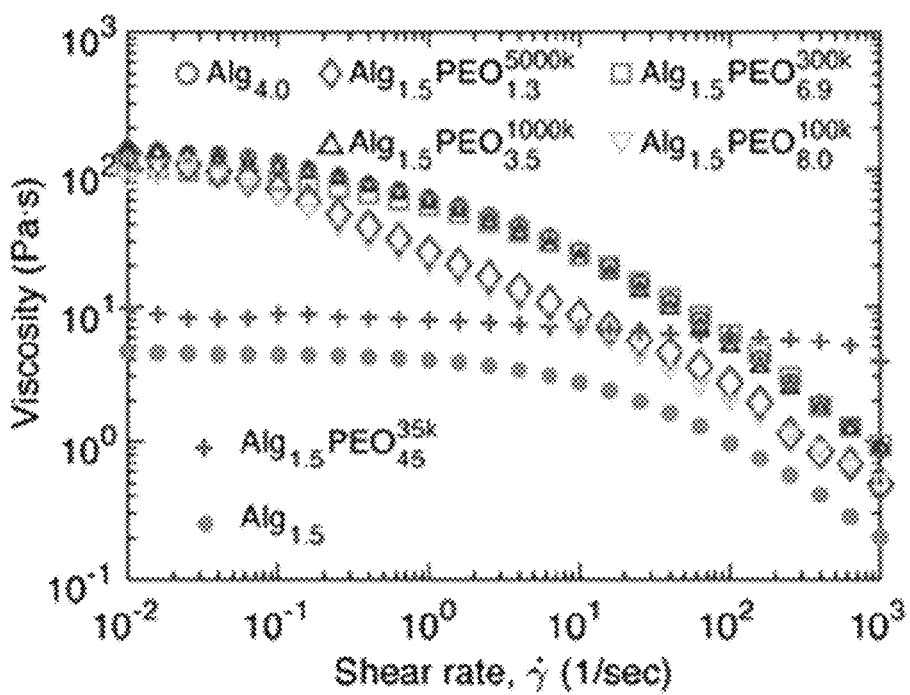
FIG. 29 graphically depicts viscosity of hydrogel compositions (y-axis) as a function of shear rate (x-axis) for the hydrogel compositions of FIG. 28, according to one or more embodiments shown and described herein.
Figure 30:
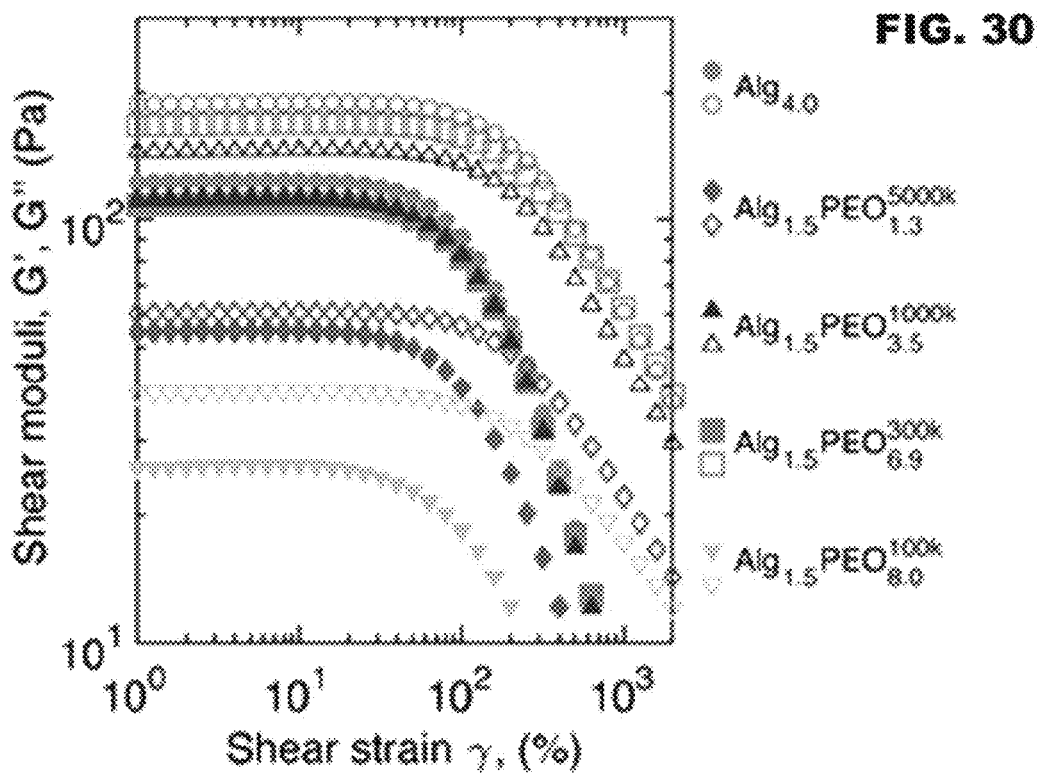
FIG. 30 graphically depicts shear moduli (storage modulus G' and loss modulus G") (y-axis) as functions of shear strain (x-axis) for selected hydrogel compositions from FIG. 28, according to one or more embodiments shown and described herein.
Figure 31:
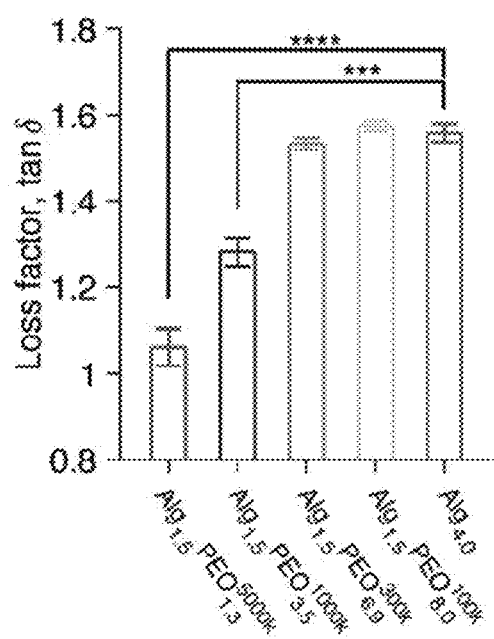
FIG. 31 graphically depicts loss factor (y-axis) for the selected hydrogel compositions of FIG. 30 (x-axis), according to one or more embodiments shown and described herein.

The viscosity of the hydrogel compositions of Example 9 were also evaluated according to the methods disclosed herein (viscosity at the lowest shear rate 0.01 s$^{-1}$). Referring to FIG. 29, the viscosity at the lowest shear rate 0.01 s$^{-1}$ of the Alg$_{4.0}$ hydrogel composition (open circles in FIG. 29) was found to be about 150 Pa·s, which is roughly 40 times the viscosity at the lowest shear rate 0.01 s$^{-1}$ of the Alg$_{1.5}$ hydrogel composition (solid circles in FIG. 29). The elasticity of Alg$_{4.0}$ hydrogel composition of Example 9 was further evaluated by measuring the shear moduli as a function of shear strain (FIG. 30), which was then used to determine the loss factor (FIG. 31) for the Alg$_{4.0}$ hydrogel composition, according to the methods described herein. Referring to FIGS. 30 and 31, the Alg$_{4.0}$ hydrogel composition was found to have a relatively low elasticity, as reflected by a high loss factor, tan $\delta$=G"/G'=1.56. Example 9 identifies the viscosity and the loss factor of the hydrogel compositions resulting in printing an alginate hydrogel voxel of good fidelity for hydrogel compositions comprising only alginates.

Example 10: Hybrid Bio-Inks Comprising a Hydrogel Composition Composed of Alginate and PEO Polymer In Example 10, hybrid bio-inks comprising hydrogel compositions that include both alginate and PEO polymer were prepared and evaluated. The objective of Example 10 was to prepare a hybrid bio-ink having the viscoelastic properties of the Alg$_{4.0}$ hydrogel composition of Example 9 but with a reduced concentration of alginate, which can reduce the mesh size of the resulting hydrogel voxels printed therefrom. For Example 10, the concentration of alginate in the hybrid bio-ink/hydrogel composition was fixed at 1.5 w/v % while the concentration and average molecular weight of PEO polymers in the hybrid bio-ink/hydrogel compositions was changed. The PEO used in Example 10 had average molecular weights of 5,000 kilodaltons (kDa) (5,000,000 g/mol), 1,000 kDa (1,000,000 g/mol), 300 kDa (300,000 g/mol), 100 kDa (100,000 g/mol), and 35 kDa (35,000 g/mol). The average molecular weight of the PEO and the concentration of PEO for each of the hybrid bio-ink/hydrogel compositions of Example 10 are provided below in Table 1.

TABLE 1

| Bio-Ink ID | PEO MW (kDa) | PEO Concentration (w/v %) | Alginate Concentration (w/v %) |
|---|---|---|---|
| Alg4.0 | — | — | 4.0 |
| Alg$_{1.5}$PEO$_{1.3}$$^{5000k}$ | 5,000 | 1.3 | 1.5 |
| Alg$_{1.5}$PEO$_{3.5}$$^{1000k}$ | 1,000 | 3.5 | 1.5 |
| Alg$_{1.5}$PEO$_{6.9}$$^{300k}$ | 300 | 6.9 | 1.5 |
| Alg$_{1.5}$PEO$_{8.0}$$^{100k}$ | 100 | 8.0 | 1.5 |
| Alg$_{1.5}$PEO$_{45}$$^{35k}$ | 35 | 45.0 | 1.5 |

For the PEO of a high molecular weight, Alg$_{1.5}$PEO$_{1.3}$$^{5000k}$, a small addition of the PEO at the concentration of 1.3% (w/v) resulted in a hybrid bio-ink having a viscosity comparable to that of Alg$_{4.0}$, as shown in FIG. 29 (open diamonds corresponding to the viscosity of Alg$_{1.5}$PEO$_{1.3}$$^{5000k}$ as a function of shear rate). However, referring again to FIGS. 30 and 31, the loss factor of Alg$_{1.5}$PEO$_{1.3}$$^{5000k}$ was found to be 1.06±0.04, which was significantly less than the value of 1.56±0.02 for Alg$_{4.0}$ (p<0.0001). Not intending to be bound by any particular theory, it is believed that, at an average molecular weight of 5,000 kDa, the PEO polymers are too long to relax at the probed time scale, such that the entanglements of the PEO molecules effectively act as crosslinks that result in a relatively elastic bio-ink. Compared to a viscous hydrogel voxel with a high loss factor, an elastic hydrogel voxel with a low loss factor is more likely to be deformed by the dragging force associated with detaching the printing nozzle from the hydrogel voxel. Consistent with this understanding, the hydrogel voxel printed from the Alg$_{1.5}$PEO$_{1.3}$$^{5000k}$ hydrogel composition exhibited a distorted morphology, as shown in the optical image of the Alg$_{1.5}$PEO$_{1.3}$$^{5000k}$ hydrogel voxel in FIG. 28.

To create hybrid bio-inks comprising hydrogel compositions with high loss factors, the average molecular weight of the PEO was decreased and the concentration of the PEO in the hydrogel compositions was increased for the remaining hydrogel compositions of Example 10. As the average molecular weight of the PEO was decreased from 5000 kDa to 100 kDa, the PEO concentration in the hydrogel composition was increased by nearly 6 times from 1.3% (w/v) to 8.0% (w/v) in order to match the viscosity of Alg$_{4.0}$ hydrogel composition. At the same time, it was found that the loss factor increased from 1.06 to 1.57. Using this strategy, three three bio-inks, Alg$_{1.5}$PEO$_{3.5}$$^{1000k}$, Alg$_{1.5}$PEO$_{6.9}$$^{300k}$, and Alg$_{1.5}$PEO$_{8.0}$$^{100k}$, were produced with viscosity and loss factor equivalent to the viscosity and loss factor of the Alg$_{4.0}$ hydrogel composition. The viscosities and loss factors are provided for Alg$_{1.5}$PEO$_{3.5}$$^{1000k}$, Alg$_{1.5}$PEO$_{6.9}$$^{300k}$, and Alg$_{1.5}$PEO$_{8.0}$$^{100k}$ in FIGS. 29-31. Referring again to the optical images in FIG. 28, each of the hydrogel compositions of Alg$_{1.5}$PEO$_{3.5}$$^{1000k}$, Alg$_{1.5}$PEO$_{6.9}$$^{300k}$, and Alg$_{1.5}$PEO$_{8.0}$$^{100k}$ resulted in printed hydrogel voxels with good fidelity (e.g., very little deformation caused by separation from the microfluidic printhead).

Further decreasing the average molecular weight of the PEO to 35 kDa does not produce a hydrogel composition with a viscosity comparable to Alg$_{4.0}$ even at a very high PEO concentration 45% (w/v), as shown by the viscosity curve for the Alg$_{1.5}$PEO$_{45}$$^{35k}$ hydrogel composition in FIG. 29. Not intending to be bound by any particular theory, it is believed that this is likely because the molecular weight of the PEO is too low for the PEO molecules to form highly entangled polymers, which is what produces the greater viscosity. Because of the low viscosity, the hydrogel composition flows through the porous sacrificial support matrix, as indicated by the multiple outward protrusions of hydrogel voxel printed from the Alg$_{1.5}$PEO$_{45}$$^{35k}$ hydrogel composition and shown in the optical image in FIG. 28.

Figure 32:
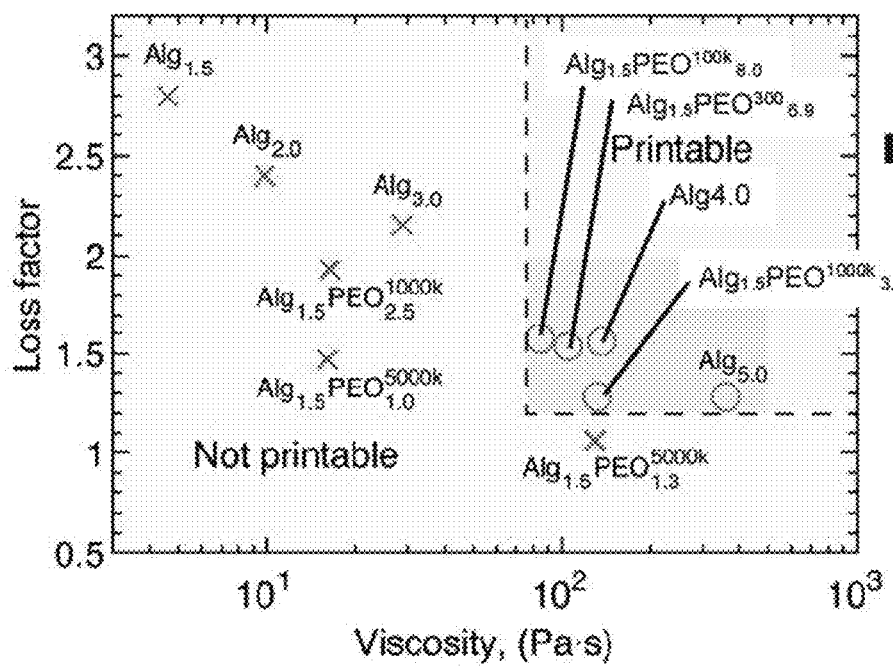
FIG. 32 graphically depicts loss factor (y-axis) as a function of viscosity (y-axis) for various hydrogel compositions, according to one or more embodiments shown and described herein.

Example 10 demonstrates that viscosity and loss factor are the two major parameters for determining the printability of bio-inks. Referring now to FIG. 32, a two-parameter phase diagram (viscosity and loss factor) that delineates hydrogel compositions suitable for use as bio-inks in the DASP systems and methods based on the results of Example 10 is provided. The range of acceptable values of viscosity and loss factor are indicated in FIG. 32 by the dashed lines. As shown in FIG. 32, the Alg$_{4.0}$, Alg$_{5.0}$ (5 w/v % alginate), Alg$_{1.5}$PEO$_{3.5}$$^{1000k}$, Alg$_{1.5}$PEO$_{6.9}$$^{300k}$, and Alg$_{1.5}$PEO$_{8.0}$$^{100k}$ hydrogel composition are all within the acceptable ranges of viscosity and loss factor for printing high-fidelity hydrogel voxels.

Example 11: Mesh Size of Hydrogel Voxels

In Example 11, the mesh size of the hydrogel voxels and the dependence of the mesh size on the concentration of alginate in the hydrogel compositions is evaluated. The mesh size of the cross-linked hydrogel voxels determines the ability to exchange molecules between the interior of the hydrogel voxel and external environments. In Example 11, the mesh size of three hydrogel compositions were evaluated: $Alg_{1.5}$ and $Alg_{4.0}$ from Example 9 and $Alg_{1.5}PEO_{8.0}^{100k}$ from Example 10. The hydrogel compositions were evaluated for mesh size through quantifying the release profile of encapsulated molecules using time-lapsed fluorescence confocal microscopy, according to the method previously discussed herein.

Specifically, a fluorescently labeled dextran with a molecular weight of 70 kDa (70,000 g/mol) was used as the probe molecule. The dextran is an inert, randomly branched molecule with a weight average hydrodynamic radius of ~7 nm, which is larger than the size of some metabolically important biomolecules. The fluorescently labeled dextran was dissolved in each of the hydrogel compositions at a concentration of 2 mg/mL. A hydrogel voxel comprising the hydrogel composition and the fluorescently labeled dextran was then deposited into a cross-linking solution (DI water with 50 mM $Ca^{2+}$) to solidify the hydrogel voxel. The cross-linked hydrogel voxels were then immediately transferred to a washing medium comprising DMEM (without glucose, glutamine, phenol red, and sodium pyruvate—see materials in the Examples) and incubated for 30 minutes to fully equilibrate the cross-linked hydrogel voxels with the medium. The solutions for crosslinking and washing the bio-ink droplets contain the same 2 mg/mL dextran as that in the bio-ink droplet to prevent the leakage of encapsulated dextran molecules from the hydrogel voxels during cross-linking and washing. The washing medium was then replaced by a fresh DMEM medium that contains no dextran, during which the fluorescence of the particle were monitored using confocal laser scanning fluorescence microscopy (Leica SP8).

Figure 33:
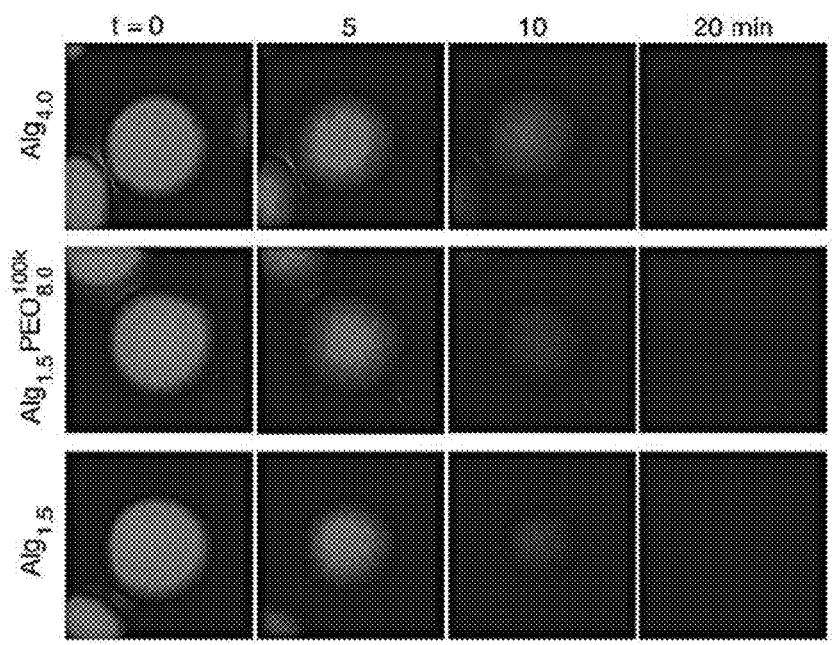
FIG. 33 shows optical microscopy images of hydrogel voxels printed with three different hydrogel compositions taken at time equal to 0 minutes, 5 minutes, 10 minutes, and 20 minutes after printing, according to one or more embodiments shown and described herein.
Figure 34:
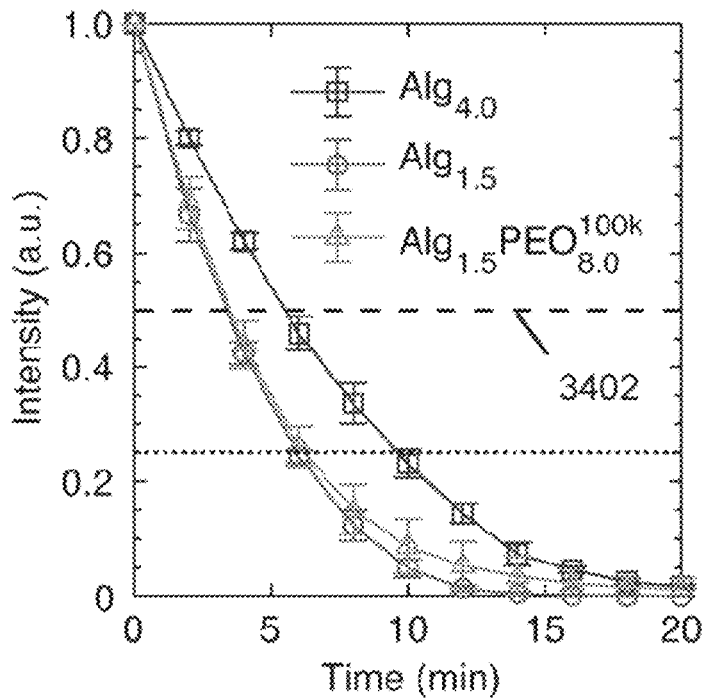
FIG. 34 graphically depicts release profiles for fluorescently labeled dextran from cross-linked hydrogel voxels, where the release profiles comprise fluorescent intensity (y-axis) as a function of time (x-axis), according to one or more embodiments shown and described herein.

For the hydrogel voxels comprising the hydrogel composition having only alginate, as the alginate concentration increases from 1.5 w/v % to 4.0 w/v %, the release of dextran molecules becomes noticeably prolonged, as shown by the time-lapse fluorescence images in FIG. 33. Referring now to FIG. 34, the release profile of the fluorescently labeled dextran from the hydrogel voxels (i.e., fluorescent intensity of the dextran in the hydrogel voxels as a function of time) is graphically depicted. The half-decay is shown by the dashed line 3402 in FIG. 34. Quantitatively, the half-decay time of the fluorescence increases by nearly twice from 3.5 min for the $Alg_{1.5}$ hydrogel composition to 7 min for the $Alg_{4.0}$ hydrogel composition. This indicates a greater rate of diffusion of the fluorescently labeled dextran for the $Alg_{1.5}$ hydrogel composition compared to the $Alg_{4.0}$ hydrogel composition. Thus, FIG. 34 shows that increasing the concentration of alginate in the hydrogel composition decreases the diffusion rate of the dextran out of the hydrogel composition, which is indicative of a decrease in the mesh size of the cross-linked hydrogel for the $Alg_{4.0}$ hydrogel composition compared to the $Alg_{1.5}$ hydrogel composition.

When the PEO is introduced, as in $Alg_{1.5}PEO_{8.0}^{100k}$ (1.5 w/v % alginate and 8 w/v % PEO with an average molecular weight of 100 kDa), the change of the release profile of the fluorescently labeled dextran from the hydrogel voxel was negligible compared to the release profile for $Alg_{1.5}$ hydrogel composition, as shown by the overlap between the profiles for the $Alg_{1.5}$ hydrogel composition (circles) and the $Alg_{1.5}PEO_{8.0}^{100k}$ hydrogel composition (triangles) in FIG. 34. These results of Example 11 provide direct evidence that the mesh size of a cross-linked hydrogel voxel is determined by the concentration of the cross-linked alginate in the hydrogel composition but not so much by the uncross-linked PEO molecules.

Figure 35:
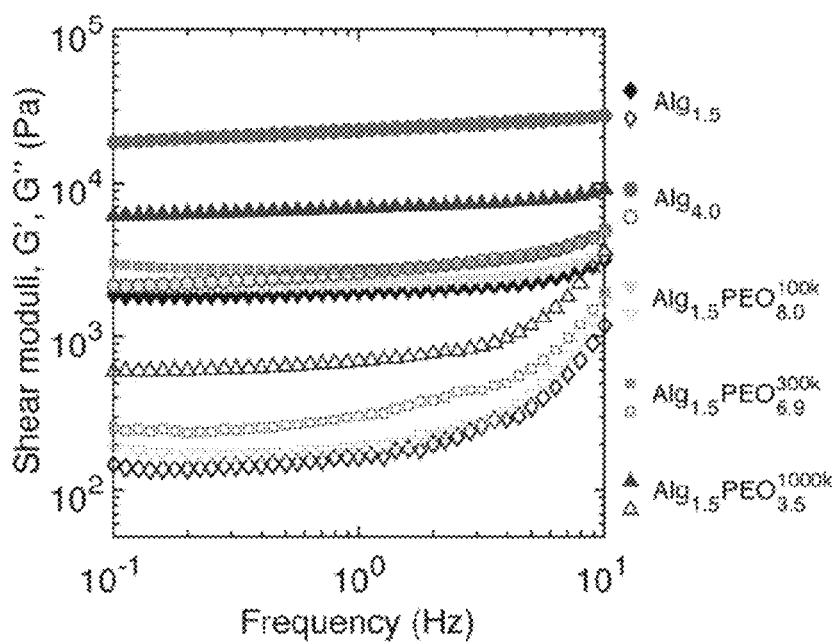
FIG. 35 graphically depicts shear moduli (y-axis) as a function of frequency (x-axis) for various hydrogel compositions, according to one or more embodiments shown and described herein.

The differences in mesh size of the hydrogel compositions used for the bio-ink are further confirmed by variation in hydrogel stiffness after cross-linking. The equilibrium shear modulus of an unentangled polymer network is approximately equal to $k_B T$ per volume of a network strand, where $k_B$ is the Boltzmann constant, and T is the absolute temperature. Therefore, the network strand size, or mesh size, can be estimated based on the network shear modulus: $\xi \approx (k_B T/G')^{1/3}$. Referring now to FIG. 35, for the hydrogel compositions suitable for use as the bio-inks in the DASP systems and methods herein, the shear storage moduli G' are nearly independent of oscillatory shear frequency within the range of 0.1-10 Hz (filled symbols in FIG. 35). Moreover, the storage moduli G' of the hydrogel compositions are nearly 10 times larger than the loss moduli G" (empty symbols in FIG. 35). These results suggest that the cross-linked hydrogel voxels are elastic networks, such that the values of the shear modulus G' at the lowest frequency can be taken as the equilibrium shear moduli.

Figure 36:
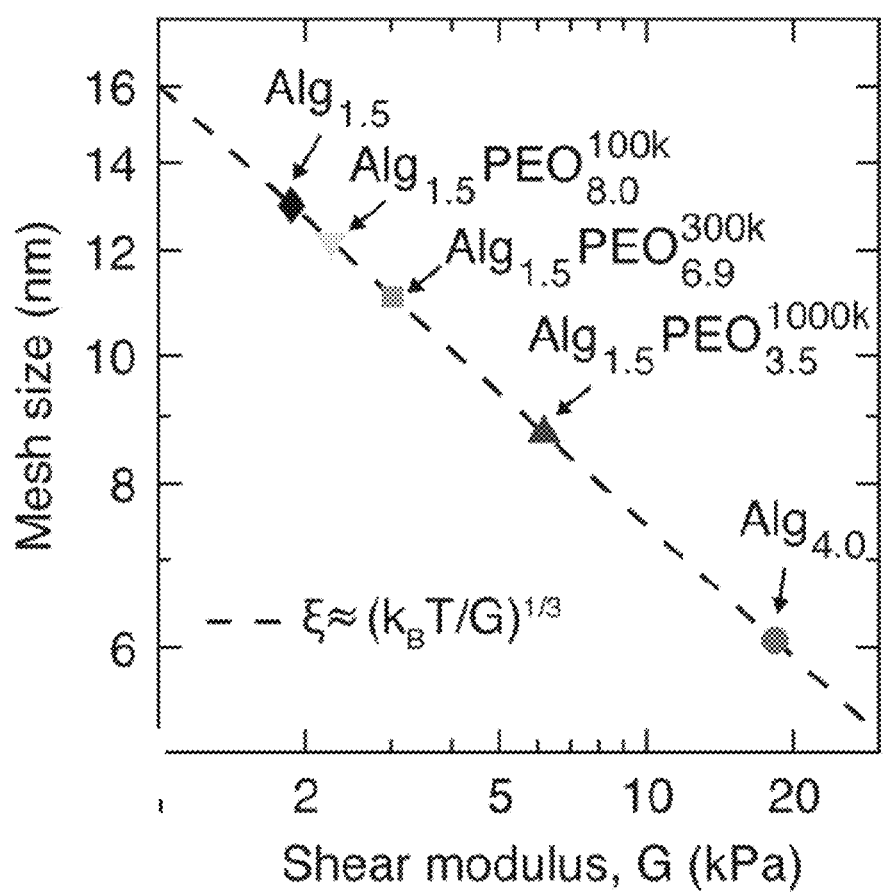
FIG. 36 graphically depicts mesh size (y-axis) as a function of shear modulus (x-axis) for various hydrogel compositions, according to one or more embodiments shown and described herein.

Introducing the PEO polymers having an average molecular weight of 100 kDa only increases the storage modulus G' slightly from 1.8 kPa for $Alg_{1.5}$ to 2.2 kPa for $Alg_{1.5}PEO_{8.0}^{100k}$. However, using PEO molecules having greater average molecular weight, such as 1000 kDa, results in a larger increase in storage modulus G' to 6 kPa, as shown by the solid upward-triangles in FIG. 35. Not intending to be bound by any particular theory, it is believed that this increase in storage modulus for hydrogel compositions comprising PEO having greater molecular weight This is likely because the long PEO molecules are trapped in the alginate network and have not yet fully relaxed at the probing time scale 10 seconds, resulting in an effective increase in shear modulus. Referring now to FIG. 36, the estimated mesh size as a function of shear modulus G is graphically depicted. As shown in FIG. 36, exploiting entanglements formed by long PEO molecules permits fine tuning the effective network mesh size of the cross-linked hydrogel compositions in a range of 9 nm to 12 nm. Yet, the mesh sizes of all crosslinked hybrid bio-ink hydrogels are much larger than 6 nm for pure alginate $Alg_{4.0}$. Moreover, the trapped long PEO polymers are not bounded to the alginate network; instead, they can escape from the network through reptation, a mechanism for entangled polymers to diffuse at long time scales [57]. Collectively, the results of Examples 9 through 11 demonstrate that hybrid hydrogel compositions comprising alginates and PEO can enable independent control over the mesh size and the viscoelasticity of the hydrogel voxels printed using the hybrid hydrogel compositions as the bio-ink.

Example 12: Compression Testing of 3D Lattice Structure Comprising a 3×3×3 Cube

Figure 37:
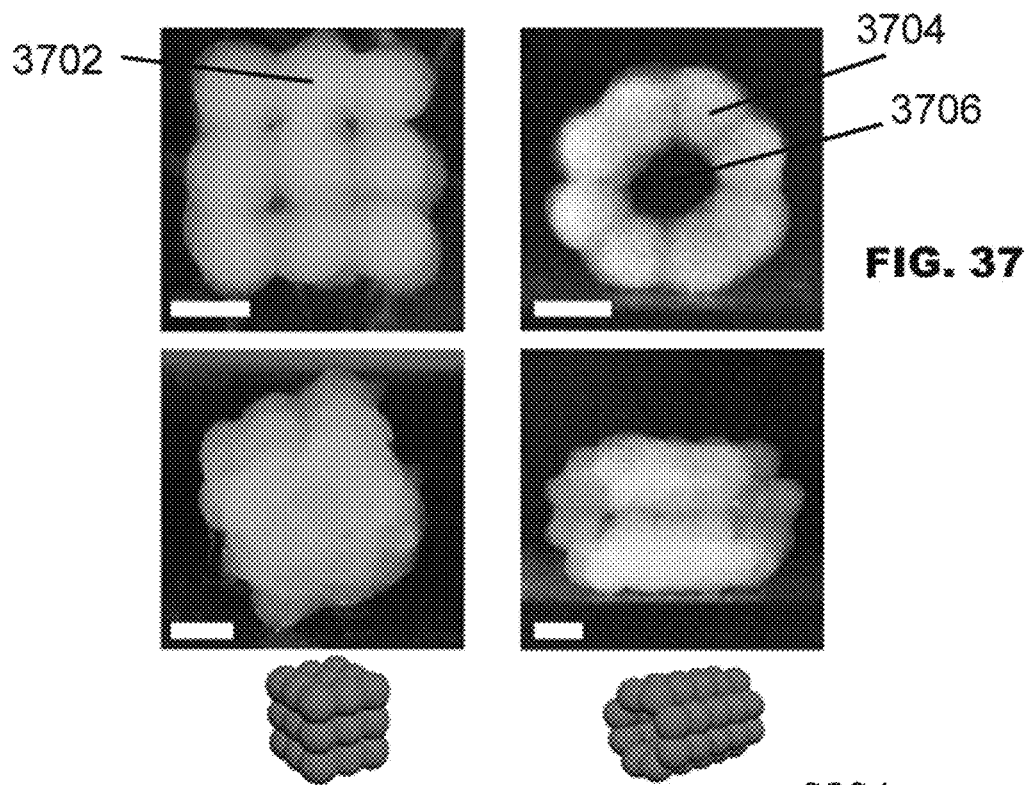
FIG. 37 shows optical microscopy images of side views and perspective views of a 3×3×3 cube structure and a tube structure printed using the DASP systems and methods of the present disclosure, according to one or more embodiments shown and described herein.

In Example 12, 3×3×3 cubes are formed from printed hydrogel voxels having various hydrogel compositions disclosed herein and are subjected to compression testing to demonstrate the mechanical robustness of the printed 3D structures produced using the DASP systems and methods of the present disclosure. The swelling of hydrogel voxels is exploited to partially coalesce neighboring hydrogel voxels, which allows for creating 3D structures composed of interconnected yet distinguishable spherical hydrogel voxels. In Example 12, a 3×3×3 lattice composed of hydrogel voxels having an average diameter of 1.0 mm according to the methods disclosed herein. The printed 3D structures are imaged after the removal of the supporting matrix. To visualize the junctions between neighboring particles, the printed 3D structures are immersed in DI water that contains a red food dye (McCormick, red), which preferentially aggregates at the boundaries between hydrogel voxels, as shown FIG. 37. Referring now to FIG. 37, the printed 3×3×3 cube structure 3702 successfully recapitulates the design, and the hydrogel voxels are interconnected yet distinguishable from each other.

The printed 3D structures comprising the interconnected yet distinguishable hydrogel voxels may have a porous structure provided by the interstitial spaces between the interconnected hydrogel voxels. These interstitial spaces between hydrogel voxels can be seen in the optical microscopy images of FIG. 37. This porosity provided by the interstitial spaces may allow for delivery of fluids to the surfaces of the hydrogel voxels. In some applications, the porosity provided by these interstitial spaces of the printed 3D structures may allow for more efficient delivery of nutrient media to and/or removal of waste from the hydrogel voxels. The liquid materials can be flowed through the porous printed 3D structures rather than being limited to diffusion through the alginate polymer network.

Unlike existing droplet assembly that relies on sophisticated surface chemistry such as lipid bilayers to bridge two neighboring particles [60, 61], the DASP systems and methods of the present disclosure produce individual hydrogel voxels that are connected through cross-linked alginate polymer networks. Therefore, although being porous because of the interstitial space between the hydrogel voxels, the printed 3D structures are expected to be mechanically robust. To assess the mechanical robustness, compression tests on the 3×3×3 lattice structures of Example 12 are conducted. 3×3×3 lattice structures were prepared from the $Alg_{4.0}$ hydrogel composition of Example 9 and the $Alg_{1.5}PEO_{8.0}^{100k}$ hydrogel composition of Example 10. The compression tests are performed in accordance with the test methods previously described herein and are compared to compression of the bulk material having the same dimensions.

Figure 38:
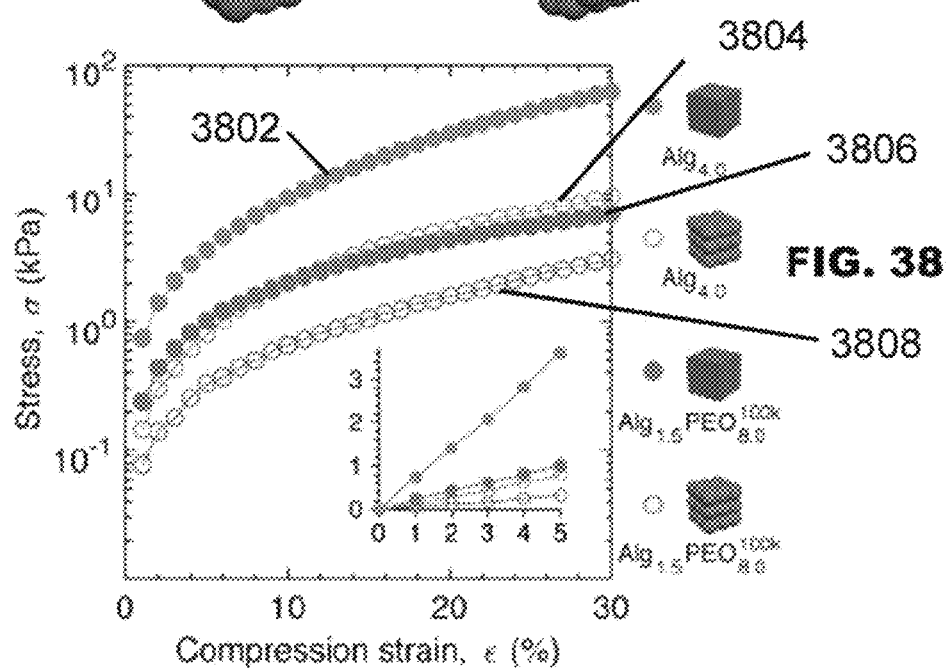
FIG. 38 graphically depicts compression stress (y-axis) as a function of compression strain (x-axis) for 3×3×3 cubes printed with various hydrogel compositions, according to one or more embodiments shown and described herein.

Referring now to FIG. 38, the compression modulus of the porous lattice structures were found to be about three times smaller than the compression of the bulk material having the same shape. In FIG. 38, reference number 3802 refers to the bulk material comprising the $Alg_{4.0}$ hydrogel composition, reference number 3804 refers to the 3×3×3 lattice structure prepared from the $Alg_{4.0}$ hydrogel composition, reference number 3806 refers to the bulk material comprising the $Alg_{1.5}PEO_{8.0}^{100k}$ hydrogel composition, and reference number 3808 refers to the 3×3×3 lattice structure prepared from the $Alg_{1.5}PEO_{8.0}^{100k}$ hydrogel composition. Moreover, regardless of the bio-ink stiffness, the printed 3D lattice structures can sustain a large compression strain of nearly 30% without fracture, as shown in FIG. 38. Consistent with the mechanical robustness, the lattice structure can be flipped, rotated, and translated without breaking apart. Taken together, the results of Example 12 demonstrate that the DASP systems and methods of the present disclosure enable manufacturing free-standing, mechanically robust, multiscale-porous 3D structures.

Example 13: Printing a Tube Structure

In Example 13, the DASP system and methods are used to print a tube structure comprising a wall composed of a single layer of hydrogel voxels, which demonstrates the ability of the DASP system and methods to produce complex geometric structures. Contrasting with the flat surface in a 3D cube structures in Example 12, the surface of the tube structure of Example 13 is highly curved, which precludes a classical layer-by-layer assembly of the bio-inks. Moreover, the tube wall has only one layer of particles, which can easily fall apart if a particle does not swell as expected or is off its prescribed position during the whole process of printing. Thus, printing such a tube structure represents the ultimate test for the robustness and reliability of the DASP systems and methods disclosed herein. A tube structure with the wall composed of a single layer of 40 hydrogel particles was printed using the DASP system. Optical microscopy images of an end view and a perspective view the tube structure 3704 of Example 13 are shown in FIG. 37. Remarkably, in such a tube structure, each particle is interconnected with each other yet distinguishable, precisely capturing the 3D design having a central cylindrical cavity 3706 extending through the tube structure. Collectively, these results demonstrate that the DASP systems and methods may allow for facile, robust 3D digital assembly of highly viscoelastic hydrogel voxels.

REFERENCES

[1] S. V Murphy and A. Atala, *Nat. Biotechnol.,* 2014, 32, 773-785.
[2] J. P. Vacanti and R. Langer, *Lancet,* 1999, 354, 32-34.
[3] A. Khademhosseini, Y. Du, B. Rajalingam, J. P. Vacanti and R. S. Langer, *Adv. Tissue Eng.,* 2008, 103, 349-369.
[4] R. L. Truby and J. A. Lewis, *Nature,* 2016, 540, 371-378.
[5] I. T. Ozbolat and M. Hospodiuk, *Biomaterials,* 2016, 76, 321-343.
[6] T. Bhattacharjee, S. M. Zehnder, K. G. Rowe, S. Jain, R. M. Nixon, W. G. Sawyer and T. E. Angelini, *Sci. Adv.,* 2015, 1, 4-10.
[7] T. J. Hinton, Q. Jallerat, R. N. Palchesko, J. H. Park, M. S. Grodzicki, H. J. J. Shue, M. H. Ramadan, A. R. Hudson and A. W. Feinberg, *Sci. Adv.,* 2015, 1, e1500758.
[8] A. Lee, A. R. Hudson, D. J. Shiwarski, J. W. Tashman, T. J. Hinton, S. Yerneni, J. M. Bliley, P. G. Campbell and A. W. Feinberg, *Science,* 2019, 365, 482-487.
[9] Y. S. Zhang and A. Khademhosseini, *Science,* 2017, 356, eaaf3627.
[10] M. W. Tibbitt and K. S. Anseth, *Biotechnol. Bioeng.,* 2009, 103, 655-663.
[11] J. A. Burdick and G. D. Prestwich, *Adv. Mater.,* 2011, 23, 41-56.
[12] J. L. Drury and D. J. Mooney, *Biomaterials,* 2003, 24, 4337-4351.
[13] K. Y. Lee and D. J. Mooney, *Chem. Rev.,* 2001, 101, 1869-1879.
[14] D. B. Kolesky, R. L. Truby, A. S. Gladman, T. A. Busbee, K. A. Homan and J. A. Lewis, *Adv. Mater.,* 2014, 26, 3124-3130.
[15] M. A. Skylar-Scott, J. Mueller, C. W. Visser and J. A. Lewis, *Nature,* 2019, 575, 330-335.
[16] F. G. Downs, D. J. Lunn, M. J. Booth, J. B. Sauer, W. J. Ramsay, R. G. Klemperer, C. J. Hawker and H. Bayley, *Nat. Chem.,* 2020, 12, 363-371.
[17] J. T. Muth, D. M. Vogt, R. L. Truby, I. Mengüç, D. B. Kolesky, R. J. Wood and J. A. Lewis, *Adv. Mater.,* 2014, 26, 6307-6312.
[18] S. Utech, R. Prodanovic, A. S. Mao, R. Ostafe, D. J. Mooney and D. A. Weitz, *Adv. Healthc. Mater.,* 2015, 4, 1628-1633.

[19] A. K. Grosskopf, R. L. Truby, H. Kim, A. Perazzo, J. A. Lewis and H. A. Stone, *ACS Appl. Mater. Interfaces*, 2018, 10, 23353-23361.

[20] C. B. Highley, C. B. Rodell and J. A. Burdick, *Adv. Mater.*, 2015, 27, 5075-5079.

[21] M. Rubinstein and R. H. Colby, *Polymer Physics*, Oxford University Press, Oxford, U K, 2003.

[22] S. V Murphy and A. Atala, *Nat. Biotechnol.*, 2014, 32, 773-785.

[23] M. Schaffner, P. A. Ribs, F. Coulter, S. Kilcher and A. R. Studart, *Sci. Adv.*, 2017, 3, eaao6804.

[24] P. Mittal, J. Brindle, J. Stephen, J. B. Plotkin and G. Kudla, *Proc. Natl. Acad. Sci. U.S.A.*, 2018, 115, 8639-8644.

[25] T. Takebe and J. M. Wells, *Science*, 2019, 364, 956-959.

[26] Z. J. Gartner and C. R. Bertozzi, *Proc. Natl. Acad. Sci. U.S.A.*, 2009, 106, 4606-4610.

[27] M. M. Stanton, J. Samitier and S. Sánchez, *Lab Chip*, 2015, 15, 3111-3115.

[28] S. Y. Teh, R. Lin, L. H. Hung and A. P. Lee, *Lab Chip*, 2008, 8, 198-220.

[29] M. T. Guo, A. Rotem, J. A. Heyman and D. A. Weitz, *Lab Chip*, 2012, 12, 2146-2155.

[30] W. Li, L. Zhang, X. Ge, B. Xu, W. Zhang, L. Qu, C. H. Choi, J. Xu, A. Zhang, H. Lee and D. A. Weitz, *Chem. Soc. Rev.*, 2018, 47, 5646-5683.

[31] S. V Murphy, A. Atala, 3D bioprinting of tissues and organs. Nat. Biotechnol. 32, 773-785 (2014).

[32] H. W. Kang, S. J. Lee, I. K. Ko, C. Kengla, J. J. Yoo, A. Atala, A 3D bioprinting system to produce human-scale tissue constructs with structural integrity. Nat. Biotechnol. 34, 312-319 (2016).

[33] S. C. Ligon, R. Liska, J. Stampfl, M. Gurr, R. Mülhaupt, Polymers for 3D printing and customized additive manufacturing. Chem. Rev. 117, 10212-10290 (2017).

[34] S. Nian, J. Zhu, H. Zhang, G. Freychet, M. Zhernenkov, B. Xu, L. H. Cai, 3D printable, extremely soft, stretchable, and reversible elastomers from molecular architecture-directed assembly. Chem. Mater. (2021), doi: 10.1021/acs.chemmater.0c04659.

[35] F. P. W. Melchels, J. Feijen, D. W. Grijpma, A review on stereolithography and its applications in biomedical engineering. Biomaterials. 31, 6121-6130 (2010).

[36] B. Derby, Inkjet Printing of Functional and Structural Materials: Fluid Property Requirements, Feature Stability, and Resolution. Annu. Rev. Mater. Res. 40, 395-414 (2010).

[37] R. L. Truby, J. A. Lewis, Printing soft matter in three dimensions. Nature. 540, 371-378 (2016).

[38] M. A. Skylar-Scott, S. G. M. Uzel, L. L. Nam, J. H. Ahrens, R. L. Truby, S. Damaraju, J. A. Lewis, Biomanufacturing of organ-specific tissues with high cellular density and embedded vascular channels. Sci. Adv. 5 (2019), doi:10.1126/sciadv.aaw2459.

[39] J. T. Muth, D. M. Vogt, R. L. Truby, D. B. Kolesky, R. J. Wood, J. A. Lewis, Embedded 3D printing of strain sensors within highly stretchable elastomers. Adv. Mater. 26, 6307-6312 (2014).

[40] T. J. Hinton, Q. Jallerat, R. N. Palchesko, J. H. Park, M. S. Grodzicki, H. J. J. Shue, M. H. Ramadan, A. R. Hudson, A. W. Feinberg, Three-dimensional printing of complex biological structures by freeform reversible embedding of suspended hydrogels. Sci. Adv. 1, e1500758 (2015).

[41] T. Bhattacharjee, S. M. Zehnder, K. G. Rowe, S. Jain, R. M. Nixon, W. G. Sawyer, T. E. Angelini, Writing in the granular gel medium. Sci. Adv. 1, 4-10 (2015).

[42] C. B. Highley, C. B. Rodell, J. A. Burdick, Direct 3D printing of shear-thinning hydrogels into self-healing hydrogels. Adv. Mater. 27, 5075-5079 (2015).

[43] Q. D. Nguyen, D. V. Boger, Measuring the flow properties of yield stress fluids. Annu. Rev. Fluid Mech. 24, 47-88 (1992).

[44] A. Lee, A. R. Hudson, D. J. Shiwarski, J. W. Tashman, T. J. Hinton, S. Yerneni, J. M. Bliley, P. G. Campbell, A. W. Feinberg, 3D bioprinting of collagen to rebuild components of the human heart. Science. 365, 482-487 (2019).

[45] A. Z. Nelson, B. Kundukad, W. K. Wong, S. A. Khan, P. S. Doyle, Embedded droplet printing in yield-stress fluids. Proc. Natl. Acad. Sci. U.S.A. 117, 5671-5679 (2020).

[46] A. C. Daly, M. D. Davidson, J. A. Burdick, 3D bioprinting of high cell-density heterogeneous tissue models through spheroid fusion within self-healing hydrogels. Nat. Commun. 12, 1-13 (2021).

[47] J. Li, D. J. Mooney, Designing hydrogels for controlled drug delivery. Nat. Rev. Mater. 1, 1-18 (2016).

[48] J. Maida, J. Visser, F. P. Melchels, T. Jüngst, W. E. Hennink, W. J. A. Dhert, J. Groll, D. W. Hutmacher, 25th anniversary article: Engineering hydrogels for biofabrication. Adv. Mater. 25, 5011-5028 (2013).

[49] N. Paxton, W. Smolan, T. Bock, F. Melchels, J. Groll, T. Jungst, Proposal to assess printability of bioinks for extrusion-based bioprinting and evaluation of rheological properties governing bioprintability. Biofabrication. 9 (2017), doi:10.1088/1758-5090/aa8dd8.

[50] J. H. Y. Chung, S. Naficy, Z. Yue, R. Kapsa, A. Quigley, S. E. Moulton, G. G. Wallace, Bio-ink properties and printability for extrusion printing living cells. Biomater. Sci. 1, 763-773 (2013).

[51] J. S. Miller, K. R. Stevens, M. T. Yang, B. M. Baker, D. H. T. Nguyen, D. M. Cohen, E. Toro, A. A. Chen, P. A. Galie, X. Yu, R. Chaturvedi, S. N. Bhatia, C. S. Chen, Rapid casting of patterned vascular networks for perfusable engineered three-dimensional tissues. Nat. Mater. 11, 768-774 (2012).

[52] D. B. Kolesky, R. L. Truby, A. S. Gladman, T. A. Busbee, K. A. Homan, J. A. Lewis, 3D bioprinting of vascularized, heterogeneous cell-laden tissue constructs. Adv. Mater. 26, 3124-3130 (2014).

[53] D. B. Kolesky, K. A. Homan, M. A. Skylar-Scott, J. A. Lewis, Three-dimensional bioprinting of thick vascularized tissues. Proc. Natl. Acad. Sci. U.S.A. 113, 3179-3184 (2016).

[54] B. Grigoryan, S. J. Paulsen, D. C. Corbett, D. W. Sazer, C. L. Fortin, A. J. Zaita, P. T. Greenfield, N. J. Calafat, J. P. Gounley, A. H. Ta, F. Johansson, A. Randles, J. E. Rosenkrantz, J. D. Louis-Rosenberg, P. A. Galie, K. R. Stevens, J. S. Miller, Multivascular networks and functional intravascular topologies within biocompatible hydrogels. Science. 364, 458-464 (2019).

[55] F. Lim, A. M. Sun, Microencapsulated islets as bioartificial endocrine pancreas. Science. 21, 908-910 (1980).

[56] R. Satchi-Fainaro, R. Duncan, C. M. Barnes, in Advances in Polymer Science (2006), vol. 193, pp. 1-65.

[57] M. Rubinstein, R. H. Colby, Polymer Physics (Oxford University Press, Oxford, U K, 2003).

[58] K. Y. Lee, D. J. Mooney, Alginate: Properties and biomedical applications. Prog. Polym. Sci. 37, 106-126 (2012).

[59] H. Wen, J. Hao, S. K. Li, Characterization of human sclera barrier properties for transscleral delivery of bevacizumab and ranibizumab. J. Pharm. Sci. 102, 892-903 (2013).
[60] G. Villar, A. D. Graham, H. Bayley, A Tissue-Like Printed Material. Science. 340, 48-53 (2013).
[61] G. Villar, A. J. Heron, H. Bayley, Formation of droplet networks that function in aqueous environments. Nat. Nanotechnol. 6, 803-808 (2011).
[62] L. Cai, J. Marthelot, P. T. Brun, An unbounded approach to microfluidics using the Rayleigh-Plateau instability of viscous threads directly drawn in a bath. Proc. Natl. Acad. Sci. U.S.A. 116, 22966-22971 (2019).
[63] H. J. Mea, L. Delgadillo, J. Wan, On-demand modulation of 3D-printed elastomers using programmable droplet inclusions. Proc. Natl. Acad. Sci. U.S.A. 117, 14790-14797 (2020).
[64] B. Ayan, D. N. Heo, Z. Zhang, M. Dey, A. Povilianskas, C. Drapaca, I. T. Ozbolat, Aspiration-assisted bioprinting for precise positioning of biologics. Sci. Adv. 6, 1-17 (2020).
[65] F. G. Downs, D. J. Lunn, M. J. Booth, J. B. Sauer, W. J. Ramsay, R. G. Klemperer, C. J. Hawker, H. Bayley, Multi-responsive hydrogel structures from patterned droplet networks. Nat. Chem. 12, 363-371 (2020).
[66] X. Du, J. Zhou, J. Shi, B. Xu, Supramolecular Hydrogelators and Hydrogels: From Soft Matter to Molecular Biomaterials. Chem. Rev. 115, 13165-13307 (2015).
[67] E. A. Appel, J. del Barrio, X. J. Loh, O. A. Scherman, Supramolecular polymeric hydrogels. Chem. Soc. Rev. 41, 6195-6214 (2012).

What is claimed is:

1. A method of assembling hydrogel voxels to form a structure, the method comprising:
depositing a plurality of hydrogel voxels within a sacrificial support matrix, wherein the hydrogel voxels are spherical; and
cross-linking the plurality of hydrogel voxels to form the structure to comprise a one dimensional line, a two dimensional array, or a free-standing three dimensional lattice; wherein each of the spherical hydrogel voxels in the structure are interconnected and are distinguishable from each other when viewed through optical microscopy;
wherein the sacrificial support matrix is self-healing.

2. The method of claim 1, wherein the structure is a free-standing three dimensional lattice.

3. The method of claim 1, wherein depositing the plurality of hydrogel voxels comprises:
positioning a microfluidic printhead within the sacrificial support matrix; and
mechanically extruding a hydrogel composition through the microfluidic printhead.

4. The method of claim 3, comprising mechanically extruding the hydrogel composition at an injection speed of from 40 nanoliters per second to 680 nanoliters per second for each of the plurality of hydrogel voxels.

5. The method of claim 3, wherein depositing the plurality of hydrogel voxels comprises:
positioning the microfluidic printhead at a first position in the sacrificial support matrix;
extruding a first volume of the hydrogel composition at the first position;
moving the microfluidic printhead past a second position in the sacrificial support matrix by a distance of at least 3.5 mm;
moving the microfluidic printhead back to the second position; and
extruding a second volume of the hydrogel composition at the second position.

6. The method of claim 5, wherein the sacrificial support matrix is aqueous.

7. The method of claim 3, further comprising adjusting a movement speed of the microfluidic printhead, a distance between adjoining hydrogel voxels of the interconnected voxels, a concentration of calcium ions in the sacrificial support matrix, or combinations of these to modify the spacing, cross-linking, or both of the plurality of hydrogel voxels.

8. The method of claim 1, comprising depositing the plurality of hydrogel voxels at a center-to-center distance between the hydrogel voxels of from 0.8 to 1.7 times the average diameter of the plurality of hydrogel voxels.

9. The method of claim 1, wherein cross-linking the plurality of hydrogel voxels comprises contacting the plurality of hydrogel voxels with calcium ions pre-dissolved in the sacrificial support matrix.

10. The method of claim 9, further comprising, after contacting the plurality of hydrogel voxels with the calcium ions pre-dissolved in the sacrificial support matrix, washing the plurality of hydrogel voxels with a calcium solution, wherein the washing further cross-links the plurality of hydrogel voxels and dissociates the sacrificial support matrix to leave the free-standing structure.

11. The method of claim 1, wherein after depositing the plurality of hydrogel voxels within the sacrificial support matrix, the plurality of hydrogel voxels swell and have an average diameter of from 300 to 1200 micrometers.

12. The method of claim 1, wherein each of the hydrogel voxels comprises a hydrogel composition comprising an aqueous solution of a hydrogel and at least one cell.

13. The method of claim 1, wherein a storage modulus G' and a loss modulus G" of the sacrificial support matrix are not reduced for a period of 200 seconds after applying an instant shear strain of 1000% for 1 second to the sacrificial support matrix.

14. The method of claim 1, wherein the sacrificial support matrix comprises fragmented gelatin microparticles and calcium ions pre-dissolved in the fragmented gelatin microparticles.

15. A method of assembling hydrogel voxels to form a structure, the method comprising:
depositing a plurality of hydrogel voxels within a sacrificial support matrix, wherein the hydrogel voxels are spherical and the plurality of hydrogel voxels are deposited at a center-to-center distance between the hydrogel voxels of from 0.8 to 1.7 times the average diameter of the plurality of hydrogel voxels; and
cross-linking the plurality of hydrogel voxels to form the structure to comprise a one dimensional line, a two dimensional array, or a free-standing three dimensional lattice; wherein each of the spherical hydrogel voxels in the structure are interconnected and are distinguishable from each other when viewed through optical microscopy.

16. The method of claim 15, wherein:
the sacrificial support matrix is self-healing; and
a storage modulus G' and a loss modulus G" of the sacrificial support matrix are not reduced for a period 200 seconds after applying an instant shear strain of 1000% for 1 second to the sacrificial support matrix.

17. The method of claim 15, wherein the sacrificial support matrix is aqueous.

* * * * *